United States Patent
Huang et al.

(10) Patent No.: US 11,674,026 B2
(45) Date of Patent: Jun. 13, 2023

(54) POLYOLEFIN-BASED MICROPOROUS FILMS VIA SEQUENTIAL COLD AND HOT STRETCHING OF UNANNEALED POLYPROPYLENE COPOLYMER FILMS

(71) Applicant: DDP SPECIALTY ELECTRONIC MATERIALS US, LLC, Wilmington, DE (US)

(72) Inventors: Wenyi Huang, Midland, MI (US); William Ripmeester, Kingston (CA)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 139 days.

(21) Appl. No.: 17/205,438

(22) Filed: Mar. 18, 2021

(65) Prior Publication Data
US 2022/0298340 A1  Sep. 22, 2022

(51) Int. Cl.
*C08L 23/12* (2006.01)
*C08L 23/16* (2006.01)
*C08J 5/18* (2006.01)

(52) U.S. Cl.
CPC ............ *C08L 23/12* (2013.01); *C08J 5/18* (2013.01); *C08L 23/16* (2013.01); *C08J 2323/12* (2013.01); *C08J 2323/16* (2013.01); *C08J 2423/12* (2013.01); *C08J 2423/16* (2013.01); *C08L 2203/162* (2013.01)

(58) Field of Classification Search
CPC .......... C08L 23/10; C08L 23/12; C08L 23/14; C08L 23/145; C08L 23/142
See application file for complete search history.

(56) References Cited

U.S. PATENT DOCUMENTS

| | | |
|---|---|---|
| 3,426,754 A | 2/1969 | Bierenbaum et al. |
| 3,801,404 A | 4/1974 | Druin et al. |
| 3,843,761 A | 10/1974 | Bierenbaum et al. |
| 5,236,963 A | 8/1993 | Jacoby et al. |
| 2011/0015354 A1* | 1/2011 | Marchand ............ C08F 297/08 526/348.3 |
| 2011/0015363 A1* | 1/2011 | Marchand ............ C08F 297/08 526/348.3 |
| 2015/0266064 A1* | 9/2015 | Humiston ............... B29C 55/00 15/209.1 |
| 2022/0298314 A1* | 9/2022 | Tanaka ...................... C08J 9/26 |

OTHER PUBLICATIONS

International Search Report and Written Opinion in International Application No. PCT/US2021/023042 dated Dec. 10, 2021.

\* cited by examiner

*Primary Examiner* — Jeffrey C Mullis

(57) ABSTRACT

Microporous polymer films and methods of making same are disclosed. The microporous polymer film comprises:
(a) 50 to 95 weight percent of polypropylene copolymer comprising (i) polypropylene homopolymer chain segments in total amount of from 50-82 wt. %, and (ii) ethylene-containing copolymer chain segments in total amount of from 18-50 wt. %; wherein at least a portion of the ethylene-containing copolymer chain segments comprise polymerized units of ethylene in an amount of at least 45 wt. % of the ethylene-containing copolymer chain segments; and
(b) 5 to 50 weight percent of ethylene-propylene elastomer, wherein at least 45 weight percent of the polymerized units in the ethylene-propylene elastomer are units of ethylene.

31 Claims, 12 Drawing Sheets

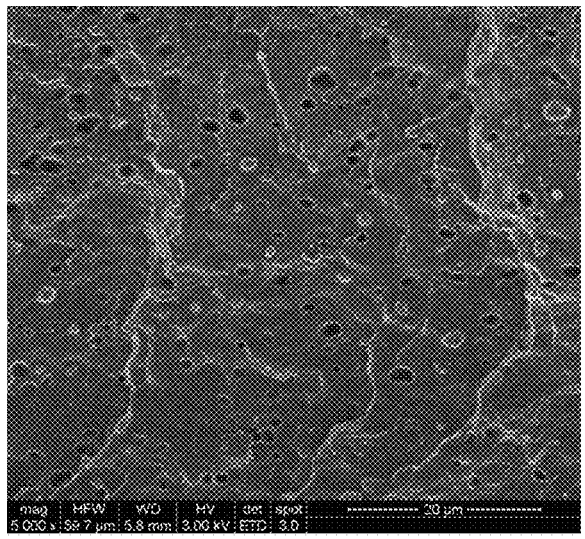
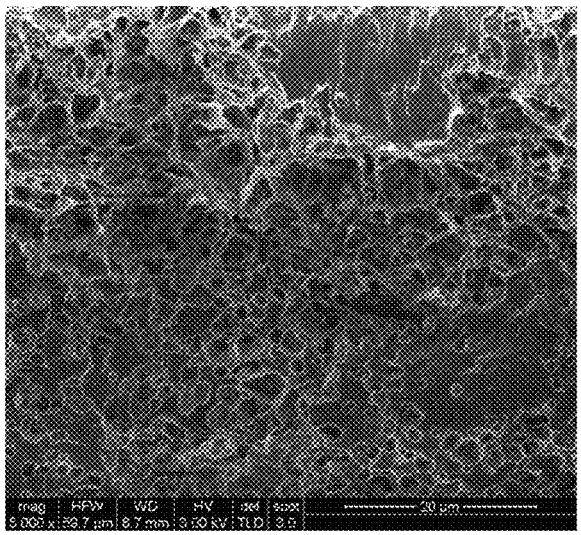
FIG. 2A　　　　　　　FIG. 2B
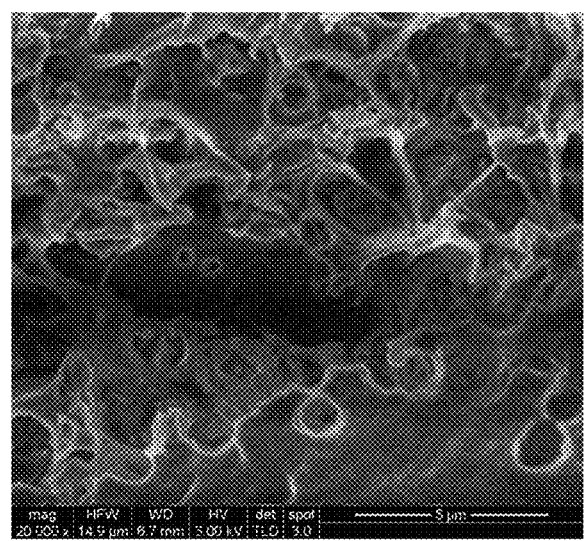
FIG. 2C

Before Stretching

After Stretching

Before Stretching

After Stretching

POLYOLEFIN-BASED MICROPOROUS FILMS VIA SEQUENTIAL COLD AND HOT STRETCHING OF UNANNEALED POLYPROPYLENE COPOLYMER FILMS

FIELD OF THE INVENTION

Embodiments of the present disclosure generally relate to microporous films and applications of the microporous films in a range of end uses, such as housewrap, roof membranes, active and medical packaging, and hygiene and medical articles.

This invention provides microporous polymer films derived from certain polypropylene (PP) copolymers, said PP copolymers comprising polypropylene homopolymer chain segments and ethylene-containing copolymer chain segments. The PP copolymer microporous films disclosed herein are produced without the traditional means of achieving porosity, namely the use of inorganic filler to cavitate, hole punching, or extensive pre-annealing to create a favorable crystalline morphology as practiced for homopolymer polyolefins. Instead, film porosity is achieved through the use of specific types of PP copolymer to make non-porous films, followed by a sequential cold/hot stretching process, which effects a microphase segregation induced pore formation in the polyolefin-based film, as disclosed herein. One advantageous feature of the methods disclosed herein is that the non-porous films do not require an annealing step before the cold/hot stretching process, and also do not require a heat setting or annealing step after the cold/hot stretching process.

Described herein are compositions of the PP copolymers and process steps and methods for making and using microporous films of same. More particularly, these microporous films can be produced to provide water vapor permeability while maintaining an effective barrier to liquid water, and these permeabilities are tunable. The property balance of the microporous films disclosed herein suggests that these films may find use in applications such as, for example, housewrap, roof membranes, and hygiene and medical articles, packaging (including active packaging and medical packaging), and filtration.

BACKGROUND OF THE INVENTION

Described herein are microporous films, methods of making same, and uses thereof. This invention provides a cost effective and environmentally benign way to create microporous structure in polyolefin-based films by extrusion film casting/blowing and dry stretching processes. The pore size and porosity of these microporous films can be tuned to achieve optimized performance in various end-use applications (for example, for housewrap applications the films could be made to have comparable porosity and permeability properties to commercial products, such as Tyvek® housewrap, DuPont de Nemours, Inc., Wilmington, Del., USA). Alternatively, smaller pore size can provide a barrier to air movement through walls. According to the U.S. Department of Energy, up to 40% of the energy consumed to heat or cool a building is lost to air leakage.

A number of end-use applications require, or at least benefit from, the use of breathable films. Breathable films may be described as films that are relatively permeable to water vapor and relatively impermeable to liquid.

Housewrap functions as a weather-resistant barrier, preventing rain from getting into the wall assembly while allowing water vapor to pass to the exterior. Therefore, housewrap must be both water shedding and have a high moisture vapor permeance (breathability) to be effective. To date, housewraps can be categorized into two categories: woven & perforated and non-woven & unperforated. Perforated wraps, generally the less expensive, are made from polyethylene or polypropylene, with microscopic punched holes for breathability, while non-perforated wraps consist of polyolefin layers that allow water vapor to pass through its non-woven fiber mesh. The incumbent technologies generally involve multiple steps for the manufacturing process.

In addition, this invention also provides polyolefin-based microporous films for roof membrane applications. There is a great market need for a breathable roof membrane. The incumbent non-permeable roof membranes made of polyvinyl chloride (PVC), thermoplastic polyolefin (TPO) or polymerized ethylene propylene diene monomer (EPDM) fail to meet this need, and polyolefin-based microporous films offer an opportunity to provide low-cost alternatives with high water vapor permeability compared to such incumbents. The low/little water vapor permeability of the incumbent roof membranes leads to the accumulation of moisture beneath the roof membrane, causing the delamination of the roof membrane from the roof (e.g. lightweight concrete structure) over time and, in turn, the failure of the roof structure. The higher water vapor permeability of thick polyolefin-based microporous films meets the key requirements of roof membranes, for example, high moisture vapor permeance (breathability), for example, 10 perms or greater; and good water shedding (weather-resistant barrier). The weatherability of polyolefin-based microporous films can be further enhanced by applying anti-UV agents.

Polyethylene films are widely used in hygiene absorbent products, such as, for example, diaper backsheets. Diaper backsheets may be classified as breathable or non-breathable. Breathable backsheets typically use films that are filled with greater than 50 wt. % of $CaCO_3$ (or other inorganic filler) and/or are microcavitated. However, vigorous competition in the hygiene absorbent product market has pushed the film manufacturers to pursue differentiating technology that enables them to enhance the product performance, such as, improved mechanical property performance, preferably while also enabling reduced costs such as from further downgauging (thinner films).

Accordingly, a number of end-use markets still have a need for an improved breathable film having a very thin gauge, a high porosity to enable high water vapor permeance while preventing the leakage of liquid water, and while still ensuring good processability and mechanical properties. The non-interconnected micropores in the microporous films disclosed herein provide better barrier performance to air, water, bacteria, and blood, which are essential for housewrap, roofing membrane, air filtration, medical packaging and medical back table cover applications. The relatively high melting temperature of PP copolymer enables its application in the steam sterilization for medical packaging. And, the broad range of tunable air permeability suggests these microporous films should also be amenable for active packaging (sachets) applications.

Additionally, it is believed that microporous films comprising PP copolymer having lower tensile moduli are especially desired for some applications, as the film tensile modulus is related to the flexibility of the film and further such lower tensile modulus films have the potential for improved toughness, installation by hot air welding, and low temperature durability.

Therefore, there is a need for compositions containing the polypropylene copolymer compositions described herein, the microporous films produced therefrom, methods for preparing them, and methods for using them. The invention disclosed herein is directed to these, as well as other, important ends, and provides a solution to these market needs.

SUMMARY OF THE INVENTION

In certain embodiments, the invention described herein relates to a microporous polymer film comprising, consisting of, or consisting essentially of: one or more polypropylene copolymer, said polypropylene copolymer comprising one or more polypropylene homopolymer chain segments and one or more ethylene-containing copolymer chain segments; and wherein the microporous polymer film comprises: (i) polypropylene homopolymer chain segments in total amount of from 50-82 wt. %, based on the weight of the microporous polymer film, or from 43-79 mole %, based on the mole content of polymerized units of propylene in the polypropylene homopolymer chain segments as a percentage of the total mole content of polymerized monomer units in the microporous polymer film; and (ii) ethylene-containing copolymer chain segments in total amount of from 18-50 wt. %, based on the weight of the microporous polymer film, or from 21-57 mole %, based on the mole content of polymerized monomer units in the ethylene-containing copolymer chain segments as a percentage of the total mole content of polymerized monomer units in the microporous polymer film; wherein at least a portion of the ethylene-containing copolymer chain segments comprise polymerized units of ethylene in an amount of at least 45 wt. %, based on the weight of the ethylene-containing copolymer chain segments, or at least 55 mole % based on the mole content of polymerized units of ethylene in the ethylene-containing copolymer chain segments as a percentage of the total mole content of polymerized monomer units in the ethylene-containing copolymer chain segments.

In an embodiment, there is disclosed a method of forming a microporous polymer film, said method steps comprising, consisting of, or consisting essentially of: (a) providing one or more polypropylene copolymer comprising: (i) one or more polypropylene homopolymer chain segments in total amount of from 50-82 wt. %, based on the weight of polypropylene copolymer, or from 43-79 mole %, based on the mole content of polymerized units of propylene in the polypropylene homopolymer chain segments as a percentage of the total mole content of polymerized monomer units in the polypropylene copolymer; and (ii) one or more ethylene-containing copolymer chain segments in total amount of from 18-50 wt. %, based on the weight of polypropylene copolymer, or from 21-57 mole %, based on the mole content of polymerized monomer units in the ethylene-containing copolymer chain segments as a percentage of the total mole content of polymerized monomer units in the polypropylene copolymer; wherein at least a portion of the ethylene-containing copolymer chain segments comprises polymerized units of ethylene in an amount of at least 45 wt. %, based on the weight of the ethylene-containing copolymer chain segments, or at least 55 mole % based on the mole content of polymerized units of ethylene in the ethylene-containing copolymer chain segments as a percentage of the total mole content of polymerized monomer units in the ethylene-containing copolymer chain segments; (b) forming a non-porous film from the polypropylene copolymer, and (c) subjecting the non-porous film to sequential cold and hot stretching steps comprising: (i) at least one cold stretching step at a temperature in a range of from −20° C. to 50° C.; and (ii) at least one hot stretching step at a temperature in a range of from 50° C. to 150° C., thereby producing a microporous polymer film.

In some embodiments, the method is a continuous process to produce a microporous polymer film. Specifically, in some embodiments, the method proceeds in the absence of any annealing step after formation of the non-porous film and proceeds in the absence of any annealing or heat setting step after formation of the microporous polymer film and is a continuous process to produce a microporous polymer film.

In one alternative embodiment, this invention relates to a microporous polymer film comprising:
  (a) 50 to 95 weight percent of one or more polypropylene copolymer, based on the total weight of the film, said polypropylene copolymer comprising one or more polypropylene homopolymer chain segments and one or more ethylene-containing copolymer chain segments; and wherein the microporous polymer film comprises:
    (i) polypropylene homopolymer chain segments in total amount of from 50-82 wt. %, based on the weight of the polypropylene copolymer, or from 43-79 mole %, based on the mole content of polymerized units of propylene in the polypropylene homopolymer chain segments as a percentage of the total mole content of polymerized monomer units in the polypropylene copolymer; and
    (ii) ethylene-containing copolymer chain segments in total amount of from 18-50 wt. %, based on the weight of the polypropylene copolymer, or from 21-57 mole %, based on the mole content of polymerized monomer units in the ethylene-containing copolymer chain segments as a percentage of the total mole content of polymerized monomer units in the polypropylene copolymer; wherein at least a portion of the ethylene-containing copolymer chain segments comprise polymerized units of ethylene in an amount of at least 45 wt. %, based on the weight of the ethylene-containing copolymer chain segments, or at least 55 mole % based on the mole content of polymerized units of ethylene in the ethylene-containing copolymer chain segments as a percentage of the total mole content of polymerized monomer units in the ethylene-containing copolymer chain segments; and
  (b) 5 to 50 weight percent of one or more ethylene-propylene elastomer, based on the total weight of the film; wherein at least 45 weight percent of the polymerized units in the (b) ethylene-propylene elastomer are units of ethylene.

In still a further alternative embodiment, this invention further relates to a method of forming a microporous polymer film, said method steps comprising:
  A) providing a mixture of
    (a) 50 to 95 weight percent of one or more polypropylene copolymer, based on the total weight of the mixture, said polypropylene copolymer comprising:
      (i) one or more polypropylene homopolymer chain segments in total amount of from 50-82 wt. %, based on the weight of polypropylene copolymer, or from 43-79 mole %, based on the mole content of polymerized units of propylene in the polypropylene homopolymer chain segments as a percentage of the total mole content of polymerized monomer units in the polypropylene copolymer; and (ii) one or more ethylene-containing copolymer chain segments in total amount of from 18-50 wt. %, based on the weight of polypropylene copolymer, or from 21-57 mole %, based on the mole content of polymerized monomer units in the ethylene-containing copolymer chain segments as a percentage of the total mole content of polymerized monomer units in the polypropylene copolymer;

wherein at least a portion of the ethylene-containing copolymer chain segments comprises polymerized units of ethylene in an amount of at least 45 wt. %, based on the weight of the ethylene-containing copolymer chain segments, or at least 55 mole % based on the mole content of polymerized units of ethylene in the ethylene-containing copolymer chain segments as a percentage of the total mole content of polymerized monomer units in the ethylene-containing copolymer chain segments; and (b) 5 to 50 weight percent of one or more ethylene-propylene elastomer, based on the total weight of the mixture, wherein at least 45 weight percent of the polymerized units in the ethylene-propylene elastomer are units of ethylene;

B) forming a non-porous film from the mixture; and

C) subjecting the non-porous film to sequential cold and hot stretching steps comprising:

(i) at least one cold stretching step at a temperature in a range of from −20° C. to 50° C.; and (ii) at least one hot stretching step at a temperature in a range of from 50° C. to 140° C.;

thereby producing a microporous polymer film.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 2A shows an SEM image of the film cross section of unstretched PP C7054-07NA film, shown with a 20 micron scale bar.

FIG. 2B shows an SEM image of the film cross section of stretched PP C7054-07NA film after 25% cold stretching (room temperature) at 100 mm/s and 50% hot stretching (100° C.) at 5 mm/s, shown with a 20 micron scale bar.

FIG. 2C shows an SEM image of the film cross section of stretched PP C7054-07NA film after 25% cold stretching (room temperature) at 100 mm/s and 50% hot stretching (100° C.) at 5 mm/s, shown with a 5 micron scale bar.

DETAILED DESCRIPTION OF THE INVENTION

Figure 1A:
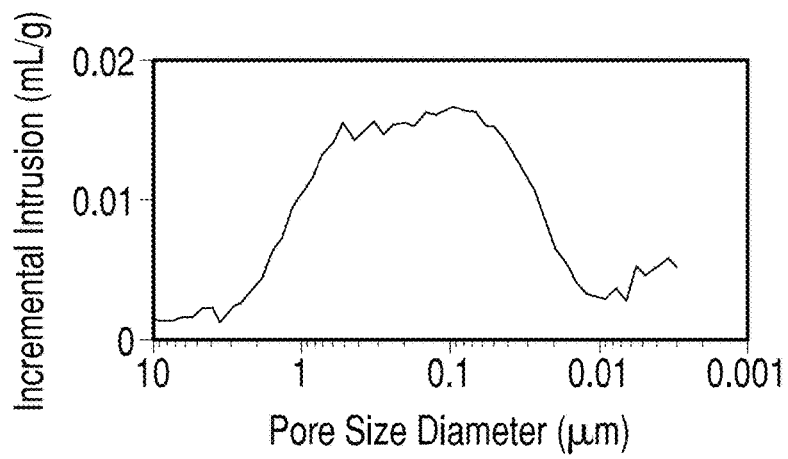
FIG. 1A shows Mercury Intrusion Porosimetry data for Tyvek® housewrap.

The present invention can be understood more readily by reference to the following detailed description, examples, drawings, and claims, and their previous and following description. However, it is to be understood that this invention is not limited to the specific compositions, articles, devices, systems, and/or methods disclosed unless otherwise specified, and as such, of course, can vary. While aspects of the present invention can be described and claimed in a particular statutory class, such as the composition of matter statutory class, this is for convenience only and one of skill in the art will understand that each aspect of the present invention can be described and claimed in any statutory class.

The following description of the invention is also provided as an enabling teaching of the invention in its best, currently known aspect. To this end, those of ordinary skill in the relevant art will recognize and appreciate that changes and modifications may be made to the various aspects of the invention described herein, while still obtaining the beneficial results of the present invention. It will also be apparent that some of the benefits of the present invention may be obtained by selecting some of the features of the present invention without utilizing other features. Accordingly, those of ordinary skill in the relevant art will recognize that many modifications and adaptations to the present invention are possible and may even be desirable in certain circumstances, and are thus also a part of the present invention.

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading or in any portion of the disclosure may be combined with embodiments illustrated under the same or any other heading or other portion of the disclosure.

Any combination of the elements described herein in all possible variations thereof is encompassed by the invention unless otherwise indicated herein or otherwise clearly contradicted by context.

Unless otherwise expressly stated, it is in no way intended that any method or aspect set forth herein be construed as requiring that its steps be performed in a specific order. Accordingly, where a method claim does not specifically state in the claims or description that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of embodiments described in the specification. It is to be understood that both the foregoing general description and the following detailed description are exemplary and explanatory only and are not restrictive.

All publications mentioned herein are incorporated herein by reference to disclose and describe the methods and/or materials in connection with which the publications are cited.

It is to be understood that the terminology used herein is for the purpose of describing particular aspects only and is not intended to be limiting. Unless defined otherwise, all technical and scientific terms used herein have the same meaning as commonly understood by one of ordinary skill in the art to which this invention belongs. In this specification and in the claims which follow, reference will be made to a number of terms which are defined herein.

As used in the specification and the appended claims, the singular forms "a," "an" and "the" include plural referents unless the context clearly dictates otherwise.

As used herein, the term "and/or" means "and, or as an alternative".

As used herein, the terms "optional" or "optionally" mean that the subsequently described event, condition, component, or circumstance may or may not occur, and that the description includes instances where said event, condition, component, or circumstance occurs and instances where it does not.

As used herein, any disclosures using the word "comprises" or "comprising" includes a similar disclosure, in the alternative, where "comprises" or "comprising" is replaced with "consists" or "consisting", or, in the alternative, is replaced with "consists essentially of" or "consisting essentially of".

As used herein, the phrase "sufficient to" (e.g., "conditions sufficient to") refers to such a value or a condition that is capable of performing the function or property for which a sufficient value or condition is expressed. As will be pointed out below, the exact value or particular condition required may vary from one embodiment to another, depending on recognized variables, such as the materials employed and/or the processing conditions.

The term "by weight," when used in conjunction with a component, unless specifically stated to the contrary, is based on the total weight of the formulation or composition in which the component is included. For example, if a particular element or component in a composition or article is said to be present in an amount of 8% by weight (also written: 8 wt. %), it is understood that this percentage is in relation to a total compositional percentage of 100%. The wt. % of component A in a composition is the weight of component A expressed as a percentage of the total weight of the composition, conventionally written as "wt. % of A, based on the total weight of the composition". In some instances, the weight percent of a component is based on the total weight of the composition "on a dry basis," which indicates the weight of the composition without water (e.g., less than about 1%, less than about 0.5%, less than about 0.1%, less than about 0.05%, or about 0% of water by weight, based on the total weight of the composition).

When disclosing numerical values herein, for example, 1, 2, 3, 4, 5, 6, 7, 8, 9, 10, the following sentence typically follows such numerical values: "Each of the foregoing numbers can be preceded by the term 'about,' 'at least about,' or 'less than about,' and any of the foregoing numbers can be used singly to describe an open-ended range or in combination to describe a close-ended range." This sentence means that each of the aforementioned numbers can be used alone (e.g., 4), can be prefaced with the word "about" (e.g., about 8), prefaced with the phrase "at least about" (e.g., at least about 2), prefaced with the phrase "less than about" (e.g., less than about 7), or used in any combination with or without any of the prefatory words or phrases to define a range (e.g., 2 to 9, about 1 to 4, 8 to about 9, about 1 to about 10, and so on). Moreover, when a range is described as "about X or less," this phrase is the same as a range that is a combination of "about X" and "less than about X" in the alternative. For example, "about 10 or less" is the same as "about 10, or less than about 10." Such interchangeable range descriptions are contemplated herein. Other range formats are disclosed herein, but the difference in formats should not be construed to imply that there is a difference in substance.

As used herein, "continuous" indicates a process that is uninterrupted for its duration, or interrupted, paused, or suspended only momentarily relative to the duration of the process. A process is "continuous" when starting material or reactants are fed into an apparatus without interruption or without a substantial interruption, or processing of said starting material or reactants is not done in a batch process.

As used herein, the term "substantially free of" refers to a composition having less than about 1% by weight, e.g., less than about 0.5% by weight, less than about 0.1% by weight, less than about 0.05% by weight, or less than about 0.01% by weight of the stated material, based on the total weight of the composition.

As used herein, the term "substantially," when used in reference to a composition, refers to at least about 60% by weight, e.g., at least about 65%, at least about 70%, at least about 75%, at least about 80%, at least about 85%, at least about 90%, at least about 91%, at least about 92%, at least about 93%, at least about 94%, at least about 95%, at least about 96%, at least about 97%, at least about 98%, at least about 99%, or about 100% by weight, based on the total weight of the composition, of a specified feature or component.

All molecular weights and other values associated with molecular weights (e.g., polydispersity index, etc.) disclosed herein are measured by Gel Permeation Chromatography (GPC).

As used herein, the terms "molar mass distribution," "MMD," and "molecular weight distribution" are used interchangeably and describe the relationship between the number of moles of each polymer species or a number of polymer chains ($N_i$), and the molar mass ($M_i$) of that species or polymer chain. The molar mass distribution of a polymer may be modified by polymer fractionation. Different average values may be defined depending on the statistical method that is applied and are described herein.

As used herein, the term "number average molecular weight" ($M_n$, or $\overline{M}_n$) refers to the statistical average molecular weight of all the polymer chains in the sample and is defined by the formula:

$$M_n = \frac{\sum N_i M_i}{\sum N_i},$$

where $M_i$ is the molecular weight of a chain and $N_i$ is the number of chains of that molecular weight. $M_n$ may be determined for polymers by methods well known to a person having ordinary skill in the art using molecular weight standards, e.g., polystyrene standards, preferably certified or traceable molecular weight standards.

As used herein, the term "weight-average molecular weight" (Mw, or $\overline{M}w$) is defined by the formula:

$$M_w = \frac{\sum N_i M_i^2}{\sum N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight-average. Thus, the greater the molecular weight of a given chain, the more the chain contributes to the $M_w$. $M_w$ may be determined for polymers by methods well known to a person having ordinary skill in the art using molecular weight standards, e.g., polystyrene standards, preferably certified or traceable molecular weight standards.

As used herein, Gel Permeation Chromatography (GPC) refers to chromatographic separation methods in which molecules in solution are separated by their size. The separation is achieved by the differential exclusion of the sample molecules as they pass through a bed of porous particles, known as a separation column. GPC may be used to determine a substantially accurate molar mass distribution of polymer molecules. For example, the liquid fraction (an eluent) passing though the column is collected in constant volumes. As the polymer elutes through the column, molecules that are too large to penetrate the column pores are excluded from the packing pore volume and elute at earlier retention times, whereas the smaller molecules penetrate into the column pores and elute at a later time. The concentration of eluted polymers may be measured by spectroscopic techniques, such as, for example, refractive index (RI) and ultraviolet (UV). The eluent flow may also be analyzed continuously with RI, Low-Angle Laser Light Scattering (LALLS), Multi-Angle Laser Light Scattering (MALLS), UV, and/or viscosity measurements.

The use of numerical values in the various quantitative values specified in this application, unless expressly indicated otherwise, are stated as approximations as though the minimum and maximum values within the stated ranges were both preceded by the word "about." In this manner, slight variations from a stated value may be used to achieve substantially the same results as the stated value. Also, the disclosure of ranges is intended as a continuous range including every value between the minimum and maximum values recited as well as any ranges that may be formed by such values. Also disclosed herein are any and all ratios (and ranges of any such ratios) that may be formed by dividing a recited numeric value into any other recited numeric value. Accordingly, the skilled person will appreciate that many such ratios, ranges, and ranges of ratios may be unambiguously derived from the numerical values presented herein and in all instances such ratios, ranges, and ranges of ratios represent various embodiments of the present invention.

Herein, "average pore size" refers to an "average pore diameter" measured by mercury intrusion porosimetry (described below, 4V/A according to UOP Method 578-11), as known to those in the art or in the field of mercury intrusion porosimetry. UOP Methods are available from ASTM International, West Conshohocken, Pa., USA (or via www.astm.org). The average is a median average, so this term may also be referred to herein as a "median pore diameter".

As used herein, the term "polypropylene copolymer" means a copolymer comprising a polymer backbone, side chain, or chain segment of polypropylene, specifically such backbone, side chain, or chain segment comprises 15 or more consecutive polymerized units of propylene. As disclosed herein, a preferred PP copolymer comprises polypropylene homopolymer chain segments (e.g. isotactic PP) and ethylene-containing copolymer chain segments. In some embodiments, the ethylene-containing copolymer chain segments are ethylene-propylene (EP) copolymer chain segments; such polypropylene copolymers are, on occasion, herein referred to as PP-EP copolymers.

In some embodiments, the current invention relates to a microporous polymer film comprising one or more polypropylene copolymer (PP copolymer). The PP copolymer may comprise one or more polypropylene homopolymer chain segments and one or more ethylene-containing copolymer chain segments.

In some embodiments, the PP copolymer comprises polypropylene homopolymer chain segments in an amount of at least about 50% by weight, based on the total weight of the PP copolymer, and the maximum amount of the polypropylene homopolymer chain segments is not particularly limited. In the same or other embodiments, the PP copolymer comprises polypropylene homopolymer chain segments in an amount up to about 95% by weight, based on the total weight of the PP copolymer, and the minimum amount of polypropylene homopolymer chain segments is not particularly limited. For example, the PP copolymer can comprise polypropylene homopolymer chain segments in an amount (in weight %, based on the weight of the PP copolymer) of 44, 46, 48, 50, 52, 54, 56, 58, 60, 62, 64, 65, 66, 68, 70, 72, 74, 76, 78, 80, 82, 84, 86, 88, 90, 95%. Each of the foregoing numbers can be preceded by the word "about," "at least about," or "less than about," and any of the foregoing numbers can be used singly to describe an open-ended range or in combination to describe a closed-ended range. For example, and without limitation, the amount of polypropylene homopolymer chain segments in the PP copolymer can be at least about 50% by weight, about 50% by weight to about 82% by weight, or from about 60% by weight to about 82%, by weight based on the total weight of the PP copolymer. If viewed from the perspective of mole %, the PP copolymer can comprise polypropylene homopolymer chain segments in an amount (in mole %, based on the mole content of polymerized units of propylene in the polypropylene homopolymer chain segments as a percentage of the total mole content of polymerized monomer units in the PP copolymer) of 40, 42, 43, 44, 45, 46, 47, 48, 49, 50, 52, 54, 55, 56, 58, 60, 62, 64, 66, 68, 70, 72, 74, 76, 78, 79, 80, 82, or 85%. Each of the foregoing numbers can be preceded by the word "about," "at least about," or "less than about," and any of the foregoing numbers can be used singly to describe an open-ended range or in combination to describe a closed-ended range. For example, and without limitation, the amount of polypropylene homopolymer chain segments in the PP copolymer can be at least about 43 mole %, about 43 mole % to about 79 mole %, or from about 50 mole % to about 79 mole %, based on the mole content of polymerized units of propylene in the polypropylene homopolymer chain segments as a percentage of the total mole content of polymerized monomer units in the PP copolymer.

In some embodiments, the PP copolymer comprises ethylene-containing copolymer chain segments in an amount of at least about 5% by weight, based on the total weight of the PP copolymer, and the maximum amount of the ethylene-containing copolymer chain segments is not particularly limited. In the same or other embodiments, the PP copolymer comprises ethylene-containing copolymer chain segments in an amount up to about 50% by weight, based on the total weight of the PP copolymer, and the minimum amount of ethylene-containing copolymer chain segments is not particularly limited. For example, the PP copolymer can comprise ethylene-containing copolymer chain segments in an amount (in weight %, based on the weight of the PP copolymer) of 5, 10, 15, 17, 18, 19, 20, 22, 24, 26, 28, 30, 32, 34, 36, 38, 40, 42, 44, 46, 48, 50, 52, 54, or 55%. Each of the foregoing numbers can be preceded by the word "about," "at least about," or "less than about," and any of the foregoing numbers can be used singly to describe an open-ended range or in combination to describe a closed-ended range. For example, and without limitation, the amount of ethylene-containing copolymer chain segments in the PP copolymer can be at least about 10% by weight, about 18% by weight to about 50% by weight, or from about 25% by weight to about 40%, by weight based on the total weight of the PP copolymer. Preferably, the ethylene-containing copolymer chain segments in the PP copolymer are ethylene-propylene (EP) copolymer chain segments. If viewed from the perspective of mole %, the PP copolymer can comprise ethylene-containing copolymer chain segments in an amount (in mole %, based on the mole content of polymerized monomer units in the ethylene-containing copolymer chain segments as a percentage of the total mole content of polymerized monomer units in the PP copolymer) of 10, 15, 17, 18, 19, 20, 21, 22, 24, 26, 28, 30, 32, 34, 36, 38, 40, 42, 44, 46, 48, 50, 52, 54, 55%, 57, or 60%. Each of the foregoing numbers can be preceded by the word "about," "at least about," or "less than about," and any of the foregoing numbers can be used singly to describe an open-ended range or in combination to describe a closed-ended range. For example, and without limitation, the amount of ethylene-containing copolymer chain segments in the PP copolymer can be at least about 15 mole %, about 21 mole % to about 57 mole %, or from about 21 mole % to about 45 mole %, based on the mole content of polymerized monomer units in the ethylene-containing copolymer chain segments as a percentage of the total mole content of polymerized monomer units in the PP copolymer.

In some embodiments, the ethylene-containing copolymer chain segments in the PP copolymer comprise at least 45% by weight of polymerized units of ethylene based on the total weight of the ethylene-containing copolymer chain segments, and the maximum amount of ethylene in the ethylene-containing copolymer chain segments is not particularly limited. For example, the ethylene unit content in the ethylene-containing copolymer chain segments in the PP copolymer may be in an amount (in weight %, based on the weight of the ethylene-containing copolymer chain segments) of 40, 42, 44, 45, 46, 47, 48, 49, 50, 52, 54, 56, 58, 60, 62, 64, 66, 68, 70, 72, 75, or 80%. Each of the foregoing numbers can be preceded by the word "about," "at least about," or "less than about," and any of the foregoing numbers can be used singly to describe an open-ended range or in combination to describe a closed-ended range. For example, and without limitation, the amount of ethylene units in the ethylene-containing copolymer chain segments in the PP copolymer can be at least about 45% by weight, about 45% by weight to about 80% by weight, or from about 45% by weight to about 60% by weight, based on the total weight of the ethylene-containing copolymer chain segments. If viewed from the perspective of mole %, the ethylene unit content in the ethylene-containing copolymer chain segments in the PP copolymer may be in an amount (in mole %, based on the mole content of polymerized units of ethylene in the ethylene-containing copolymer chain segments as a percentage of the total mole content of polymerized monomer units in the ethylene-containing copolymer chain segments) of 50, 52, 54, 55, 56, 57, 58, 59, 60, 62, 64, 66, 68, 70, 72, 74, 76, 78, 80, 82, 85, or 90%. Each of the foregoing numbers can be preceded by the word "about," "at least about," or "less than about," and any of the foregoing numbers can be used singly to describe an open-ended range or in combination to describe a closed-ended range. For example, and without limitation, the amount of ethylene units in the ethylene-containing copolymer chain segments in the PP copolymer can be at least about 55 mole %, about 55 mole % to about 80 mole %, or from about 55 mole % to about 69 mole %, based on the mole content of polymerized units of ethylene in the ethylene-containing copolymer chain segments as a percentage of the total mole content of polymerized monomer units in the ethylene-containing copolymer chain segments. Preferably, the ethylene-containing copolymer chain segments in the PP copolymer are ethylene-propylene (EP) copolymer chain segments, in which case, the above percentages refer to the % ethylene unit content (either wt. %, or mol. %, as described above) in the EP copolymer chain segments.

The total ethylene content in polymerized form in the PP copolymer is at least 10 wt. %, such as, for example, 10-30 wt. %, or even 15-25 wt. %, based on the weight of the PP copolymer, or at least 14 mole %, such as, for example, 14-39 mole %, or even 15-25 mole %, based on the mole content of polymerized units of ethylene in the PP copolymer as a percentage of the total mole content of polymerized monomer units in the PP copolymer.

The microporous polymer film may consist essentially of one or more polypropylene copolymer (PP copolymer), wherein the PP copolymer comprises one or more polypropylene homopolymer chain segments and one or more ethylene-containing copolymer chain segments. Accordingly, in at least some embodiments, the same quantities and ranges outlined above for polypropylene homopolymer chain segments and ethylene-containing copolymer chain segments in the PP copolymer are also appropriate for the quantities and ranges of polypropylene homopolymer chain segments and ethylene-containing copolymer chain segments in the microporous polymer film.

In some embodiments, the microporous polymer film comprises polypropylene homopolymer chain segments in an amount of at least about 50% by weight, based on the total weight of the microporous polymer film, and the maximum amount of the polypropylene homopolymer chain segments is not particularly limited. In the same or other embodiments, the microporous polymer film comprises polypropylene homopolymer chain segments in an amount up to about 95% by weight, based on the total weight of the microporous polymer film, and the minimum amount of polypropylene homopolymer chain segments is not particularly limited. For example, the microporous polymer film can comprise polypropylene homopolymer chain segments in an amount (in weight %, based on the weight of the microporous polymer film) of 44%, 46%, 48%, 50%, 52%, 54%, 56%, 58%, 60%, 62%, 64%, 66%, 68%, 70%, 72%, 74%, 76%, 78%, 80%, 82%, 84%, 86%, 88%, 90%, 95%. Each of the foregoing numbers can be preceded by the word "about," "at least about," or "less than about," and any of the foregoing numbers can be used singly to describe an open-ended range or in combination to describe a closed-ended range. For example, and without limitation, the amount of polypropylene homopolymer chain segments in the microporous polymer film can be at least about 50% by weight, about 50% by weight to about 82% by weight, or from about 60% by weight to about 82%, by weight based on the total weight of the microporous polymer film. If viewed from the perspective of mole %, the microporous polymer film can comprise polypropylene homopolymer chain segments in an amount (in mole %, based on the mole content of polymerized units of propylene in the polypropylene homopolymer chain segments as a percentage of the total mole content of polymerized monomer units in the microporous polymer film) of 40, 42, 43, 44, 45, 46, 47, 48, 49, 50, 52, 54, 55, 56, 58, 60, 62, 64, 66, 68, 70, 72, 74, 76, 78, 79, 80, 82, or 85%. Each of the foregoing numbers can be preceded by the word "about," "at least about," or "less than about," and any of the foregoing numbers can be used singly to describe an open-ended range or in combination to describe a closed-ended range. For example, and without limitation, the amount of polypropylene homopolymer chain segments in the microporous polymer film can be at least about 43 mole %, about 43 mole % to about 79 mole %, or from about 50 mole % to about 80 mole %, based on the mole content of polymerized units of propylene in the polypropylene homopolymer chain segments as a percentage of the total mole content of polymerized monomer units in the microporous polymer film.

The polypropylene homopolymer chain segments present in the microporous polymer film may derive solely from the PP copolymer component, or may be a combination of polypropylene homopolymer chain segments derived from the PP copolymer component and one or more other polymer component comprising polypropylene homopolymer chain segments (either a PP homopolymer or another copolymer comprising polypropylene homopolymer chain segments). Preferably, the polypropylene homopolymer chain segments present in the microporous polymer film derive solely from the PP copolymer component.

In some embodiments, the microporous polymer film comprises ethylene-containing copolymer chain segments in an amount of at least about 5% by weight, based on the total weight of the microporous polymer film, and the maximum amount of the ethylene-containing copolymer chain segments is not particularly limited. In the same or other embodiments, the microporous polymer film comprises ethylene-containing copolymer chain segments in an amount up to about 60% by weight, based on the total weight of the microporous polymer film, and the minimum amount of ethylene-containing copolymer chain segments is not particularly limited. For example, the microporous polymer film can comprise ethylene-containing copolymer chain segments in an amount (in weight %, based on the weight of microporous polymer film) of 5, 10, 15, 17, 18, 19, 20, 22, 24, 26, 28, 30, 32, 34, 36, 38, 40, 42, 44, 46, 48, 50, 52, 54, 55, 56, 58, or 60%. Each of the foregoing numbers can be preceded by the word "about," "at least about," or "less than about," and any of the foregoing numbers can be used singly to describe an open-ended range or in combination to describe a closed-ended range. For example, and without limitation, the amount of ethylene-containing copolymer chain segments in the microporous polymer film can be at least about 10% by weight, about 18% by weight to about 50% by weight, or from about 25% by weight to about 40%, by weight based on the total weight of the microporous polymer film. If viewed from the perspective of mole %, the microporous polymer film can comprise ethylene-containing copolymer chain segments in an amount (in mole %, based on the mole content of polymerized monomer units in the ethylene-containing copolymer chain segments as a percentage of the total mole content of polymerized monomer units in the microporous polymer film) of 10, 15, 17, 18, 19, 20, 21, 22, 24, 26, 28, 30, 32, 34, 36, 38, 40, 42, 44, 46, 48, 50, 52, 54, 55, 57, or 60%. Each of the foregoing numbers can be preceded by the word "about," "at least about," or "less than about," and any of the foregoing numbers can be used singly to describe an open-ended range or in combination to describe a closed-ended range. For example, and without limitation, the amount of ethylene-containing copolymer chain segments in the microporous polymer film can be at least about 15 mole %, about 21 mole % to about 57 mole %, or from about 20 mole % to about 45 mole %, based on the mole content of polymerized monomer units in the ethylene-containing copolymer chain segments as a percentage of the total mole content of polymerized monomer units in the microporous polymer film.

The ethylene-containing copolymer chain segments present in the microporous polymer film may derive solely from the PP copolymer component, or may be a combination of ethylene-containing copolymer chain segments derived from the PP copolymer component and one or more other polymer component comprising ethylene-containing copolymer chain segments (for example, an EP copolymer). Preferably, the ethylene-containing copolymer chain segments present in the microporous polymer film derive solely from the PP copolymer component. Preferably, the ethylene-containing copolymer chain segments are ethylene-propylene (EP) copolymer chain segments.

In some embodiments, the ethylene-containing copolymer chain segments in the microporous polymer film comprise at least 45% by weight of polymerized units of ethylene based on the total weight of the ethylene-containing copolymer chain segments, and the maximum amount of ethylene in the ethylene-containing copolymer chain segments is not particularly limited. For example, the ethylene unit content in the ethylene-containing copolymer chain segments in the microporous polymer film may be in an amount (in weight %, based on the weight of the ethylene-containing copolymer chain segments) of 40, 42, 44, 45, 46, 47, 48, 49, 50, 52, 54, 56, 58, 60, 62, 64, 66, 68, 70, 72, 75, or 80%. Each of the foregoing numbers can be preceded by the word "about," "at least about," or "less than about," and any of the foregoing numbers can be used singly to describe an open-ended range or in combination to describe a closed-ended range. For example, and without limitation, the amount of ethylene units in the ethylene-containing copolymer chain segments in the microporous polymer film can be at least about 45% by weight, about 45% by weight to about 80% by weight, or from about 45% by weight to about 60% by weight, based on the total weight of the ethylene-containing copolymer chain segments. If viewed from the perspective of mole %, the ethylene unit content in the ethylene-containing copolymer chain segments in the microporous polymer film may be in an amount (in mole %, based on the mole content of polymerized units of ethylene in the ethylene-containing copolymer chain segments as a percentage of the total mole content of polymerized monomer units in the ethylene-containing copolymer chain segments) of 50, 52, 54, 55, 56, 57, 58, 59, 60, 62, 64, 66, 68, 70, 72, 74, 76, 78, 80, 82, 85, or 90%. Each of the foregoing numbers can be preceded by the word "about," "at least about," or "less than about," and any of the foregoing numbers can be used singly to describe an open-ended range or in combination to describe a closed-ended range. For example, and without limitation, the amount of ethylene units in the ethylene-containing copolymer chain segments in the microporous polymer film can be at least about 55 mole %, about 55 mole % to about 80 mole %, or from about 55 mole % to about 69 mole %, based on the mole content of polymerized units of ethylene in the ethylene-containing copolymer chain segments as a percentage of the total mole content of polymerized monomer units in the ethylene-containing copolymer chain segments. Preferably, the ethylene-containing copolymer chain segments in the PP copolymer are ethylene-propylene (EP) copolymer chain segments, in which case, the above percentages refer to the % ethylene unit content (either wt. %, or mol. %, as described above) in the EP copolymer chain segments.

The total ethylene content in polymerized form in the microporous polymer film is at least 10 wt. %, such as, for example, 10-30 wt. %, or even 15-25 wt. %, based on the weight of the microporous polymer film, or at least 14 mole %, such as, for example, 14-39 mole %, or even 15-25 mole %, or 21-33 mole %, based on the mole content of polymerized units of ethylene in the microporous polymer film as a percentage of the total mole content of polymerized monomer units in the microporous polymer film.

In certain embodiments, these PP copolymers may be produced from one or more constituent PP homopolymer and one or more constituent ethylene-containing copolymer in a reactor. Preferably, the ethylene-containing copolymer is an ethylene-propylene (EP) copolymer. Accordingly, the invention provides a microporous polymer film comprising a polypropylene copolymer produced from the reaction product of a polypropylene homopolymer and an ethylene-propylene copolymer.

In certain embodiments for which the ethylene-containing copolymer is an ethylene-propylene (EP) copolymer, the microporous film may consist essentially of a PP-EP copolymer, comprising one or more polypropylene homopolymer chain segments and one or more ethylene-propylene copolymer chain segments. In certain such embodiments, a weight ratio of the PP component to the EP component may be 50:50, 55:45, 60:40, 65:35, 67:33, 70:30, 72:28, 74:26, 76:24, 78:22, 79:21, 80:20, 81:19, 82:18, 84:16, 86:14, 88:12, 90:10, or 95:5. Each of the foregoing numbers can be preceded by the word "about," "at least about," or "less than about," and any of the foregoing numbers can be used singly to describe an open-ended range or in combination to describe a closed-ended range. For example, the weight ratio can be at least about 60:40, about 65:35 to about 85:15, or less than about 90:10.

The ethylene-containing copolymer may be a random copolymer, an alternating copolymer, or a block copolymer; and an ethylene-propylene copolymer may be a random EP copolymer, an alternating EP copolymer, or an EP block copolymer. For example, a PP copolymer comprising an EP copolymer backbone or chain segment, may comprise a random EP copolymer backbone or chain segment, an alternating EP copolymer backbone or chain segment, or a diblock copolymer backbone or chain segment. For example, the diblock copolymer may comprise a polypropylene block and a polyethylene block, or a polypropylene block and an EP copolymer block, or a polyethylene block and an EP copolymer block. Other ethylene-containing copolymers may also be used.

Films may be produced from the PP copolymer or polymer blends thereof by any method known in the art, most conveniently by heating to a temperature sufficient to obtain the PP copolymer (or blend thereof) in molten form, followed by extrusion or film blowing. In some embodiments, the film may be a multilayer film. The multilayer film may be coextruded, whereby a first layer is coextruded to a second layer.

Prior to stretching, the non-porous polymer film may have a morphology that features a majority polypropylene phase (or matrix) and minority polymer domains of ethylene-containing copolymer, such as ethylene-propylene copolymer domains, in the polymer film and an inclusion phase of the major polypropylene phase within the minority polymer domain, which enables effective transfer of stretching force from the major phase to minor domains to break up minor domains, and then initiate and grow micropores by stretching. Accordingly, the non-porous films disclosed herein may undergo a stretching process (described herein) to produce microporous films.

In an embodiment, the microporous films described herein are oriented in the machine direction. The microporous films may be oriented by cold stretching in the machine direction, and after the cold stretch, hot stretching in the machine direction. Alternatively, or in addition, either one or more cold stretch and/or one or more hot stretch may be performed in any other direction, such as, for example, the transverse direction (cross machine direction). The cold stretch percentage may be from 25% to 150% and is determined using equation I:

$$\frac{\text{Total Length after Cold Stretching} - \text{Initial Film Length}}{\text{Initial Film Length}} \times 100\%$$

The cold stretch may be performed at a temperature ranging from 10° C. to 50° C., but is typically performed at room temperature. Unless clarified to the contrary, the cold stretch is performed at room temperature. Herein, "room temperature" is considered to be at a temperature of from 15° C. to 25° C. (and more typically, between 20-23° C.). The hot stretch percentage may be from 50% to 500%, and is determined using equation II:

$$\frac{\text{Total Length after Hot Stretching} - \text{Total Length after Cold Stretching}}{\text{Total Length after Cold Stretching}} \times 100\%.$$

The hot stretch may be performed at a temperature ranging from 90° C. to 140° C.

In some embodiments, a method of manufacturing a microporous film comprises providing a microporous film as described herein, cold stretching the film in the machine direction to a cold stretch percentage of from 25% to 200% at a temperature ranging from −20° C. to 50° C., preferably 10° C. to 50° C. The cold stretch percentage is determined using equation I above. After the cold stretch, the film is subjected to hot stretching in the machine direction to a hot stretch ratio of from 50% to 500% at a temperature ranging from 50° C. to 150° C., preferably 90° C. to 140° C., or 100° C. to 140° C. The hot stretch percentage is determined using equation II above.

In an embodiment, the stretching process comprises one or more than one cold stretching step(s), optionally with one or more heat setting step(s), followed by one or more than one hot stretching steps. The process may optionally include a post-annealing step. Film uniformity is important, and accordingly, it is preferred to keep the temperature below 150° C.

In an embodiment, the stretching process may take place as the film travels along a manufacturing line, which may include a series of rollers. The degree of stretching in the machine direction may be controlled by the use of differential speeds of the rollers or by differentiated sizes (diameters) of the rollers. Optionally, a degree of stretching in the transverse direction may be performed, which may be controlled by stretching the film in the transverse (cross) direction between a series of clips that grip the edges of the web and traverse down a pair of adjustable diverging rails. The polymer film at the front end of the manufacturing line may appear clear and colorless (before stretching), but may be seen to transition with increasing opacity as it moves along the production line, including along regions where the stretching process is occurring, so that a white haze develops and then the film turns white due to the formation of pores (and the related light scattering effect from the void space).

The process of stretching non-porous films to produce microporous films has previously been reported (see, for example, U.S. Pat. No. 3,801,404 to Druin et al., and U.S. Pat. No. 3,426,754 to Bierenbaum et al.), but these reported processes using polyethylene or polypropylene films require an annealing step prior to the stretching process (or at a point intermediate between separate film stretching stages), sometimes in conjunction with a separate heat-setting step after the stretching process. However, extended annealing times are problematic from the perspective of the desired objective to run a continuous manufacturing line to produce microporous films. Ideally, one would prefer a continuous extrusion and pore formation process in one continuous production line, without requiring a hold period for an extended annealing step. Advantageously, the films produced from the PP copolymers (and blends thereof) described herein do not require any annealing step or heat setting step in order to produce microporous films from the stretching process (the mechanism of the pore formation in the present case differs from that of the previously reported polyethylene and polypropylene films). Accordingly, the PP copolymers described herein can be heated and extruded to form non-porous films which may be stretched on a continuous manufacturing line to produce microporous films.

In certain embodiments, the invention described herein relates to a microporous polymer film comprising: one or more polypropylene copolymer, said polypropylene copolymer comprising one or more polypropylene homopolymer chain segments and one or more ethylene-containing copolymer chain segments; and wherein the microporous polymer film comprises: (i) polypropylene homopolymer chain segments in total amount of from 50-82 wt. %, based on the weight of the microporous polymer film, or from 43-79 mole %, based on the mole content of polymerized units of propylene in the polypropylene homopolymer chain segments as a percentage of the total mole content of polymerized monomer units in the microporous polymer film; and (ii) ethylene-containing copolymer chain segments in total amount of from 18-50 wt. %, based on the weight of the microporous polymer film, or from 21-57 mole %, based on the mole content of polymerized monomer units in the ethylene-containing copolymer chain segments as a percentage of the total mole content of polymerized monomer units in the microporous polymer film; wherein at least a portion of the ethylene-containing copolymer chain segments comprise polymerized units of ethylene in an amount of at least 45 wt. %, based on the weight of the ethylene-containing copolymer chain segments, or at least 55 mole % based on the mole content of polymerized units of ethylene in the ethylene-containing copolymer chain segments as a percentage of the total mole content of polymerized monomer units in the ethylene-containing copolymer chain segments.

In an embodiment, there is disclosed a method of forming a microporous polymer film, said method steps comprising: (a) providing one or more polypropylene copolymer comprising: (i) one or more polypropylene homopolymer chain segments in total amount of from 50-82 wt. %, based on the weight of polypropylene copolymer, or from 43-79 mole %, based on the mole content of polymerized units of propylene in the polypropylene homopolymer chain segments as a percentage of the total mole content of polymerized monomer units in the polypropylene copolymer; and (ii) one or more ethylene-containing copolymer chain segments in total amount of from 18-50 wt. %, based on the weight of polypropylene copolymer, or from 21-57 mole %, based on the mole content of polymerized monomer units in the ethylene-containing copolymer chain segments as a percentage of the total mole content of polymerized monomer units in the polypropylene copolymer; wherein at least a portion of the ethylene-containing copolymer chain segments comprises polymerized units of ethylene in an amount of at least 45 wt. %, based on the weight of the ethylene-containing copolymer chain segments, or at least 55 mole % based on the mole content of polymerized units of ethylene in the ethylene-containing copolymer chain segments as a percentage of the total mole content of polymerized monomer units in the ethylene-containing copolymer chain segments; (b) forming a non-porous film comprising the polypropylene copolymer, and (c) subjecting the non-porous film to sequential cold and hot stretching steps comprising: (i) at least one cold stretching step at a temperature in a range of from −20° C. to 50° C.; and (ii) at least one hot stretching step at a temperature in a range of from 50° C. to 150° C., thereby producing a microporous polymer film.

In some embodiments, the method is a continuous process to produce a microporous polymer film. Specifically, in some embodiments, the method proceeds in the absence of any annealing step after formation of the non-porous film and proceeds in the absence of any annealing or heat setting step after formation of the microporous polymer film and is a continuous process to produce a microporous polymer film.

The invention is also directed to the microporous film produced by the methods described herein, and further directed to articles produced from the microporous films described herein.

The overall thickness of the microporous film is not particularly limited, but, in some embodiments, may be less than 2.54 mm (100 mils). Different end-use applications may require a different film thickness, or conversely, a different film thickness may be more suitable for some end-uses. For example, the microporous films suitable for use as house wrap may have a thickness of 51-254 μm (2-10 mils), preferably 102-178 μm (4-7 mils). The microporous films suitable for use as roof membranes in Europe may have a thickness of 102-508 μm (of 4-20 mils), preferably 127-254 μm (5-10 mils), or, suitable for use as roof membranes in North America may have a thickness of 508-2032 μm (20-80 mils), preferably 1016-1524 μm (40-60 mils). And, microporous films suitable for medical uses, such as packaging wrap for surgical packs, may have a thickness in the range of 51-508 μm (2-20 mils), for example 127-254 μm (5-10 mil) thickness.

The film thickness may be dependent on the end-use application of the microporous film, as discussed herein, all of which thicknesses and ranges of thicknesses are considered suitable for the microporous films of this invention. Accordingly, all individual values and subranges of less than 2540 μm (100 mils) are included and disclosed herein. For example, in some embodiments, the overall thickness of the microporous film (in μm) may be 2540, 2032, 1524, 1270, 1016, 762, 508, 381, 254, 203, 178, 152, 127, 102, 51, 38, 25, 13, or 2.5 μm. Each of the foregoing numbers can be preceded by the word "about," "at least about," or "less than about," and any of the foregoing numbers can be used singly to describe an open-ended range or in combination to describe a closed-ended range. In further embodiments, the overall thickness of the microporous film may be from 2.5 to 152.4 μm (0.1 to 6 mils), from 2.5 to 102 μm (0.1 to 4 mils), from 2.5 to 50.8 μm (0.1 to 2 mils). In even further embodiments, the overall thickness of the film may be from 2.5 to 38.1 μm (0.1 to 1.5 mils).

The films described herein are microporous having a certain pore size and porosity which may be varied to control useful barrier properties as desired for the chosen end-use. The same types of barrier properties are important for house wrap films and roof membranes, such as, for example, water vapor transmission rate (WVTR) and permeance. Water vapor transmission rates are dependent on film thickness. Permeance is, in effect (assuming a constant pressure differential across the film when comparing different film samples), a normalized water vapor transmission rate, recording a film thickness-adjusted WVTR; all "perms" herein are US perms. 1 US perm=$5.72 \times 10^{-8}$ g/Pa·s·m². For building wrap applications, a suitable average pore diameter (nm) may be 30-300 nm, and a suitable film porosity may be 25-55% to achieve a water vapor permeance of 10-100 perms (and WVTR may be in a range of 70-700 grams/24 h·m²). And, for roof membranes, a suitable median average pore diameter (nm) may be 30-250 nm, and a suitable film porosity may be 25-45% to achieve a permeance of 10-70 perms (and WVTR may be in a range of 70-500 grams/24 h·m²). The same barrier properties are important in the medical packaging area, although the focus for permeability is directed to air (or gaseous sterilant) permeability, which is usually measured as the Gurley air permeability, and a barrier to bacteria/microorganisms, which is measured by the maximum penetration (calculated % $P_{max}$) in the ASTM F2638 test (for porous packaging as a surrogate microbial barrier). For medical packaging, a suitable average pore diameter (nm) may be 300-1,000 nm, and a suitable film porosity may be 55-75% to achieve a Gurley air permeability in a useful range of 1-100 s/100 cm³, and a calculated % $P_{max}$ value of less than 10 (and, for $P_{max}$, the smaller the better).

In some embodiments, the microporous polymer film has a porosity of at least about 20% and the maximum porosity is not particularly limited. In the same or other embodiments, the microporous polymer film has a porosity of up to about 75% and the minimum porosity is not particularly limited. For example, the microporous polymer film may have a porosity (in %) of 10, 15, 20, 25, 30, 35, 40, 45, 50, 55, 60, 65, 70, 75, 80%. Each of the foregoing numbers can be preceded by the word "about," "at least about," or "less than about," and any of the foregoing numbers can be used singly to describe an open-ended range or in combination to describe a closed-ended range. For example, and without limitation, the microporous polymer film can have a porosity of at least about 20%, about 20% to about 75%, or from about 25% to about 70%.

In some embodiments, the microporous polymer film has a median average pore diameter (by volume) of at least about 20 nm and the maximum median pore diameter is not particularly limited. In the same or other embodiments, the microporous polymer film has a median pore diameter of up to about 2000 nm and the minimum median pore diameter is not particularly limited. For example, the microporous polymer film may have a median pore diameter (in nm) of 10, 15, 20, 25, 30, 40, 50, 60, 70, 80, 90, 100, 150, 200, 250, 300, 350, 400, 450, 500, 600, 700, 800, 900, 1000, 1500, 2000 nm. Each of the foregoing numbers can be preceded by the word "about," "at least about," or "less than about," and any of the foregoing numbers can be used singly to describe an open-ended range or in combination to describe a closed-ended range. For example, and without limitation, the microporous polymer film can have a median pore diameter of at least about 20 nm, about 20 nm to about 1000 nm, or from about 25 nm to about 1000 nm.

In some embodiments, the microporous polymer film has a permeance of at least about 1 perm and the maximum permeance is not particularly limited. In the same or other embodiments, the microporous polymer film has a permeance up to about 150 perms and the minimum permeance is not particularly limited. For example, the microporous polymer film may have a permeance (in perms) of 5, 10, 15, 20, 25, 30, 35, 40, 45, 50, 55, 60, 65, 70, 75, 80, 85, 90, 95, 100, 110, 120, 130, 140, or 150 perms. Each of the foregoing numbers can be preceded by the word "about," "at least about," or "less than about," and any of the foregoing numbers can be used singly to describe an open-ended range or in combination to describe a closed-ended range. For example, and without limitation, the microporous polymer film can have a permeance of at least about 10 perms, about 10 perms to about 100 perms, or from about 20 perms to about 100 perms.

In some embodiments, the microporous polymer film has a Gurley Hill Porosity (referred to herein as "Gurley air permeability") of at least about 1 s/100 cm$^3$ and the maximum Gurley air permeability is not particularly limited. In the same or other embodiments, the microporous polymer film has a Gurley air permeability up to about 35000 s/100 cm$^3$ and the minimum Gurley air permeability is not particularly limited. For example, the microporous polymer film may have a Gurley air permeability (s/100 cm$^3$) of 1, 5, 10, 15, 20, 25, 30, 35, 40, 45, 50, 55, 60, 65, 70, 75, 80, 85, 90, 95, 100, 110, 120, 130, 140, or 150, 200, 300, 400, 500, 600, 700, 800, 900, 1000, 1500, 2000, 3000, 4000, 5000, 6000, 7000, 8000, 9000, 10000, 15000, 20000, 25000, 30000, 35000 s/100 cm$^3$. Each of the foregoing numbers can be preceded by the word "about," "at least about," or "less than about," and any of the foregoing numbers can be used singly to describe an open-ended range or in combination to describe a closed-ended range. For example, and without limitation, the microporous polymer film can have a Gurley air permeability of at least about 1 s/100 cm$^3$, about 1 s/100 cm$^3$ to about 10000 s/100 cm$^3$, or from about 10 s/100 cm$^3$ to about 5000 s/100 cm$^3$, or from about 10 s/100 cm$^3$ to about 1000 s/100 cm$^3$, or from about 10 s/100 cm$^3$ to about 100 s/100 cm$^3$.

In some embodiments, the microporous polymer film has a barrier to microorganisms, as measured by the calculated % maximum penetration (% $P_{max}$) in the ASTM F2638-18 test, of less than about 10 and the minimum calculated % $P_{max}$ is not particularly limited. For example, the microporous polymer film may have a calculated % $P_{max}$ of less than 10, 5, 2, 1, 0.5, 0.2, 0.1, 0.05, 0.03, 0.02, 0.015, 0.010, 0.005. Each of the foregoing numbers can be preceded by the word "about," "at least about," or "less than about," and any of the foregoing numbers can be used singly to describe an open-ended range or in combination to describe a closed-ended range. For example, and without limitation, the microporous polymer film can have a calculated % $P_{max}$ of less than about 10, about 0 to about 10, or from about 0 to about 1. Ideally, the calculated % $P_{max}$ value would be zero, although the limit to detection cannot be zero. Calculated % $P_{max}$ may be from about 0.005 or lower to about 10, or from about 0.005 or lower to about 5, or from about 0.005 or lower to about 1.

The films described herein do not use the addition of fillers like calcium carbonate, $CaCO_3$, in order to make moisture breathable films of high water vapor permeance. Accordingly, the films described herein comprise less than 5 wt. % of fillers, based on the total weight of polymers present in the film. Exemplary fillers may include, but are not limited to, $CaCO_3$, clay, silica, alumina, titania, zirconia, ceria, talc, magnesium carbonate, calcium sulfate, barium sulfate, porous glass beads, porous polymeric beads, ceramic beads, aluminum trihydroxide, magnesium trihydroxide, wollastonite whiskers, wood flour, lignin, starch, clay, carbon black, graphite, graphene, carbon nanotube, carbon fibers, carbon nanofibers, or a combination thereof. In further embodiments, the films described herein comprise less than 3 wt. % less than 2 wt. %, less than 1 wt. %, or less than 0.5 wt. % of fillers, based on the total weight of polymers present in the film. In some embodiments, the films described herein contain no fillers (0 wt. %). In many pharmaceutical applications, 0 wt. % filler is preferred, since such films minimize the possibility of particulate contamination and particle shedding of the film.

The films described herein may incorporate UV stabilizers, especially if the intended use may include outdoor applications. Representative UV stabilizer additives include ultraviolet light absorbers, such as Tinuvin® 329 (BASF, Ludwigshafen, Germany), and hindered-amine light stabilizers, such as Tinuvin® 770 or Chimassorb® 2020 (both also BASF). For example, an effective UV stabilizer package for microporous films of the polypropylene copolymer PP C7054-07NA may include a combination of: 0.75 wt % Chimassorb® 2020, 0.25 wt % Tinuvin® 770, 0.25 wt % Tinuvin® 329, and 0.15 wt % Irganox® B215 (antioxidant, also BASF). PP C7054-07NA microporous films without UV additives turned into powders after 8 weeks of UV aging test at 50° C. In contrast, PP C7054-07NA microporous films with the above UV additive package did not show any visual defects such as cracking, yellowing or deformation after 8 weeks of UV aging test at 50° C.

The films described herein may incorporate other additives, such as, antioxidants (e.g., hindered phenolics, such as, IRGANOX® 1010 or IRGANOX® 1076, supplied by Ciba Geigy), phosphites (e.g., IRGAFOS® 168, also supplied by Ciba Geigy), processing aids, uv light stabilizers, thermal stabilizers, pigments, colorants, anti-stat additives, flame retardants, slip agents, antiblock additives, biocides, antimicrobial agents, and clarifiers/nucleators (e.g., HYPERFORM® HPN-20E, MILLAD® 3988, MILLAD® NX 8000, available from Milliken Chemical). The other additives can be included in the film at levels typically used in the art to achieve their desired purpose. In some examples, the one or more additives are included in amounts ranging from 0-10 wt. %, based on total polymer weight of the film, or 0-5 wt. %, 0.001-5 wt. %, 0.001-3 wt. %, 0.05-3 wt. %, or 0.05-2 wt. %, based on total polymer weight of the film. In embodiments herein, where fillers have other uses, e.g., colorants or pigments, they will still be present in a total amount of less than 5 wt. %.

Also described herein are laminates. The laminates comprise a microporous film as previously described herein, and a nonwoven substrate at least partially bonded to the film. As used herein, "nonwoven substrates" include nonwoven webs, nonwoven fabrics and any nonwoven structure in which individual fibers or threads are interlaid, but not in a regular or repeating manner. Nonwoven substrates described herein may be formed by a variety of processes, such as, for example, air laying processes, meltblowing processes, spunbonding processes and carding processes, including bonded carded web processes. The nonwoven web may comprise a single web, such as a spunbond web, a carded web, an airlaid web, a spunlaced web, or a meltblown web. However, because of the relative strengths and weaknesses associated with the different processes and materials used to make nonwoven fabrics, composite structures of more than one layer may be used in order to achieve a better balance of properties. Such structures are often identified by letters designating the various layers, such as, SM for a two-layer structure consisting of a spunbond layer and a meltblown layer, SMS for a three-layer structure, or more generically SXnS structures, where S is a spunbond layer, and X can be independently a spunbond layer, a carded layer, an airlaid layer, a spunlaced layer, or a meltblown layer and n can be any number, although for practical purposes is generally less than 5. In order to maintain structural integrity of such composite structures, the layers must be bonded together. Common methods of bonding include thermal calendar point bonding, adhesive lamination, ultrasonic bonding, and other methods known to those skilled in the art. All of these structures may be used in the present invention, particularly incorporated with the microporous film in the form of a laminate.

The microporous films described herein should find use in housing and construction as a barrier layer for the building envelope, such as, for example, housewrap and roofing membrane.

Also described herein are articles. The articles comprise a film or a laminate as previously described herein. In some embodiments, a breathable backsheet comprises a microporous film as previously described herein. In other embodiments, a breathable backsheet comprises a laminate. The articles may be used in a variety of hygiene and medical applications. In some embodiments, the articles may include diapers, training pants, and adult incontinence articles, or other similar absorbent garment articles. In other embodiments, the articles may include air masks, medical drapes, gowns, surgical suits, and protective apparel, or in other fabric (woven or nonwoven) articles.

The embodiments are applicable to other technologies that are susceptible to similar problems as those discussed above. For example, the films may be used to produce clothlike backsheets, and medical back table (or end table) covers in surgery rooms, as well as medical packaging (for example, medical sterilization pouches, and sterile pouches to contain sterilized surgical equipment) and active packaging (such as sachets to contain desiccants in pharmaceutical tablet bottles), all of which are within the purview of the present embodiments. The interstitial space between the pores of the microporous polymer films described herein comprises thin solid segments of PP homopolymer or PP homopolymer and E/P copolymer, unlike other breathable fibrous product candidates where the interstitial space comprises fibers which may or may not be bonded (typically by thermal bonding at contact points where they meet). An advantage of the microporous polymer films of the invention is that the stretching process of the invention allows for better control of the pore size and pore size distribution resulting in a narrower distribution of pore sizes than in other (fibrous) porous structures, where the pores are formed by overlapping fibers and the pore size and distribution depends on the number density (number of fibers/cm$^3$) and the distribution of fiber diameters. Furthermore, the microporous polymer films of the invention have smaller pores, with diameters in the nanometer range, compared to, for example, fibrous materials with much larger pore sizes, in the range of several micrometers. Although fibrous structures may be made of similar hydrophobic materials, the smaller pore size of the PP-copolymer microporous polymer films can provide a higher holdout for blood and bodily fluids which enables them to be used as breathable covers in operating room end-tables. Another advantage of the microporous polymer films described herein compared to fibrous breathable films is that the potential for debris generated by handling, cutting, converting and using microporous polymer films is much less than that for fibrous structures. This makes the microporous polymer films appropriate for use in ultra clean spaces such as in electronic processing, filtration and medical and pharmaceutical aseptic environments.

Microporous films may also find uses in regular packaging (envelopes, fruit packaging, powder packaging, packaging for sensitive electronic components, etc.) and as filtration media (for the separation of gases or liquids). The film may be a monolayer film or a multilayer film. As used herein, "multilayer film" refers to a film having two or more layers that are at least partially contiguous and preferably, but optionally, coextensive.

PP Copolymer Films Further Comprising Ethylene-Propylene Elastomer

Additionally, it is believed that microporous films that have lower tensile moduli, comprising PP copolymer and ethylene-containing copolymer chain segments in total amount of from 18-50 wt. %, are especially desired for some applications. The film tensile modulus is related to the flexibility of the film; and further, lower tensile modulus films have the potential for improved toughness, installation by hot air welding, and low temperature durability.

However, it has been found that polypropylene breathable membranes can still be relatively stiff even when the PP copolymer has ethylene-containing copolymer chain segments. It has been further found that the addition of ethylene-propylene rubber can further modify the microporous film, reducing its tensile modulus.

Therefore, in some embodiments, this invention relates to a microporous polymer film comprising:
  (a) 50 to 95 weight percent of one or more polypropylene copolymer, based on the total weight of the film, said polypropylene copolymer comprising one or more polypropylene homopolymer chain segments and one or more ethylene-containing copolymer chain segments; and wherein the microporous polymer film comprises:
    (i) polypropylene homopolymer chain segments in total amount of from 50-82 wt. %, based on the weight of the polypropylene copolymer, or from 43-79 mole %, based on the mole content of polymerized units of propylene in the polypropylene homopolymer chain segments as a percentage of the total mole content of polymerized monomer units in the polypropylene copolymer; and (ii) ethylene-containing copolymer chain segments in total amount of from 18-50 wt. %, based on the weight of the polypropylene copolymer, or from 21-57 mole %, based on the mole content of polymerized monomer units in the ethylene-containing copolymer chain segments as a percentage of the total mole content of polymerized monomer units in the polypropylene copolymer; wherein at least a portion of the ethylene-containing copolymer chain segments comprise polymerized units of ethylene in an amount of at least 45 wt. %, based on the weight of the ethylene-containing copolymer chain segments, or at least 55 mole % based on the mole content of polymerized units of ethylene in the ethylene-containing copolymer chain segments as a percentage of the total mole content of polymerized monomer units in the ethylene-containing copolymer chain segments; and (b) 5 to 50 weight percent of one or more ethylene-propylene elastomer, based on the total weight of the film; wherein at least 45 weight percent of the polymerized units in the (b) ethylene-propylene elastomer are units of ethylene.

It is understood that all of the details, options, variants, manufacturing details and processes, and applications previously described herein for inventions that contain only or comprise (a); that is, described for the combination of (i) and (ii) to the exclusion of (b), are intended to equally apply to or be suitable for all inventions comprising or consisting of (a) and (b), unless otherwise noted herein.

In some preferred embodiments, the (b) ethylene-propylene elastomer has an ethylene content that is very similar or identical to the ethylene content in the ethylene-containing copolymer chain segments in polypropylene copolymer. In so doing, the additional incorporation of ethylene-propylene rubber into the PP breathable membrane does not affect the pore formation capability of PP copolymer. As a result, ethylene-propylene rubber is believed to provide the potential for PP breathable membranes with additional properties, such as improved toughness. Other potentially-improved properties include better flexibility in colder temperatures, such as might be experienced in the installation of such membranes in roofing applications during the winter time in extreme cold weather. Other property improvements, such as improved heat welding and/or improved tear strength are also believed possible, along with the possibility of increased porosity and breathability of the PP breathable membranes.

In some embodiments, the one or more ethylene-propylene elastomer (b) is present in the film in an amount of 5 to 30 weight percent, based on the total of the one or more polypropylene copolymer (a) and the one or more ethylene-propylene elastomer (b) in the film. In some other embodiments, the one or more ethylene-propylene elastomer (b) is present in the film in an amount of 5 to 20 weight percent, based on the total of the one or more polypropylene copolymer (a) and the one or more ethylene-propylene elastomer (b) in the film.

In the one or more ethylene-propylene elastomer (b), at least 45 weight percent of the polymerized units are units of ethylene. In some embodiments, 45 to 80 weight percent of the polymerized units in the ethylene-propylene elastomer (b) are units of ethylene. In some other, 45 to 60 weight percent of the polymerized units in the ethylene-propylene elastomer (b) are units of ethylene.

By ethylene-propylene elastomer, it is meant any elastomer or rubber having ethylene-propylene segments. An elastomer is a polymer with viscoelasticity (i.e., both viscosity and elasticity) and has weak intermolecular forces along with generally low Young's modulus and high failure strain compared with other materials, as generally evidenced by the polymer having extendibility and resiliency.

Preferably, the one or more ethylene-propylene elastomer (b) is a single type of ethylene-propylene elastomer. If the one or more ethylene-propylene elastomer (b) is a mixture of ethylene-propylene elastomers, preferably all of those elastomers have the aforementioned amounts of polymerized ethylene units, respectively; that is, in the ethylene-propylene elastomer (b) all the elastomers have at least 45 weight percent of the polymerized units being units of ethylene; or in some embodiments, all have 45 to 80 weight percent of the polymerized units in the ethylene-propylene elastomer (b) are units of ethylene; or in some other embodiments, 45 to 60 weight percent of the polymerized units in the ethylene-propylene elastomer (b) are units of ethylene.

In many embodiments, the one or more ethylene-propylene elastomer (b) preferably includes ethylene-propylene rubber; however, in some embodiments ethylene propylene diene monomer (EPDM) rubber may be desirable. A mixture of these rubbers is also possible. Preferably, the one or more ethylene-propylene elastomer (b) is solely ethylene-propylene rubber or solely ethylene propylene diene monomer (EPDM) rubber. Other suitable ethylene-propylene elastomers can include Vistalon™ from ExxonMobil Chemical Company, Buna® from Lanxess, and Mitsui EPT™ from Mitsui Chemicals. Any ethylene-propylene elastomer having the aforementioned amounts of polymerized ethylene units would be suitable in (b).

The one or more ethylene-propylene elastomer (b) preferably has a Mooney Viscosity of from 10 to 40 Mu as measured under ASTM D1646-07. If a mixture of elastomers is used, each of the elastomers has a Mooney Viscosity of from 10 to 40 Mu as measured under ASTM D1646-07.

The microporous polymer film comprises (a) and (b) as previously described. In some embodiments the microporous polymer film consists of (a) and (b) as previously described. In some embodiments, the microporous polymer film comprising or consisting of (a) and (b) has a tensile modulus that is less than the tensile modulus of a film made solely with (a). In some other embodiments, the microporous polymer film comprising of consisting of (a) and (b) has a water vapor permeance that is less than the water vapor permeance of a film made solely with (a).

In the microporous film, in the one or more polypropylene copolymer (a), at least a portion of the ethylene-containing copolymer chain segments comprise polymerized units of ethylene in an amount of from 45 wt. % to 80 wt. %, based on the weight of the ethylene-containing copolymer chain segments, or from 55 mole % to 86 mole %, based on the mole content of polymerized units of ethylene in the ethylene-containing copolymer chain segments as a percentage of the total mole content of polymerized monomer units in the ethylene-containing copolymer chain segments.

In some embodiments of the microporous polymer film comprising or consisting of (a) and (b), the ethylene-containing copolymer chain segments in the one or more polypropylene copolymer (a) are ethylene-propylene copolymer chain segments.

In some embodiments of the microporous polymer film comprising or consisting of (a) and (b), wherein the ethylene-containing copolymer chain segments in the one or more polypropylene copolymer (a) include ethylene-propylene copolymer chain segments, at least a portion of the ethylene-propylene copolymer chain segments in (a) comprise polymerized units of ethylene in an amount of from 45 wt. % to 80 wt. %, based on the weight of the ethylene-propylene copolymer chain segments, or from 55 mole % to 86 mole %, based on the mole content of polymerized units of ethylene in the ethylene-propylene copolymer chain segments as a percentage of the total mole content of polymerized monomer units in the ethylene-propylene copolymer chain segments.

In some further embodiments, these ethylene-propylene copolymer chain segments in the one or more polypropylene copolymer (a) are ethylene-propylene diblock copolymer chain segments comprising a polypropylene block and a polyethylene block; or are diblock copolymer chain segments comprising a polypropylene block and an ethylene-propylene copolymer block.

In some embodiments, the microporous polymer film comprising or consisting of (a) and (b) has a porosity of at least 25% and a median pore diameter, 4V/A according to UOP Method 578-11, of at least 25 nm, both features being measured by mercury intrusion porosimetry.

The microporous polymer film comprising or consisting of (a) and (b) in some embodiments is a non-porous polymer film having domains of (a) and domains of (b), wherein the domains of (a) further have a morphology that features a majority polymer phase of polypropylene, a plurality of minority polymer domains of ethylene-containing copolymer within the majority polymer phase, and an inclusion phase of the major polypropylene phase within the minority polymer domain.

It has been found that there are multiple uses for the microporous polymer film comprising or consisting of (a) and (b). For many applications, the non-porous microporous polymer film having a thickness of at least 100 μm to 2.5 mm is particularly suitable.

For example, the microporous polymer film comprising or consisting of (a) and (b) is suitable for use as a roof membrane, or a constituent of a roof membrane. The low/little permeability of the incumbent roof membranes made of PVC, TPO or EPDM leads to the accumulation of moisture beneath the roof membranes (e.g. on metal roofs and/or lightweight concrete structures), causing the delamination of roof membranes over time and in turn the failure of roof structure. Microporous polymer film comprising or consisting of (a) and (b) offers an opportunity to provide a liquid water-tight product with high water vapor permeability.

The microporous film comprising or consisting of (a) and (b) is also suitable for use as in medical packaging or active packaging articles, or medical covers, including back table covers. When used in medical packaging or active packaging articles, or medical back table covers, it is preferred that the microporous polymer film comprising or consisting of (a) and (b) have a barrier to micro-organisms equivalent to a maximum penetration, calculated % Pmax, of <10%, as defined by ASTM F2638-18. Likewise, when used in medical packaging or active packaging articles, or medical back table covers, it is preferred that the microporous polymer film comprising or consisting of (a) and (b) have a Gurley Gauge air permeability of from 1 to 35,000 sec/100 cm$^3$, which controls the inflow or outflow of air or one or more gases into or out of the package. The microporous polymer film comprising or consisting of (a) and (b) is thermoforming and heat-sealable, making it especially useful in medical packaging or active packaging articles, or medical back table covers, and also many other different applications.

Methods for Forming PP Copolymer Films Further Comprising Ethylene-Propylene Elastomer In still a further alternative embodiment, this invention further relates to a method of forming a microporous polymer film, said method steps comprising:

A) providing a mixture of
  (a) 50 to 95 weight percent of one or more polypropylene copolymer, based on the total weight of the mixture, said polypropylene copolymer comprising:
    (i) one or more polypropylene homopolymer chain segments in total amount of from 50-82 wt. %, based on the weight of polypropylene copolymer, or from 43-79 mole %, based on the mole content of polymerized units of propylene in the polypropylene homopolymer chain segments as a percentage of the total mole content of polymerized monomer units in the polypropylene copolymer; and
    (ii) one or more ethylene-containing copolymer chain segments in total amount of from 18-50 wt. %, based on the weight of polypropylene copolymer, or from 21-57 mole %, based on the mole content of polymerized monomer units in the ethylene-containing copolymer chain segments as a percentage of the total mole content of polymerized monomer units in the polypropylene copolymer; wherein at least a portion of the ethylene-containing copolymer chain segments comprises polymerized units of ethylene in an amount of at least 45 wt. %, based on the weight of the ethylene-containing copolymer chain segments, or at least 55 mole % based on the mole content of polymerized units of ethylene in the ethylene-containing copolymer chain segments as a percentage of the total mole content of polymerized monomer units in the ethylene-containing copolymer chain segments; and
  (b) 5 to 50 weight percent of one or more ethylene-propylene elastomer, based on the total weight of the mixture,
  wherein at least 45 weight percent of the polymerized units in the ethylene-propylene elastomer are units of ethylene;
B) forming a non-porous film from the mixture; and
C) subjecting the non-porous film to sequential cold and hot stretching steps comprising:
  (i) at least one cold stretching step at a temperature in a range of from −20° C. to 50° C.; and
  (ii) at least one hot stretching step at a temperature in a range of from 50° C. to 140° C.;
thereby producing a microporous polymer film.

It is understood that all of the details, options, variants, manufacturing details and processes including equipment, and applications previously described herein for inventions that contain only or comprise (a); that is, described for the combination of (i) and (ii) to the exclusion of (b), are intended to equally apply to or be suitable for all inventions comprising or consisting of (a) and (b), unless otherwise noted herein. Specifically, all of the prior noted details and equipment regarding machine-direction and transverse direction stretching of films previously discussed herein are suitable for suitable for processing films comprising or consisting of (a) and (b), unless other specific differences are noted. Providing a mixture comprising or consisting of (a) and (b) can be achieved, but is not limited to, compounding the components in a screw extruder, preferably a twin-screw extruder. Forming the non-porous film can be achieved, but is not limited to, casting a film directly from the extruder after mixing. Subjecting the cast film to cold and hot stretching steps can be achieved via the processes discussed and exemplified herein.

In some preferred embodiments of a method for forming the microporous polymer film, the (b) ethylene-propylene elastomer has an ethylene content that is very similar or identical to the ethylene content in the ethylene-containing copolymer chain segments in polypropylene copolymer. In so doing, the additional incorporation of ethylene-propylene rubber into the PP breathable membrane does not affect the pore formation capability of PP copolymer. As a result, ethylene-propylene rubber is believed to provide the potential for PP breathable membranes with additional properties, such as improved toughness. Other potentially-improved properties include better flexibility in colder temperatures, such as might be experienced in the installation of such membranes in roofing applications during the winter time in extreme cold weather. Other property improvements, such as improved heat welding and/or improved tear strength are also believed possible, along with the possibility of increased porosity and breathability of the PP breathable membranes.

In some embodiments of a method for forming the microporous polymer film, the one or more ethylene-propylene elastomer (b) is present in the mixture in an amount of 5 to 30 weight percent, based on the total weight of the one or more polypropylene copolymer (a) and the one or more ethylene-propylene elastomer (b) in the mixture. In some other embodiments, the one or more ethylene-propylene elastomer (b) is present in the mixture in an amount of 5 to 20 weight percent, based on the total weight of the one or more polypropylene copolymer (a) and the one or more ethylene-propylene elastomer (b) in the mixture. In the one or more ethylene-propylene elastomer (b), at least 45 weight percent of the polymerized units are units of ethylene. In some embodiments, 45 to 80 weight percent of the polymerized units in the ethylene-propylene elastomer (b) are units of ethylene. In some other embodiments, 45 to 60 weight percent of the polymerized units in the ethylene-propylene elastomer (b) are units of ethylene. Preferably, the one or more ethylene-propylene elastomer (b) is a single type of ethylene-propylene elastomer. If the one or more ethylene-propylene elastomer (b) is a mixture of ethylene-propylene elastomers, preferably all of those elastomers have the aforementioned amounts of polymerized ethylene units, respectively; that is, in the ethylene-propylene elastomer (b) all the elastomers have at least 45 weight percent of the polymerized units being units of ethylene; or in some embodiments, all have 45 to 80 weight percent of the polymerized units in the ethylene-propylene elastomer (b) are units of ethylene; or in some other embodiments, 45 to 60 weight percent of the polymerized units in the ethylene-propylene elastomer (b) are units of ethylene.

In some embodiments of a method for forming the microporous polymer film, the one or more ethylene-propylene elastomer (b) preferably includes ethylene-propylene rubber; however, in some embodiments ethylene propylene diene monomer (EPDM) rubber may be desirable. A mixture of these rubbers is also possible. Preferably, the one or more ethylene-propylene elastomer (b) is solely ethylene-propylene rubber or solely ethylene propylene diene monomer (EPDM) rubber. Other suitable ethylene-propylene elastomers can include Vistalon™ from ExxonMobil Chemical Company, Buna® from Lanxess, and Mitsui EPT™ from Mitsui Chemicals. Any ethylene-propylene elastomer having the aforementioned amounts of polymerized ethylene units would be suitable in (b).

In some embodiments of a method for forming the microporous polymer film, the one or more ethylene-propylene elastomer (b) preferably has a Mooney Viscosity of from 10 to 40 Mu as measured under ASTM D1646-07. If a mixture of elastomers is used, each of the elastomers has a Mooney Viscosity of from 10 to 40 Mu as measured under ASTM D1646-07.

In some embodiments of a method for forming the microporous polymer film, the mixture used to make the microporous polymer film comprises (a) and (b) as previously described. In some embodiments of a method for forming the microporous polymer film, the mixture used to make the microporous polymer film consists of (a) and (b) as previously described. In some embodiments of a method for forming the microporous polymer film, the microporous polymer film made from a mixture comprising or consisting of (a) and (b) has a tensile modulus that is less than the tensile modulus of a film made solely with (a). In some embodiments of a method for forming the microporous polymer film, the microporous polymer film made from a mixture comprising or consisting of (a) and (b) has a water vapor permeance that is less than the water vapor permeance of a film made solely with (a).

In some embodiments of a method for forming the microporous polymer film, in the one or more polypropylene copolymer (a), at least a portion of the ethylene-containing copolymer chain segments comprise polymerized units of ethylene in an amount of from 45 wt. % to 80 wt. %, based on the weight of the ethylene-containing copolymer chain segments, or from 55 mole % to 86 mole %, based on the mole content of polymerized units of ethylene in the ethylene-containing copolymer chain segments as a percentage of the total mole content of polymerized monomer units in the ethylene-containing copolymer chain segments.

In some embodiments of a method for forming the microporous polymer film made from a mixture comprising or consisting of (a) and (b), the ethylene-containing copolymer chain segments in the one or more polypropylene copolymer (a) are ethylene-propylene copolymer chain segments.

In some embodiments of a method for forming the microporous polymer film made from a mixture comprising or consisting of (a) and (b), the ethylene-containing copolymer chain segments in the one or more polypropylene copolymer (a) include ethylene-propylene copolymer chain segments, at least a portion of the ethylene-propylene copolymer chain segments in (a) comprise polymerized units of ethylene in an amount of from 45 wt. % to 80 wt. %, based on the weight of the ethylene-propylene copolymer chain segments, or from 55 mole % to 86 mole %, based on the mole content of polymerized units of ethylene in the ethylene-propylene copolymer chain segments as a percentage of the total mole content of polymerized monomer units in the ethylene-propylene copolymer chain segments.

In some further embodiments, these ethylene-propylene copolymer chain segments in the one or more polypropylene copolymer (a) are ethylene-propylene diblock copolymer chain segments comprising a polypropylene block and a polyethylene block; or are diblock copolymer chain segments comprising a polypropylene block and an ethylene-propylene copolymer block.

In some embodiments of a method for forming the microporous polymer film made from a mixture comprising or consisting of (a) and (b), the resulting film has a porosity of at least 25% and a median pore diameter, 4V/A according to UOP Method 578-11, of at least 25 nm, both features being measured by mercury intrusion porosimetry.

In some embodiments of a method for forming the microporous polymer film made from a mixture comprising or consisting of (a) and (b), the film is a non-porous polymer film having domains of (a) and domains of (b), wherein the domains of (a) further have a morphology that features a majority polymer phase of polypropylene, a plurality of minority polymer domains of ethylene-containing copolymer within the majority polymer phase, and an inclusion phase of the major polypropylene phase within the minority polymer domain.

The present invention is further defined in the following Examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

EXAMPLES

Materials

Homopolymer polyethylene is referred to herein as PE. The homopolymer-PE used herein is a resin, HDPE 6400, available from the Dow Chemical Company, Midland, Mich., USA.

Homopolymer polypropylene is referred to herein as PP. The homopolymer-PP used herein is a resin, PP H314, available from Braskem, USA (Philadelphia, Pa., USA).

An ethylene-propylene copolymer is referred to herein as EP. Numerous EP and PP-EP copolymers and blends of homopolymer-PP with EP or PP-EP copolymers are described herein, as detailed, for example, in Example 2 and Example 6.

A polypropylene copolymer resin used in this study is PP C7054-07NA, a PP-EP copolymer comprising PP chain segments and ethylene-propylene random copolymer chain segments, purchased from Braskem USA. PP C7054-07NA resin contains 32.9 wt % ethylene-propylene copolymer (and 100−32.9=67.1% PP), while the ethylene content in the ethylene-propylene copolymer chain segments is 49.7 wt %. It has a density of 0.9 g/cm$^3$ and a melt index of 7 g/10 min at 230° C. and 2.16 kg. Other PP copolymer resins are described in Table 2.

The term "Tyvek®" on its own refers to Tyvek® housewrap (approximately 32% porosity; 37 nm average pore diameter); the term "Tyvek® 1073B" refers to a special grade of Tyvek® non-woven which is used as a medical packaging layer (approximately 65% porosity; 2500 nm average pore diameter).

Cast Films

PP C7054-07NA resin cast films were produced on a film cast line, which consisted of a 1.25-inch Killion single-screw extruder and a 30-inch wide cast die with a die gap of about 762 μm (30 mil). A typical temperature profile (for extruder zones 1-8) of a pilot-scale extrusion line using a 76.2 cm (30-inch) die used for making the (co)polymer cast films described herein may be (for example, for PP copolymer films): 180, 200, 210, 210, 210, 210, 210, 210° C. Uniaxial and Biaxial Stretching of Films on an Iwamoto Biaxial Stretcher Uniaxial Stretching (Machine-Direction Orientation, MDO) Procedure: The film was cut into pieces with a predetermined dimension. Adhesive tapes were attached to both edges of the film (in the transverse direction), which were fitted into the custom-designed sample holders. The sample holder plates were clamped together by five bolts. The legs of sample holders were then mounted onto the backsides of grips of an Iwamoto biaxial stretcher (BIX-703, Iwamoto Seisakusho Co.). The film was subjected to cold stretching uniaxially in the machine direction. After that, the door of the sample chamber was closed and the sample chamber was heated to 100° C., followed by holding at this temperature for 1 minute. Subsequently, the film was then subjected to hot stretching uniaxially in the machine direction. The degree of cold stretching is defined by $$\frac{\text{Total Length after Cold Stretching} - \text{Initial Film Length}}{\text{Initial Film Length}} \times 100\%$$

and the degree of hot stretching is defined by $$\frac{\text{Total Length after Hot Stretching} - \text{Total Length after Cold Stretching}}{\text{Total Length after Cold Stretching}} \times 100\%.$$

After stretching, the film turned a white color because of the formation of a microporous structure.

For biaxial stretching, the PP-based film was cut into pieces with a predetermined dimension (70 mm×70 mm), and then loaded onto the grips of an Iwamoto biaxial stretcher. The film was subjected to simultaneous biaxial stretching in both directions at room temperature and then heated to 100° C. After holding at 100° C. for 1 minute, the film was subjected to simultaneous biaxial stretching in both directions at the elevated temperature. The degree of stretching for biaxial stretching is defined in the same way as for uniaxial stretching.

Differential Scanning Calorimetry (DSC)

A portion of the samples were weighed and sealed in aluminum hermetic DSC pans (P/N 900793.901 pan and 900794.901 lid). The sample weights were roughly 1-4 mg for each sample. The samples were scanned in a TA Instruments Q2000 DSC (Differential Scanning Calorimeter) (P/N 970001.901) (S/N 2000.0877) with an auto sampler, nitrogen purge of 50 ml/min and mechanical cooling accessory. The run parameters were −20° C. to 200° C. at 10° C./min with a sampling interval of 0.1 s/pt. for a heat-cool-heat cycle. The scans were analyzed using Universal Analysis V4.7A TA Instruments software. Melting points obtained from DSC scans are presented as the output of the instrument software and correspond to the temperature of the peak in the heat flow versus temperature plot on the second heating cycle.

Mercury Intrusion Porosimetry

Mercury intrusion porosimetry analysis was performed on a Micromeritics Autopore IV 9520 according to ASTM D4404-10. The samples were mechanically out-gassed while under vacuum, at room temperature, prior to mercury analysis to remove any physiosorbed species (i.e., moisture) from the sample's surface.

Test conditions include Hg fill pressure 0.50 psia, Hg contact angle 130°, Hg surface tension 485 dyn/cm, Hg density 13.53 g/mL, 30 minute evacuation time, small bore penetrometer (Solid type: 0.392 stem volume) with 5 cm$^3$ bulb, 30 second equilibration time, 92-point pressure table (75 intrusion plus 17 extrusion pressure points), and mechanical evacuation <50 μm Hg. The low to high pressure cross over point was collected at approximately 46 psia (3.8 μm). The pressure table used was generated to allow an even incremental distribution of pressures on a log scale from 0.5 to 60,000 psia and is used for detecting pore size (diameter) from 0.003-400 μm diameter. Mercury is forced into smaller and smaller pores as the pressure is increased incrementally from a vacuum to a maximum of nearly 60,000 psia. According to UOP Method 578-11, the average pore diameter (4 V/A) is calculated based on the assumption that all pores are right circular cylinders with a length (l) and a diameter (d). When the total pore volume ($V=\pi d^2 l/4$) is divided by the total pore area ($A=\pi dl$), the average pore diameter (d) is 4 V/A.

To verify that the instrument was working properly, a Silica-Alumina reference material, lot A-501-46 was analyzed. The reported median pore diameter (by volume) of the reference sample is 0.0072±0.0005 μm. The Autopore reported the median pore diameter (by volume) to be 0.0072 μm.

Scanning Electron Microscopy (SEM)

Samples were cryo-fractured and attached to SEM stubs via carbon tape and then coated with 30 nm of gold to mitigate charging. The top surface and the fractured surface of each sample were imaged at specific locations and various magnifications ranging from 5000× to 10,000× utilizing an FEI Nova NanoSEM model 600 in the secondary electron (TLD) imaging mode. Accelerating voltage was set within 3-5 kV at a working distance (the distance from the final pole piece of the lens to the sample when the image is in focus) of approximately 5 mm with spot size between 3 and 4 (scale of spot size knob) to prevent beam damage to the sample.

Transmission Electron Microscopy (TEM)

PP copolymer films were trimmed to a small trapezoid so that sections could be collected. Sections of approximately 100 nanometers in thickness were collected at ambient temperature using a diamond knife on a Leica EM UC7 microtome and placed on 400 mesh virgin TEM grids for observation. The microtomed films were stained with the vapor phase of a 0.5 M (mol/L) aqueous osmium tetroxide solution for 3-5 mins at ambient temperature. TEM images were collected on a FEI Tecnai 12 operated at 120 kV accelerating voltage using a Gatan MultiScan CCD camera.

X-Ray Diffraction Techniques

Small-angle X-ray scattering (SAXS) and wide-angle X-ray diffraction (WAXD) studies were performed at the Advanced Photon Source (Argonne National Laboratory) using the DND-CAT, 5-ID-D beamline. The standard APS Undulator A was used as the X-ray source, with the X-ray energy set at 17 keV ($\lambda$=0.7923 Å). All samples were run in the normal beam transmission mode. Calibration of the detectors was performed using both silver behenate and lanthanum hexaboride standard reference materials. Two-dimensional scattering patterns were reduced to one dimensional data sets of scattering intensity versus scattering vector by radial integration of the two-dimensional images. Reduction and analysis of the one-dimensional patterns were performed using the commercial software package JADE.

Water Vapor Transmission Rate (WVTR) Measurement (ASTM F1249)

A Mocon 3/33 model MG module was used to evaluate WVTR for this study. The test conditions were 37.8° C./100% RH according to ASTM method F1249. The film samples were prepared with a 76.2 μm (3 mil) aluminum foil/acrylic adhesive mask to concentrate the test area to 20.3 cm$^2$ (approximately 2 inches diameter). The test cell was divided into two halves by the film sample. The edges of the test cell were tightly sealed to prevent outside air from leaking into the cell. This was accomplished by using a silicone grease to help seal the film to the cell (Carrier Gas side), and a rubber O-ring was used to seal the outer cell cover or water vapor side. A standard sample area was 50 cm$^2$. During a typical test, water vapor (the test gas) was continuously admitted to the outer half of the test cell. This gas could be 100% relative humidity (wet sponge) or generated by the instrument at a relative humidity between 30 and 90%. The water vapor permeated the film sample, and then it was picked up by the carrier gas (dry Nitrogen) and carried through the IR sensor, which produced an electrical current directly proportional to the amount of water vapor passing through the film. The computer collected data from the IR sensor and calculated a final value describing the water vapor transmission rate of the test material. The WVTR data is reported in a unit of grams/24 h·m$^2$. A normalized WVTR takes into account the film thickness and is reported as g·cm/24 h·m$^2$.

Water Vapor Permeance (ASTM E96/E96M-16)

The Water Vapor Permeance was determined as per ASTM E96/E96M-16, Standard Test Methods for Water Vapor Transmission of Materials, desiccant method. Specimens were cut into circular disks having a diameter of 90.3 mm. The pocket in the dish was filled with calcium chloride to within 6.4 mm (¼-in.) of the specimen. The specimens were then fitted onto the dish right above the pocket with a metallic plate leaving a 76.1 mm diameter of the specimen exposed to the environment. The specimens were prepared with the product's exterior surface facing the desiccant. The assemblies were then placed in a controlled chamber operating at a temperature and relative humidity (RH) of 23±2° C. and 50±5% RH, respectively. The assemblies were then weighed periodically. The water vapor permeance data was reported in a unit of "perm"; it is possible to convert permeance to water vapor transmission in a unit of grams/24 h·m$^2$. Herein, any use of the unit "perm" refers to a US perm. 1 US perm=$5.72\times10^{-8}$ g/(Pa·s·m$^2$).

Gurley Hill Porosity (Gurley Air Permeability)

A Genuine Gurley Instruments Densometer and a Lorentzen & Wettre L&W Model 121D Densometer were used for measuring Gurley flow values of microporous films. The densometer records the time required for a given volume of gas (e.g., 100 cm$^3$ of air conventionally used in this test) to pass through a 1 inch diameter area of the film (and under a certain pressure gradient, conventionally approximately 4.9 inches of water). The testing procedure conformed to TAPPI T-460 OM-11 method. Prior to testing, a verification test was done by using a calibration plate with known value of Gurley air permeability (19.2 seconds). The calibration plate allowed 100 cm$^3$ air to pass through within 19.2 seconds. Once the validation was done, the microporous film sample was tested. Even though the permeability is dependent on the area of the test sample and the pressure, these values are standardized for the instruments, so the result is conventionally reported in s/100 cm$^3$, or even, sometimes, simply as seconds, s (because the 100 cm$^3$ sample of air is also standardized). Herein Gurley Hill Porosity is referred to as Gurley air permeability, and is reported in s/100 cm$^3$, as is common in the art.

Grab Tensile Test

The Grab tensile tests were conducted on an Instron Tester. The testing procedure followed ASTM D 5034-09 (2013) test method. A grab specimen was gripped in the center of the specimen width to ensure equal ungripped top and bottom portions. The crosshead speed was 12 inch/minute for all the experiments. The Instron records tensile strength at peak load (Newtons per unit width) as well as elongation (%).

Nuclear Magnetic Resonance (NMR) Spectroscopy

About 0.25 g sample was cut into strips and inserted into a 10 mm NMR tube. 2.6 ml tetrachloroethane-$d_2$ (TCE-$d_2$) containing 10 mM relaxation agent was added. The sample was then heated at 115° C. $^{13}$C NMR and diffusion measurements (translational diffusion) (to confirm if homopolymer or blend) were conducted on a Bruker 600 MHz spectrometer equipped with a 10 mm cryogenic probe using the following parameters:

Repetition time: 15 s
Number of scans: 1536
90° pulse: 12 ms
Spectrum width: 240 ppm
Temperature: 115° C.
Spectrum center: 90 ppm Gel Permeation Chromatography (GPC)

Samples were dissolved in a carrier liquid at a concentration of 1 mg/ml by shaking for 2 hours at 160° C. in 1,2,4-trichlorobenzene (TCB) containing 200 ppm butylated hydroxytoluene (BHT). GPC was performed on a Polymer-Char high temperature LC system operated in the GPC mode. The injection volume was 300 µL. The flow rate was 1 ml/minute. The eluent was TCB containing 200 ppm of BHT. The separation was performed on two 7.5 by 300 mm PL-Gel mixed-B columns (Agilent). The integrated IRS detector in the PolymerChar HTLC (High temperature liquid chromatography) was used for detection. A series of 16 polystyrene (PS) narrow molecular weight distribution standards (Agilent Corporation) were used for molecular weight calibration. The calibration range was from 0.58 to 3750 kg/mol, and the calibration curve was least squares fit to a third order polynomial. Thus, the reported molecular weights are PS equivalent molecular weight values. Once the validation was done, the microporous film sample was tested.

Microbial Barrier Test (ASTM F2638-18)

The Microbial Barrier Test (ASTM F2638-18) uses aerosol filtration for measuring the performance of porous packaging materials as a surrogate microbial barrier and is applicable to porous materials used to package terminally sterilized medical devices. It measures the aerosol filtration performance of porous packaging materials by creating a defined aerosol of 1.0 µm particles and assessing the filtration efficiency of the material using either single or dual particle counters. The test result is recorded as calculated % $P_{max}$, the highest percent concentration of particles in the filtrate aerosol (particles that remain aerosolized after passage through the test specimen) when a specimen is tested over a range of pressure differentials or air flow rates. A lower $P_{max}$ value denotes a better barrier to particulate matter or microorganisms.

Mooney Viscosity

The Mooney viscosity (ML 1+4 at 125° C.) were performed in an Alpha MV2000 Mooney viscometer, following ASTM D1646-07 standard method. Herein, L indicates the use of the large (i.e., standard) rotor, 1 is the preheating time in minutes, 4 is the reading time in minutes and 125° C. is the test temperature. Mooney viscosity is commonly used to measure the viscosity of raw rubbers/elastomers and to characterize the quality of both natural and synthetic rubber. The Mooney viscometer consists of rotating a serrated rotor imbedded in a rubber specimen, contained within a sealed, pressurized cavity. From its constant speed, the rotor experiences a given resistance to rotation that is recorded as torque in N-m. ASTM D1646 describes the algorithm used to convert this torque into Mooney Units (MU). The Mooney viscosity is affected by the manner in which the rubber/elastomer is prepared and the condition of storage prior to test. The test piece consists of two disks of elastomer of 50 mm diameter and approximately 6 mm thickness sufficient to fill completely the cavity of the viscometer. The specimen should be free from air and from pockets that may trap air against the rotor and die surfaces. A hole is pierced through the center of one disk for insertion of rotor stem. The specimen is allowed to rest at least 30 minutes at standard laboratory temperature before the test and tested not later than 24 hours after homogenization. For the Mooney viscosity test, the large rotor should be used unless the Mooney viscosity would exceed torque capacity of the instrument. Adjust the closed dies with the rotor in place to the test temperature. The temperature of two dies should be within 0.5° C. of each other. Adjust the torque indicator to the zero reading while the viscometer is running unloaded with the rotor in place. Then, stop the rotation of the disk. This adjustment should be made with the dies open for machines with rotor ejection springs. Remove the hot rotor for the properly conditioned cavity, quickly insert the stem through the center of one of the test pieces, and replace the rotor in the viscometer. Place the second test piece on the center of the rotor, close the dies immediately, and activate the timer. Warm the specimen in the closed Mooney viscometer test cavity for exactly 1 minute and then start the motor which drives the rotor. The viscosity readings should be continuously recorded. The running time should never be less than 2 minutes.

Example 1

This Example explores the effect of annealing before stretching for homopolymer PP films. Table 1 gives the stretching conditions and the corresponding porosity and pore size (median pore diameter) of a homopolymer polypropylene, PP H314, after stretching both with and without annealing (prior to stretching). The notation CSXX-HSYY means the film was subjected to a cold stretch of XX % followed by a hot stretch of YY %

TABLE 1

Stretching conditions and porosity of comparative examples of PP H314 (homopolymer polypropylene) with/without annealing.

| Sample ID | Annealing Temp. (° C.) | Annealing Time (hrs) | Cold Stretch (%) | Hot Stretch (%) | Hot Stretch Temp. (° C.) | Porosity (%) | Average Pore Diameter (nm) |
|---|---|---|---|---|---|---|---|
| Tyvek ® | — | — | — | — | — | 32 | 37 |
| PP H314-Annealed-CS25-HS25 | 150 | 24 | 25 | 25 | 100 | 20 | 27 |

TABLE 1-continued

Stretching conditions and porosity of comparative examples of
PP H314 (homopolymer polypropylene) with/without annealing.

| Sample ID | Annealing Temp. (° C.) | Annealing Time (hrs) | Cold Stretch (%) | Hot Stretch (%) | Hot Stretch Temp. (° C.) | Porosity (%) | Average Pore Diameter (nm) |
|---|---|---|---|---|---|---|---|
| PP H314-Annealed-CS25-HS50 | 150 | 24 | 25 | 50 | 100 | 24 | 26 |
| PP H314-Annealed-CS50-HS50 | 150 | 24 | 50 | 50 | 100 | 24 | 33 |
| PP H314-No Annealing-CS25-HS25 | No annealing | | 25 | 25 | 100 | 2.1 | 2.6 |
| PP H314-No Annealing-CS25-HS50 | No annealing | | 25 | 50 | 100 | 3.4 | 3.7 |
| PP H314-No Annealing-CS50-HS50 | No annealing | | 50 | 50 | 100 | 3.9 | 4.2 |

Table 1 shows that annealing at temperatures close to the melting point of PP for an extended period of time is required for achieving desirable pore size and porosity. PP H314 samples without annealing did not turn to a white color after stretching, and, correspondingly, as shown in Table 1, the films showed very low porosity (2-4%). In contrast, upon annealing at 150° C. for 24 hours, the films immediately turned to a white color after the same stretching conditions, affording porosities of 20-24%. Similar results were obtained for films of homopolymer PE (HDPE 6400).

Further, blends of homopolymer PE (HDPE 6400) and homopolymer PP (PP H314) were investigated to see if the polymer incompatibility could help in pore formation without pre-annealing the films. Blends of homopolymer polypropylene and homopolymer polyethylene were prepared in a twin-screw extruder and extruded as films. Without an annealing step, extruded films of blend ratios (homopolymer polyethylene to homopolymer polypropylene) of 100:0, 90:10, 80:20, 70:30, 50:50, 30:70, 20:80, 10:90 and 0:100 were prepared as described previously and then subjected to sequential cold (CS) and hot (HS) uniaxial stretching (25% cold stretch, room temperature, at 100 mm/s, followed by 100% hot stretch at 100° C. and 5 mm/s). Again, in the absence of annealing, no pore formation was observed for films of these PP/PE homopolymer blends.

Extended annealing times are problematic from the perspective of the desired objective to run a continuous manufacturing line to produce microporous films. Ideally, one would prefer a continuous extrusion and pore formation process in one continuous production line, without requiring a hold period for an extended annealing step.

Example 2

One of the objectives of the invention is to produce a film capable of pore formation upon film stretching without the need for any heat annealing step either prior to or after film stretching. Eliminating the annealing step of the prior art processes would enable a continuous manufacturing process. In this example, in order to reduce the required annealing time or, preferably, eliminate the annealing step altogether from the analogous manufacturing process of polyethylene or polypropylene homopolymers, the concept of microphase segregation induced pore formation in homopolymer polypropylene was explored. For this reason, PP copolymers comprised of homopolymer polypropylene (PP) chain segments and ethylene-propylene (EP) copolymer chain segments were prepared and extruded as films.

Four different reactor grade PP copolymers were assessed in order to define enabling parameters and ranges for the invention. The characteristics of the different PP copolymers are shown in Table 2 (Melt Flow Rate, EP copolymer content (isotactic PP content is 100-EP content), and ethylene and propylene content within the EP copolymer chain segments).

TABLE 2

Melt Index and composition of the PP copolymers.

| PP Copolymers [1] | Melt Flow Rate (g/10 min @ 230° C., 2.16 kg) | EP Content (wt %) | (mol %) | E Content in EP (wt %) | (mol %) | P Content in EP (wt %) | (mol %) |
|---|---|---|---|---|---|---|---|
| Inventive | | | | | | | |
| PP C700-35N | 35 | 20.8 | 24.8 | 51.3 | 61.2 | 48.7 | 38.8 |
| PP C7054-07NA | 7 | 32.9 | 38.0 | 49.7 | 59.7 | 50.3 | 40.3 |

TABLE 2-continued

Melt Index and composition of the PP copolymers.

| PP Copolymers [1] | Melt Flow Rate (g/10 min @ 230° C., 2.16 kg) | EP Content (wt %) | (mol %) | E Content in EP (wt %) | (mol %) | P Content in EP (wt %) | (mol %) |
|---|---|---|---|---|---|---|---|
| Comparative | | | | | | | |
| PP TI4020N | 2 | 22.4 | 26.0 | 43.8 | 53.9 | 56.2 | 46.1 |
| PP INSPIRE ® 114 | 0.5 | 19.5 | 22.5 | 40.0 | 50.0 | 60.0 | 50.0 |

[1] The PP copolymers comprised polypropylene chain segments and ethylene-propylene copolymer chain segments (i.e. PP-EP copolymers). Molecular weights by GPC are as follows:
PP C700-35N: Mn = 40,500; Mw = 342,000
PP C7054-07NA: Mn = 58,000; Mw = 295,000
PP TI4020N: Mn = 98,000; Mw = 668,000
PP INSPIRE ® 114: Mn = 106,000; Mw = 661,000

Films of these PP copolymers were prepared as described previously and then subjected to sequential cold (CS) and hot (HS) uniaxial stretching (25% CS at 100 mm/s, 100% HS at 100° C. and 5 mm/s). Film characteristics (average pore size, porosity and WVTR) are shown in Table 3.

TABLE 3

Average pore size, porosity, and water vapor transmission rate (WVTR) of stretched[1] PP copolymer microporous films[2] (ASTM F1249).

| PP Copolymers | Average Pore Diameter (nm) | Porosity (%) | Water Vapor Transmission Rate [3] (g/(m² · day)) | Normalized Water Vapor Transmission Rate (g · cm/(m² · day)) |
|---|---|---|---|---|
| Inventive | | | | |
| PP C700-35N | 43 | 32 | 2990 | 18 |
| PP C7054-07NA | 84 | 46 | 3020 | 39 |
| Comparative | | | | |
| PP TI4020N | 11 | 9.3 | 4.6 | 0.03 |
| PP INSPIRE ® 114 | 8.5 | 7.2 | 2.6 | 0.02 |

[1]For all samples, stretching conditions were: 25% cold stretch (room temperature) at 100 mm/s, followed by 100% hot stretch (100° C.) at 5 mm/s.
[2]Compositions of the PP copolymer films are given in Table 2.
[3] Water vapor transmission rate was tested according to ASTM F1249.

It was found that the Comparative Examples, films of PP TI4020N and PP INSPIRE® 114, had very low average pore diameter (8-12 nm) and very low film porosity (7-10%), and these film characteristics translated to very low water vapor transmission rates and very low water vapor permeance. Both samples would be unsuitable for the intended purpose as breathable films. On the other hand, the Inventive Examples, films of PP C700-35N and PP C7054-07NA, had average pore diameter and film porosity in a target range by analogy to commercial Tyvek®, and film characteristics such as water vapor transmission rates and water vapor permeance that would suggest that both these samples would be suitable as breathable films.

Example 3

PP C7054-07NA resin, a PP copolymer comprising homopolymer polypropylene chain segments and ethylene-propylene copolymer chain segments, was chosen for further studies to optimize the stretching conditions in order to probe the range of microporous film characteristics accessible by this approach. The initial thickness of PP C7054-07NA resin film before stretching was 203 μm.

Films were prepared from PP C7054-07NA as described previously and subjected to sequential cold and hot uniaxial stretching at different processing conditions as described in Table 4. Film characteristics (pore size and porosity) were then assessed in order to discern enabling processing parameters.

TABLE 4

Stretching conditions and the corresponding average pore diameter and porosity for PP C7054-07NA[1] microporous films.

| Sample ID [2] | Degree of Cold Stretching (%) | Degree of Hot Stretching (%) | Hot Stretch Temperature (° C.) | Porosity (%) | Average Pore Diameter (nm) |
|---|---|---|---|---|---|
| Tyvek ® Housewrap | N/A | N/A | N/A | 32 | 37 |
| 1 PP C7054-07NA-CS25-HS50-60C | 25 | 50 | 60 | 25 | 28 |
| 2 PP C7054-07NA-CS25-HS50-80C | 25 | 50 | 80 | 28 | 37 |
| 3 PP C7054-07NA-CS25-HS50-100C | 25 | 50 | 100 | 31 | 40 |
| 4 PP C7054-07NA-CS25-HS50-120C | 25 | 50 | 120 | 32 | 44 |
| 5 PP C7054-07NA-CS50-HS25-100C | 50 | 25 | 100 | 28 | 39 |
| 6 PP C7054-07NA-CS50-HS50-100C | 50 | 50 | 100 | 46 | 69 |

TABLE 4-continued

Stretching conditions and the corresponding average pore diameter
and porosity for PP C7054-07NA[1] microporous films.

| Sample ID [2] | Degree of Cold Stretching (%) | Degree of Hot Stretching (%) | Hot Stretch Temperature (° C.) | Porosity (%) | Average Pore Diameter (nm) |
|---|---|---|---|---|---|
| 7<br>PP C7054-07NA-CS50-HS100-100C | 50 | 100 | 100 | 52 | 340 |
| 8<br>PP C7054-07NA-CS100-HS25-100C | 100 | 25 | 100 | 41 | 68 |
| 9<br>PP C7054-07NA-CS100-HS50-100C | 100 | 50 | 100 | 48 | 80 |
| 10<br>PP C7054-07NA-CS100-HS100-100C | 100 | 100 | 100 | 54 | 106 |
| 11<br>PP C7054-07NA-CS25-HS25-100C | 25 | 25 | 100 | 26 | 30 |
| 12<br>PP C7054-07NA-CS25-HS50-100C | 25 | 50 | 100 | 37 | 57 |
| 13<br>PP C7054-07NA-CS25-HS75-100C | 25 | 75 | 100 | 46 | 70 |
| 14<br>PP C7054-07NA-CS25-HS100-100C | 25 | 100 | 100 | 51 | 101 |
| 15<br>PP C7054-07NA-CS25-HS200-100C | 25 | 200 | 100 | 50 | 138 |
| 16<br>PP C7054-07NA-CS25-HS300-100C | 25 | 300 | 100 | 44 | 67 |
| 17<br>PP C7054-07NA-HS100-60C | 0 | 100 | 60 | 24 | 31 |
| 18<br>PP C7054-07NA-HS100-80C | 0 | 100 | 80 | 12 | 14 |

[1] The composition of the PP C7054-07NA (PP copolymer) films is given in Table 2: 67.1 PP/32.9 EP by weight, where EP is 49.7 wt. % E and 50.3 wt. % P.

[2] Sample ID: Cold Stretch at 100 mm/s in one step was followed by Hot Stretch at 5 mm/s. Samples 1-16 are PP C7054-07NA-CSZZ-HSXX-YYC, where ZZ is the degree of cold stretching (%) at 100 mm/s, and cold stretching is performed at a temperature of 25° C., and where XX is the degree of hot stretching (%) at 5 mm/s, and hot stretching is performed at a temperature of YY ° C. Sample Dimensions (MD × TD), in cm, were 16.5 × 16.5 (6.5 inches × 6.5 inches).

Table 4 shows that the stretching conditions can be optimized to dial in a desired porosity and average pore diameter. A number of comparisons for specific stretch variables (degree of cold stretching (%), degree of hot stretching (%), and hot stretch temperature (° C.)) can be made (by controlling 2 of the 3 variables to be constant while varying the third). For example, one such series is exemplified by Samples 1-4, which shows the effect of the hot stretch temperature (° C.) when extent of room temperature cold stretch and extent of hot stretch are held constant (at 25% and 50%, respectively). Both porosity and pore size (median pore diameter) increase with increasing hot stretch temperature in the temperature range 60-120° C. Another such series is exemplified by Samples 11-16, which shows the effect of degree of hot stretching (%) at 100° C. following a 25% room temperature cold stretch. Again, both porosity and pore size (median pore diameter) increase with increasing extent of hot stretch in the range 25-100% hot stretch, although the trend reverses at higher degree of hot stretch (200 or 300%).

Example 4

This Example explores the performance of PP copolymer uniaxially stretched microporous films. Example 3 demonstrated the effect of film stretching conditions on pore formation (in terms of porosity (%) and average pore diameter (nm)). In Table 4, above, the degree of hot stretching clearly has a significant effect on the porosity and average pore size, so this series (Samples 11-14) was selected for further studies including physical properties and performance data.

The PP C7054-07NA resin microporous films were subjected to the same degree of cold stretching (25%) at 25° C., but different degrees of hot stretching ranging from 25% to 100% at 100° C. The initial thickness of PP C7054-07NA resin film before stretching was 203 µm and the final film thicknesses upon completion of stretching under the different stretching conditions are listed in Table 5.

Figure 1B:
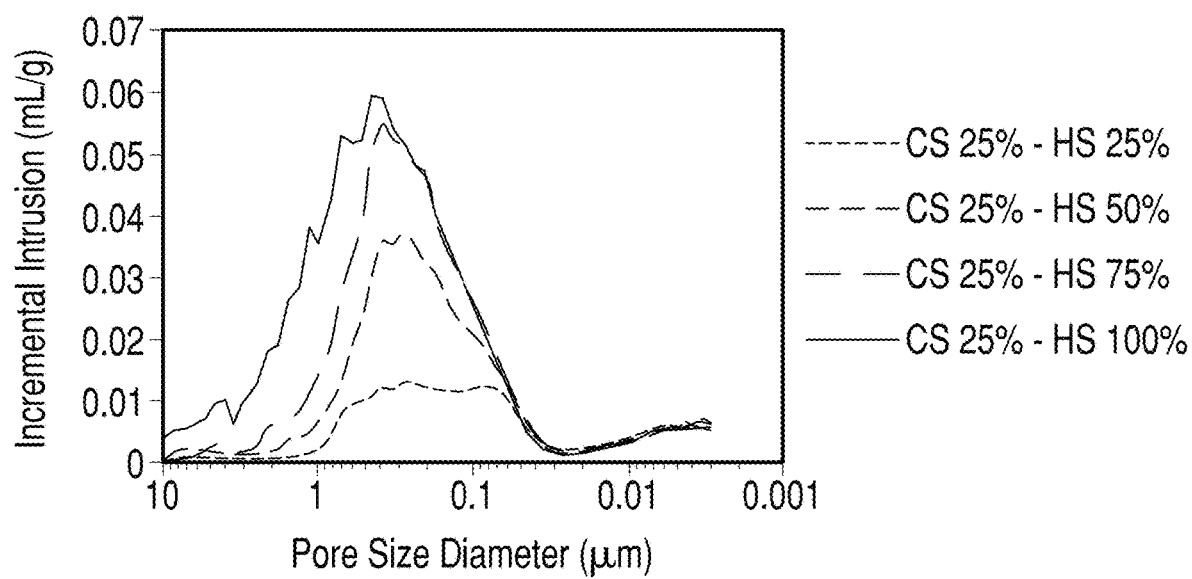
FIG. 1B shows Mercury Intrusion Porosimetry data for PP C7054-07NA microporous films after varying extent of hot stretching conditions.
Figure 3A:
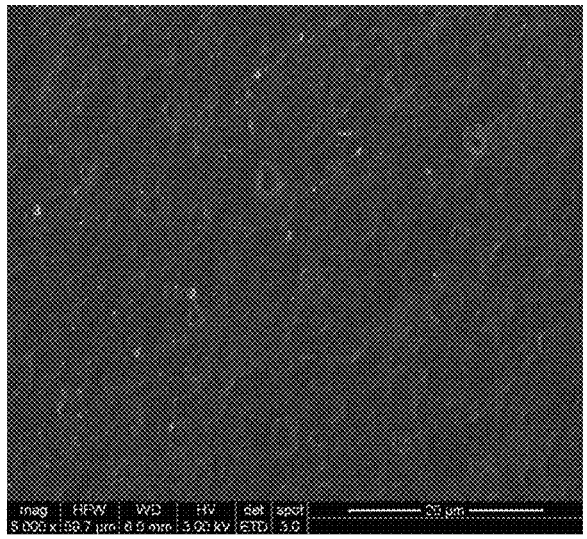
FIG. 3A shows an SEM image of the film surface of unstretched PP C7054-07NA film, shown with a 20 micron scale bar.
Figure 3B:
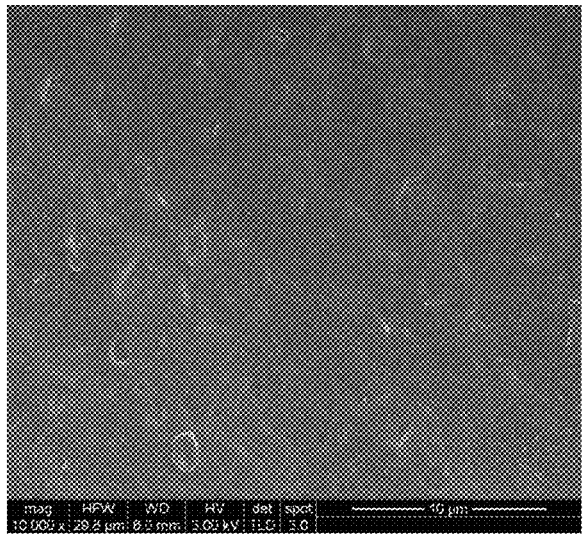
FIG. 3B shows an SEM image of the film surface of unstretched PP C7054-07NA film, shown with a 10 micron scale bar.
Figure 3C:
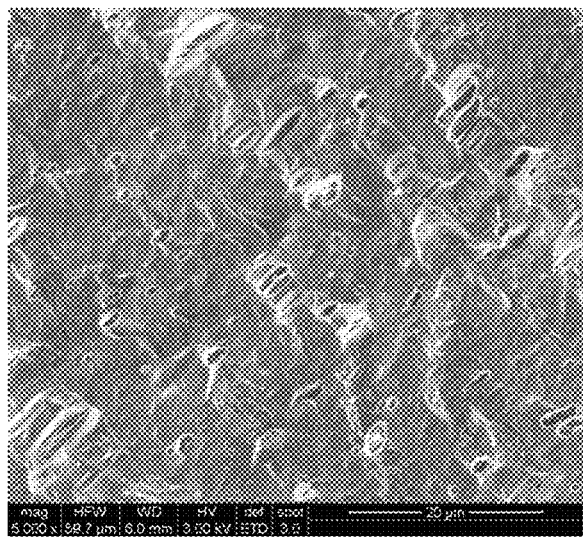
FIG. 3C shows an SEM image of the film surface of stretched PP C7054-07NA film after 25% cold stretching (room temperature) at 100 mm/s and 50% hot stretching (100° C.) at 5 mm/s, shown with a 20 micron scale bar.
Figure 3D:
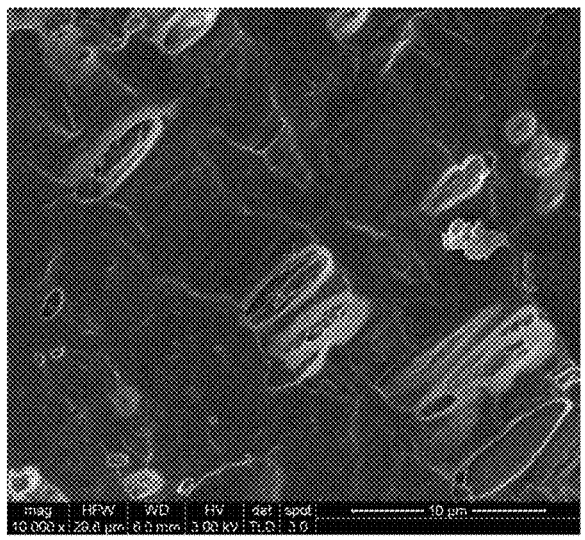
FIG. 3D shows an SEM image of the film surface of stretched PP C7054-07NA film after 25% cold stretching (room temperature) at 100 mm/s and 50% hot stretching (100° C.) at 5 mm/s, shown with a 10 micron scale bar.

Mercury porosimetry was used to measure the average pore diameter and porosity of stretched PP C7054-07NA films for this series, and the results are summarized in Tables 4 and 5. The pore distribution of PP C7054-07NA microporous films for this series is illustrated in FIG. 1B, as compared with that of Tyvek® in FIG. 1A. It should be noted that the y-axis scale differs in FIG. 1A compared to that shown in FIG. 1B.

TABLE 5

Physical properties for stretched PP copolymer (PP C7054-07NA) microporous films.

| Sample Name [1] | Degree of Hot Stretching [2] (%) | Film Thickness [3] Before Stretching (μm) | Film Thickness [3] After Stretching (μm) | Porosity (%) | Average Pore Diameter (nm) | Tensile Strength, [4] Peak Load (Newton) | Elongation [4] (%) |
|---|---|---|---|---|---|---|---|
| Tyvek ® | — | — | — | 32 | 37 | n/t | n/t |
| 11 | 25 | 203 | 188 | 26 | 30 | n/t | n/t |
| 12 | 50 | 203 | 168 | 37 | 57 | 209 | 30 |
| 13 | 75 | 203 | 145 | 46 | 70 | n/t | n/t |
| 14 | 100 | 203 | 130 | 51 | 100 | 196 | 13 |

[1] Sample Name: Samples 11-14 (the same samples 11-14 from Table 4) are PP C7054-07NA-CS25-HSXX, where XX is the degree of hot stretching (%) at 5 mm/s, 100° C. Sample Dimensions (MD x TD), in cm, were 16.5 x 16.5 (6.5 inches x 6.5 inches).
[2] Cold Stretch 25% at 100 mm/s in one step was followed by Hot Stretch of XX % (as shown above, table column 2) at 5 mm/s, 100° C.
[3] 1 mil = 1/1000 inch = 0.0254 mm
[4] Tensile strength and Elongation are measured by the Gurley Grab Tensile Test (Dry) according to ASTM D-5034-09 (2013).
"n/t" means "not tested".

Table 5 and FIGS. 1A and 1B show that under appropriate stretching conditions, PP C7054-07NA microporous films may exhibit greater pore size and porosity than Tyvek® housewrap.

TABLE 6

Porosity and permeability obtained by varying stretching conditions to produce PP C7054-07NA microporous films

| Sample Name [1] | Degree of Hot Stretching [2] (%) | Porosity (%) | Average Pore Diameter (nm) | Water Vapor Permeance [3] (perms) | Gurley Air Permeability[4] (sec/100 cm³) |
|---|---|---|---|---|---|
| Tyvek ® | — | 32 | 37 | 60 | 750-2,500 |
| Weathermate ® | n/t | n/t | n/t | 10 | 1,800 |
| 11 | 25% | 26 | 30 | 14 | n/t |
| 12 | 50% | 37 | 57 | 45 | 23,900 |
| 13 | 75% | 46 | 70 | n/t | n/t |
| 14 | 100% | 51 | 101 | 82 | 5,800 |

[1] Sample Name: Samples 11-14 (the same samples 11-14 from Table 4) are PP C7054-CS25-HSXX, where XX is the degree of hot stretching (%) at 5 mm/s, 100° C. Sample Dimensions (MD x TD), in cm, were 16.5 x 16.5 (6.5 inches x 6.5 inches).
[2] Cold Stretch 25% at 100 mm/s in one step was followed by Hot Stretch of XX % (as shown above, table column 2) at 5 mm/s, 100° C.
[3] Water vapor permeance was measured according to ASTM E96/E96M-16. The unit for permeance is "perm". Any use of "perm" herein refers to a US perm. 1 US perm = 5.72 x 10⁻⁸ g/Pa · s · m².
[4] Gurley air permeability is measured in sec/100 cm³, which means a lower number of seconds equates to a higher permeability.
"n/t" means "not tested".

As shown above (Table 4, Example 3), both porosity and pore size (average pore diameter) increase with increasing extent of hot stretch in the range 25-100% hot stretch. And, as one would expect, increasing both porosity and average pore diameter leads to increased water vapor permeance ("perms") (Table 6). By tuning the pore diameters of PP C7054-07NA microporous films, the water vapor permeance can vary from 14 to 82 perms, as indicated in Table 6 (ASTM E96). It should be noted that the water vapor permeance for Tyvek® housewrap with a similar thickness is about 60 perms. Table 6 also shows Gurley air permeability for PP C7054-07NA microporous films, indicating that PP C7054-07NA microporous films may possess better barrier to air flow and thus they may be better options for improving energy efficiency of houses than, for example, Tyvek®.

Example 5

This Example considers the morphology of the PP copolymer films. Prior art blends of homopolymer polypropylene with a minority component of homopolymer polyethylene produce films (PP/PE) with microphase segregation that results in incompatible domains of polyethylene within the polypropylene matrix. The polypropylene copolymers disclosed herein were cast as films and investigated with the aim of producing microphase segregation within the incompatible EP domains within the polymer film. Such microphase segregation would produce an inclusion phase within the incompatible domains. The morphology of these films, both before and after stretching, was studied by SEM and TEM.

FIG. 2 shows SEM images of film cross sections: FIG. 2A shows a cross section of unstretched PP C7054-07NA film (shown with a 20 micron scale bar) and FIGS. 2B and 2C show stretched PP C7054-07NA film with 25% cold stretching and 50% hot stretching (100° C.), shown with a 20 micron scale bar in FIG. 2B compared to a 5 micron scale bar in FIG. 2C. The microphase segregation and associated domain formation can be identified in the unstretched film of PP C7054-07NA in FIG. 2A, with the domain size ranging from several hundred nanometers to approximately 3 microns. In FIGS. 2B and 2C the PP C7054-07NA film was not annealed and was directly subjected to cold stretching (25%) at a stretch rate of 100 mm/s, followed by hot stretching at a stretch rate of 5 mm/s and a temperature of 100° C. With 25% cold stretching and 50% hot stretching, many pores are formed, as seen from SEM images of film cross-section in FIGS. 2B and 2C.

FIG. 3 shows SEM images of film surfaces: FIGS. 3A and 3B show an unstretched PP C7054-07NA film, where 3A is shown with a 20 micron scale bar, compared to a 10 micron scale bar in 3B. FIGS. 3C and 3D show a stretched PP C7054-07NA film with 25% cold stretching at a stretch rate of 100 mm/s, followed by 50% hot stretching (100° C.) at a stretch rate of 5 mm/s, where 3C is shown with a 20 micron scale bar, compared to a 10 micron scale bar in 3D. Before stretching, the film surface is very smooth (FIGS. 3A and 3B). In contrast, pores can be clearly observed on the surface of stretched PP C7054-07NA film (FIGS. 3C and 3D).

FIG. 4 shows TEM images of films before and after stretching: FIGS. 4A and 4B show PP C7054-07NA films before and after stretching, respectively, (as above, 25% CS; 50% HS) where both 4A and 4B are shown with a 1 micron scale bar. FIGS. 4C and 4D show PP INSPIRE® 114 films before and after stretching (as above, 25% CS; 50% HS), respectively, where both 4C and 4D are shown with a 0.2 micron scale bar.

Figure 4A:
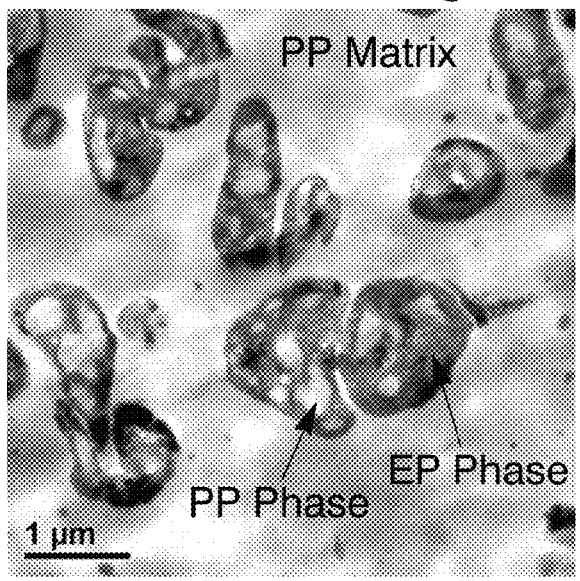
FIG. 4A shows a TEM image of a PP C7054-07NA film before stretching, shown with a 1 micron scale bar.
Figure 4B:
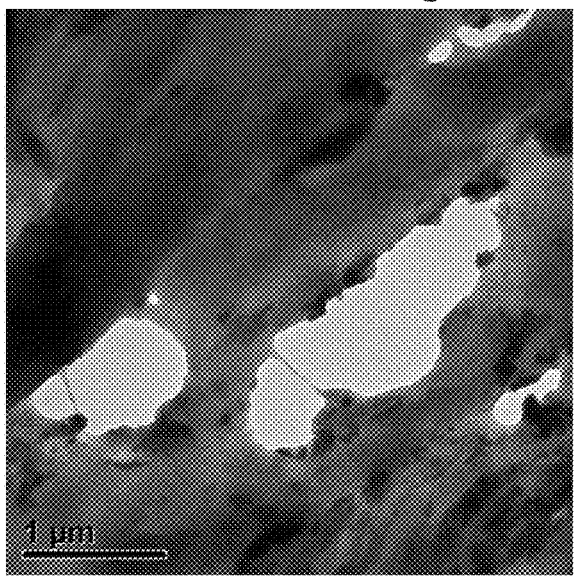
FIG. 4B shows a TEM image of a PP C7054-07NA film after 25% cold stretching (room temperature) at 100 mm/s and 100% hot stretching (100° C.) at 5 mm/s, shown with a 1 micron scale bar.
Figure 4C:
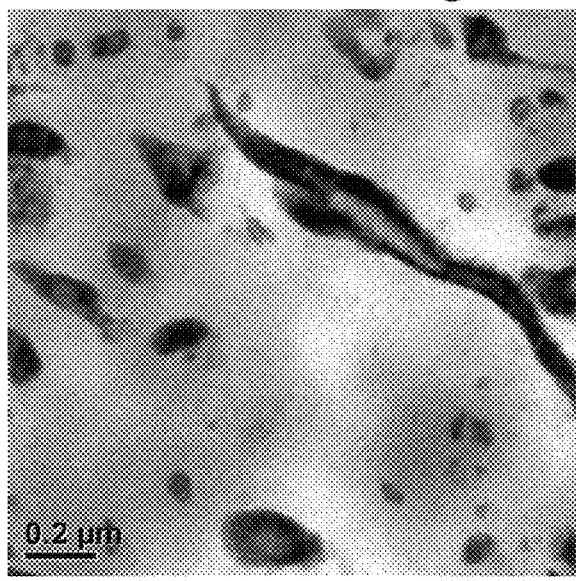
FIG. 4C shows a TEM image of a PP INSPIRE® 114 film before stretching, shown with a 0.2 micron scale bar.
Figure 4D:
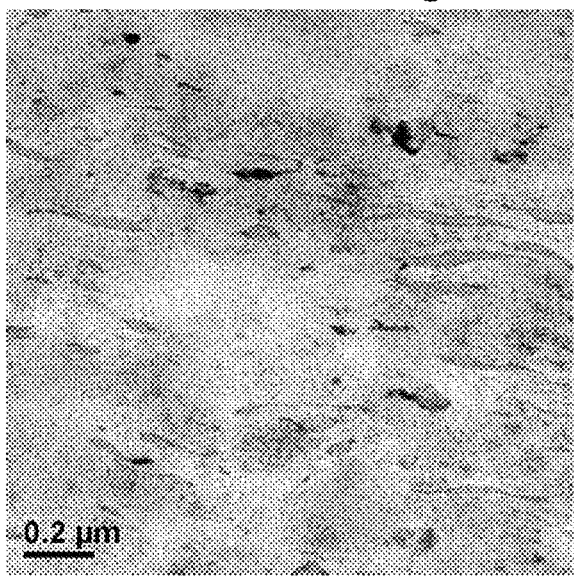
FIG. 4D shows a TEM image of a PP INSPIRE® 114 film after 25% cold stretching (room temperature) at 100 mm/s and 100% hot stretching (100° C.) at 5 mm/s, shown with a 0.2 micron scale bar.

The microphase segregation and associated domain formation can be easily identified in the unstretched film of PP C7054-07NA in FIG. 4A, with the domain size ranging from several hundred nanometers to approximately 3 microns. The TEM images in FIGS. 4A and 4B suggest that the cavitation process is nucleated within the ethylene-propylene (EP) domain for the PP C7054-07NA film. Without wishing to be bound by theory, it is believed that the inclusion morphology of the PP microphase in the EP domains within the PP matrix enables the effective transferring of stretching force to the microphase domain, which breaks the microphase domains into small pieces and initiates the pore formation and growth. In contrast, after stretching the PP INSPIRE® 114 films, the EP domains in PP INSPIRE® 114 film only showed elongation along the stretching direction (FIGS. 4E and 4F). There was no pore formation.

Further evidence of a differentiated response to stretching between films of either PP C7054-07NA or PP C700-35N compared to PP TI4020N or PP INSPIRE® 114 is observed in wide angle X-ray scattering (WAXS) studies. WAXS patterns are associated with Bragg diffraction of X-rays with the polypropylene crystalline lattice, providing information about the composition of the crystals, the orientation of the crystals, and the relative amount of crystallinity.

FIG. 5 shows WAXS patterns for films of two different PP copolymers, PP C7054-07NA and PP TI4020N. Samples for each copolymer included an unstretched film and a sample stretched by 25% cold stretching at room temperature and 100% hot stretching at 100° C. No significant crystalline structure changes for PP C7054-07NA resin films were observed between the before stretching and after stretching films (FIGS. 5A and 5B, respectively). The same observations were made for PP C700-35N resin film (not shown). For PP TI4020N resin films, significant orientation was observed as the crystalline structure rotated and realigned into a fibrillar structure with the evolution of strong diffraction intensity in (110), (040), (130), and (131) planes, as shown in FIGS. 5C and 5D. Similar observations were made for PP INSPIRE® 114 resin films (not shown). It was inferred from the above WAXS results that the stretching force was transferred to the EP phase for initiating and growing the pores during the stretching process for both PP C7054-07NA resin and PP C700-35N resin films, whereas the stretching force was applied to the crystalline polypropylene structure of both PP TI4020N resin films and PP INSPIRE® 114 resin films. This discrepancy resulted in high porosity for both PP C7054-07NA resin and PP C700-35N resin microporous films but low porosity for both PP TI4020N resin films and PP INSPIRE® 114 resin microporous films.

Example 6

Pore formation via stretching of unannealed films was earlier demonstrated (Examples 2-4, above) with a PP copolymer (see the PP C7054-07NA microporous films above). Further blending this PP copolymer as the majority component with homopolymer-PP, PP H314, (as the minor component) was also explored, Table 7. Films were prepared as described above and stretched under the stretching conditions: 25% cold stretching (room temperature) at a stretch rate of 100 mm/s, followed by 100% hot stretching (100° C.) at a stretch rate of 5 mm/s.

TABLE 7

Films from blends of PP copolymer, PP C7054-07NA, with homopolymer-PP

| PP Blends [1] | EP Content in the Blend (wt %) | E Content in EP (wt %) | Porosity (%) | Average Pore Diameter (nm) | Water Vapor Transmission Rate [2] (g/ ($m^2 \cdot day$)) | Normalized Water Vapor Transmission Rate (g · cm/ ($m^2 \cdot day$)) |
|---|---|---|---|---|---|---|
| PP C7054-07NA | 32.9 | 49.7 | 47 | 83 | 3020 | 39 |
| PP H314/ PP C7054-07NA (10/90, wt %) | 29.6 | 49.7 | 25 | 32 | 390 | 2.0 |
| PP H314/ PP C7054-07NA (20/80, wt %) | 26.3 | 49.7 | 20 | 24 | 8.8 | 0.06 |
| PP H314/ PP C7054-07NA (40/60, wt %) | 19.7 | 49.7 | No Pore Formation | N/A | N/A | N/A |
| PP H314/ PP C7054-07NA (70/30, wt %) | 9.9 | 49.7 | No Pore Formation | N/A | N/A | N/A |

[1] Stretching conditions, all samples: 25% cold stretching (room temperature) at a stretch rate of 100 mm/s, followed by 100% hot stretching (100° C.) at a stretch rate of 5 mm/s
[2] Water vapor transmission rate was tested according to ASTM F1249.

Blending in increasing amounts of homopolymer-PP with the PP C7054-07NA copolymer, followed by the cold and hot stretching process, produced progressively lower porosity and lower average pore diameter of the stretched microporous films until a 40% addition of homopolymer-PP results in no pore formation.

Similarly, pore formation via stretching of unannealed films was earlier demonstrated (Example 2) with another PP copolymer (see the PP C700-35N microporous films above, Table 3). Further blending this PP copolymer as the majority component with homopolymer-PP, PP H314, (as the minor component) was also explored, Table 8.

TABLE 8

Stretched films[1] from blends of PP copolymer, PP C700-35N, with homopolymer-PP

| PP Blends | EP Content in the Blend (wt %) | E Content in EP (wt %) | Porosity (%) | Average Pore Diameter (nm) | Water Vapor Transmission Rate [2] (g/ ($m^2 \cdot$ day)) | Normalized Water Vapor Transmission Rate (g $\cdot$ cm/ ($m^2 \cdot$ day)) |
|---|---|---|---|---|---|---|
| PP C700-35N | 20.8 | 51.3 | 32 | 42 | 2990 | 18 |
| PP H314/ PP C700-35N (10/90, wt %) | 18.7 | 51.3 | 32 | 40 | 350 | 2.6 |
| PP H314/ PP C700-35N (20/80, wt %) | 16.6 | 51.3 | 15 | 16 | 270 | 2.5 |

[1]Stretching conditions, all samples: 25% cold stretching at a stretch rate of 100 mm/s, followed by 100% hot stretching (100° C.) at a stretch rate of 5 mm/s.
[2] Water vapor transmission rate was tested according to ASTM F1249.

Figure 6A:
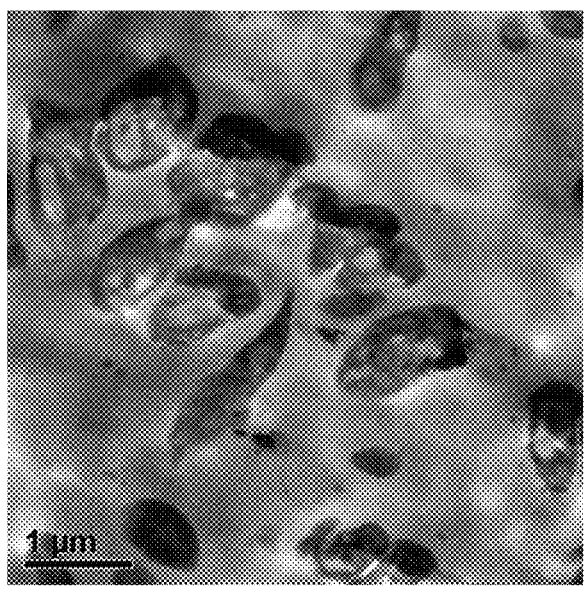
FIG. 6A shows a TEM image of a film from a 20/80 blend of homopolymer PP H314 (20%) with PP C7054-07NA (80%) before stretching, shown with a 1 micron scale bar.
Figure 6B:
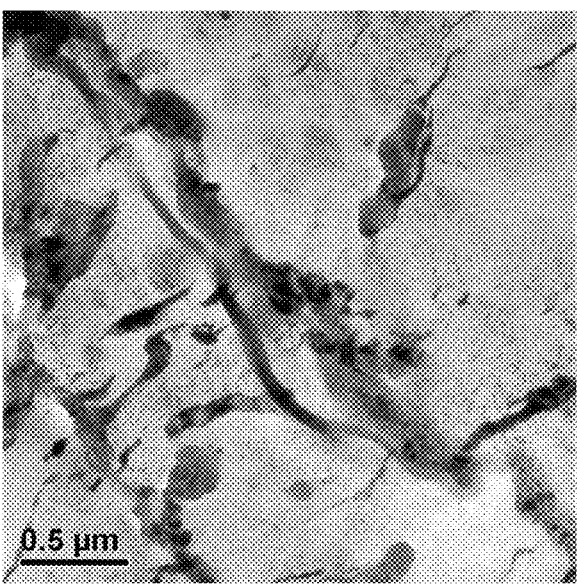
FIG. 6B shows a TEM image of a film from a 20/80 blend of homopolymer PP H314 (20%) with PP C7054-07NA (80%), after 25% cold stretching (room temperature) at 100 mm/s and 100% hot stretching (100° C.) at 5 mm/s, shown with a 0.5 micron scale bar.

Even with just 20 wt % homopolymer PP H314 compounded with PP C7054-07NA using a twin-screw extruder, followed by film production, the inclusion morphology was diminished. As a result, upon stretching, most of the microphase domains were only elongated along the stretching direction (see, for example, TEMs in FIGS. 6A and 6B).

The result for films from the blends of PP C700-35N with homopolymer-PP were similar to those for films from the blends of PP C7054-07NA with homopolymer-PP.

As discussed above, pore formation via stretching of unannealed films was demonstrated for the PP copolymer (see the PP C7054-07NA microporous films above). Further blending this copolymer as the majority component with the PP copolymer PP TI4020N (as the minor component) was also demonstrated to form pores via stretching of unannealed films, Table 9.

TABLE 9

Stretched films[1] from blends of one PP copolymer, PP C700-35N, with another PP copolymer, PP TI4020N [2]

| PP Blends | EP Content in the Blend (wt %) | E Content in EP (wt %) | Porosity (%) | Average Pore Diameter (nm) | Water Vapor Transmission Rate [3] (g/ ($m^2 \cdot$ day)) | Normalized Water Vapor Transmission Rate (g $\cdot$ cm/ ($m^2 \cdot$ day)) |
|---|---|---|---|---|---|---|
| PP C7054-07NA | 32.9 | 49.7 | 47 | 83 | 3020 | 39 |
| PP C7054-07NA/ PP TI4020N (80/20, wt %) | 30.8 | 48.5 | 43 | 64 | n/t [4] | n/t |
| PP C7054-07NA/ PP TI4020N (60/40, wt %) | 28.7 | 47.3 | 32 | 32 | n/t | n/t |

[1]Stretching conditions, all samples: 25% cold stretching (room temperature) at a stretch rate of 100 mm/s, followed by 100% hot stretching (100° C.) at a stretch rate of 5 mm/s (referred to as CS25-HS100).
[2] PP TI4020N is a PP copolymer: 77.6 PP/22.4 EP by weight, where EP copolymer is 43.8 wt. % E and 56.2 wt. % P.
[3] Water vapor transmission rate was tested according to ASTM F1249.
[4] "n/t" means not tested.

Blends of the PP C700-35N with PP TI4020N are also able to form films that can undergo stretching (without prior annealing) to produce microporous films.

Other polymer blends were evaluated as follows: VERSIFY® 2000 resin (melt flow rate=2 g/10 min at 230° C., 2.16 kg) is an ethylene-propylene random copolymer with composition 94% P/6% E (propylene rich). VERSIFY® 2400 resin (melt flow rate=2 g/10 min at 230° C., 2.16 kg) is also an ethylene-propylene random copolymer but with composition 86 wt. % P/14 wt. % E (propylene rich). In each case, two blend ratios with homopolymer PP (PP H314) were prepared (85:15 and 70:30), where PP H314 was the majority component in all of the blends. The unannealed films of these blends were subjected to the CS25-HS100 stretching conditions (above). None of these PP/EP blends formed pores after the stretching process. This may be attributed to the high content of propylene segments in VERSIFY® 2000 and VERSIFY® 2400 resins, which had good compatibility with the PP matrix and thus could not induce sufficient phase segregation in the PP H314 resin.

13C04R21 experimental resin (melt flow rate=18 g/10 min at 230° C., 2.16 kg) is an isotactic PP diblock block copolymer with a 50:50 ratio of PP:EP components in the copolymer, where the EP copolymer block contains 14 wt. % E and 86 wt. % P (total ethylene content in the resin is 7 wt. %). Blends of homopolymer PP (PP H314) with this diblock copolymer were prepared in ratios of 85:15, 80:20, 70:30 and 60:40 (majority PP) and the unannealed films subjected to the CS25-HS100 stretching conditions (above). None of these PP/EP blends formed pores after the stretching process. The EP block in this experimental grade resin contained only 14 wt % ethylene, which makes the EP block PP-rich. As a result, it is thought that both EP block and iPP blocks have good compatibility with homopolymer PP resins, and thus the EP block is unable to initiate sufficient phase segregation in the film.

INTUNE® D5545.00 (melt flow rate=9.5 g/10 min at 230° C., 2.16 kg) is another isotactic PP diblock block copolymer with a 50:50 ratio of PP:EP copolymer, but where the EP copolymer block is ethylene-rich and contains 92 wt. % E and 8 wt. % P (total ethylene content in the resin is 46 wt. %). Stretching the unannealed film (Example 6 CS25-HS100 stretch conditions, as above) attains only minimal pore formation: a porosity of 13.6% and average pore diameter of 14.1 nm. Films of the diblock copolymer would not be suitable for the desired purpose as a housewrap material. Blends of homopolymer PP (PP H314) with this diblock copolymer were prepared in ratios of 85:15, 80:20, 70:30 and 60:40 (majority PP) and the unannealed films subjected to the Example 6 CS25-HS100 stretching conditions (above). None of these PP/EP copolymer blends formed pores after the stretching process.

NORDEL® 3722P is an EPDM (ethylene-propylene diene monomer) copolymer with composition: 28.5 wt. % propylene, 71 wt. % ethylene and 0.5 wt. % ENB (ethylidene norbornene). Majority homopolymer PP blends with NORDEL® 3722P were investigated having blend ratios, PP-H314:NORDEL® 3722P, of 90:10, 80:20 and 70:30 (polypropylene rich). The unannealed films were subjected to the CS25-HS100 stretching conditions (above). None of these PP/EP copolymer blends formed pores after the stretching process.

In addition, an ethylene-acrylic acid (PRIMACOR® 1410 resin: 90.3 wt % E, 9.7 wt % acrylic acid) was evaluated (melt flow rate=1.5 g/10 min at 230° C., 2.16 kg). The blend was 85 wt % PP H314 resin and 15 wt % PRIMACOR® 1410 resin. Under the same stretching conditions, this blend failed to show pore formation. PRIMACOR® 1410 resin was incompatible with PP H314 resin and thus formed a fully segregated interface between the two phases.

Example 7

This Example considers the aging performance of non-heat set microporous films. Many prior art microporous films have been observed to suffer deterioration of properties after heat aging (see, for example, Table 1 in U.S. Pat. No. 3,801,404 showing progressive loss of nitrogen flux of polypropylene microporous films over 1-281 hours at 65° C.; and Table 2 in U.S. Pat. No. 3,843,761 showing the percent air flux loss of polypropylene microporous films after 1 hour at 90° C.). Heat setting (annealing at an elevated temperature after stretching of polyolefin films) was often used in the prior art (e.g., U.S. Pat. No. 3,679,538) to prevent loss of water vapor permeance performance during aging (for example, at 65° C.). PP C7054-07NA MDO (uniaxially stretched, machine direction orientation) microporous films without heat setting were aged at 65° C. for different periods of time, ranging from 1 hour to 168 hours (Table 10).

TABLE 10

| Effect of aging PP C7054-07NA MDO films - Water Vapor Permeance Data. | |
|---|---|
| Aging Time at 65° C. (hours) | Water Vapor Permeance [1] (perms) |
| 1 | 72 |
| 1 | 92 |
| 3 | 60 |
| 48 | 75 |
| 168 | 81 |
| 168 (repeated) | 61 |

[1] Water vapor permeance was measured according to ASTM E96/E96M-16. 1 US perm = $5.72 \times 10^{-8}$ g/Pa · s · m².

Figure 5A:
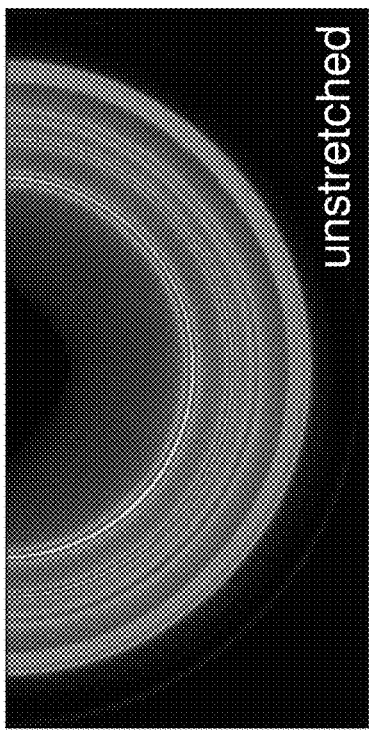
FIG. 5A shows wide-angle X-ray scattering (WAXS) data for a PP C7054-07NA film before stretching.
Figure 5B:
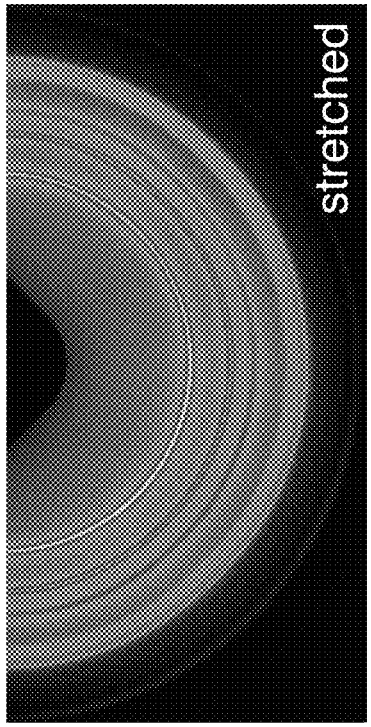
FIG. 5B shows wide-angle X-ray scattering (WAXS) data for a PP C7054-07NA microporous film after 25% cold stretching (room temperature) at 100 mm/s followed by 100% hot stretching (100° C.) at 5 mm/s.
Figure 5C:
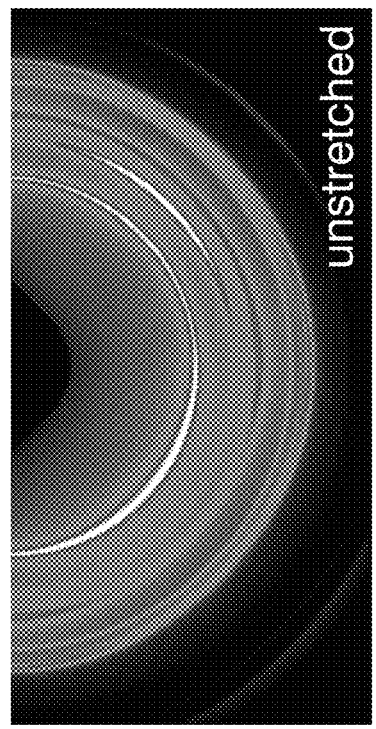
FIG. 5C shows wide-angle X-ray scattering (WAXS) data for a PP TI4020N film before stretching.
Figure 5D:
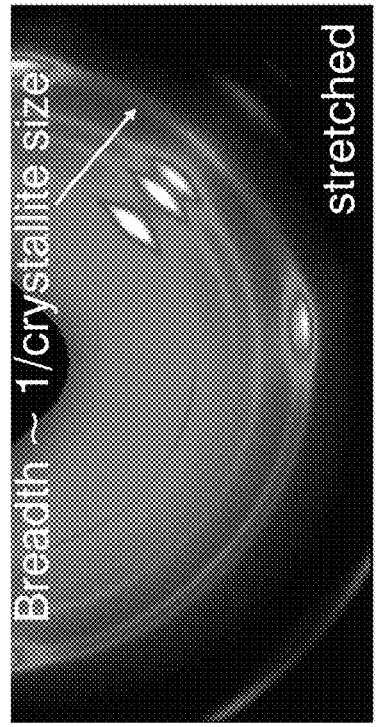
FIG. 5D shows wide-angle X-ray scattering (WAXS) data for a PP TI4020N microporous film after 25% cold stretching (room temperature) at 100 mm/s followed by 100% hot stretching (100° C.) at 5 mm/s.

As indicated in Table 10, the water vapor permeance data did not vary too much over an extended time. In this invention, the stretching force has been transferred to the microphase rubbery (ethylene-propylene copolymer) domains and consumed to create microporous structures, as evidenced by the little change of wide-angle X-ray (WAXS) data for uniaxially stretched (MDO) PP C7054-07NA microporous films between before stretching and after stretching (FIGS. 5A and 5B). In contrast, For Comparative films, such as PP TI4020N resin films, significant orientation was observed in the WAXS data after stretching (FIG. 5D after stretching versus FIG. 5C before stretching) as the crystalline structure rotated and realigned into a fibrillar structure with the evolution of strong diffraction intensity in (110), (040), (130), and (131) planes. This aging performance of the breathable films disclosed herein is distinguished from other homopolymer polyolefin microporous films reported in the prior art, where the heat setting is always required.

U.S. Pat. No. 3,843,761 studied the same phenomenon of performance deterioration after the heat-setting step, except from the perspective of air permeability. In U.S. Pat. No. 3,843,761, the films resulting from the heat-setting step were compared to control films with no heat-setting step. This reference concluded that flux loss due to the heat-setting step ranged from 44-88% loss for prior art cold stretch/single hot stretch processes, and flux loss due to the heat-setting step ranged from 24-37% loss for their new cold stretch/multiple sequential hot stretch processes.

In order to compare with the heat setting results disclosed in U.S. Pat. No. 3,843,761, PP C7054-07NA microporous films were made with the same degrees of stretching as disclosed in U.S. Pat. No. 3,843,761 (see Table 11). Specifically, the first sample, PP C7054-07NA-CS20-HS95, was stretched with 20% cold stretching at 100 mm/s followed by 95% hot stretching at 5 mm/s and 100° C. The second sample, PP C7054-07NA-CS40-HS75, was stretched with 40% cold stretching at 100 mm/s followed by 75% hot stretching at 5 mm/s and 100° C.

TABLE 11

Stretching conditions and pore structure of PP C7054-07NA microporous films

| Sample ID | Degree of Cold Stretching (%) @100 mm/s | Degree of Hot Stretching (%) @ 5 mm/s | Hot Stretch Temperature (° C.) | Average Pore Diameter (nm) | Porosity (%) |
|---|---|---|---|---|---|
| PP C7054-07NA-CS20-HS95 | 20 | 95 | 100 | 88 | 52 |
| PP C7054-07NA-CS40-HS75 | 40 | 75 | 100 | 88 | 48 |

These microporous films were then subjected to the same heat setting step (90° C. for 1 hour) as the reference patent. The Relative Air Perm is calculated according to the following equation, $$\text{Relative Air } Perm = \frac{Gurley \text{ Air Permeability of Porous Film without Heat Setting}}{Gurley \text{ Air Permeability of Porous Film after Heat Setting}}$$

Table 12 shows Relative Air Perm (as defined above) of the microporous film comparing Gurley air permeability before and after heat-setting for 1 hour at 90° C. (for each film type, four samples with 4 locations for each sample—each Relative Air Perm entry in the table is the average of 4 ratios determined from the 4 measurements in the 4 locations before and after heat-setting).

TABLE 12

Relative Air Permeability of microporous film before and after heat-setting for 1 hour at 90° C.

| Samples | Relative Air Permeability [1] for PP C7054-07NA-CS20-HS95 | Relative Air Permeability [1] for PP C7054-07NA-CS40-HS75 |
|---|---|---|
| 1 | 1.56 | 1.28 |
| 2 | 1.55 | 1.87 |
| 3 | 1.46 | 1.54 |
| 4 | 1.47 | 1.21 |
| Average Relative Air Perm [1] | 1.51 | 1.48 |

[1] Gurley air permeability is measured in seconds and represents the time taken for a given volume of gas to pass through a set area of film (so, a high Gurley number represents a lower permeability - hence Gurley permeability is actually the inverse of regular permeability measurements). A ratio greater than 1.0 means that the Gurley air permeability was higher without the heat setting step (and, conversely, the Gurley air permeability was lower after the heat setting step).

It can be seen from Table 12 that the average Relative Air Perm is about 1.5 for both stretched films, indicating that for the current inventive films the (regular) air permeability is increased by about 50% after heat setting which differs from the 24-88% flux loss that is disclosed in U.S. Pat. No. 3,843,761. The porous structure of the polyolefin-based microporous films disclosed in the current invention can tolerate the heat setting process.

The inventive breathable films can be prepared without an annealing step prior to stretching to produce microporous film, and, further, does not require any heat-setting step after pore formation. Moreover, in the event a heat-setting step is desired for some reason, the inventive films do not suffer any loss of permeability relative to films with no heat setting step.

Example 8

This Example presents the performance of PP copolymer biaxially stretched microporous films.

PP C7054-07NA copolymer film was subjected to simultaneous biaxial stretching, specifically 25% cold stretching at a rate of 100 mm/s at room temperature and 50% hot stretching at 5 mm/s at 100° C. As shown in Table 13, PP C7054-07NA biaxially stretched microporous film has a porosity of 34.7% and an average pore diameter of 44 nm. Correspondingly, the water vapor permeance for this microporous film is approximately 42 perms (Table 14), and, after aging at 65° C. for 168 hours, the water vapor permeance is increased to 60 perms (Table 14).

TABLE 13

Stretching conditions and the corresponding average pore size and porosity for biaxially stretched PP C7054-07NA microporous films.

| Sample ID | Degree of Cold Stretching (%) | Degree of Hot Stretching (%) | Hot Stretch Temperature (° C.) | Porosity (%) | Average Pore Diameter (nm) |
|---|---|---|---|---|---|
| PP C7054-CS25-HS50-biaxial | 25 | 50 | 100 | 35 | 44 |

TABLE 14

Water Vapor Permeance Data - PP C7054-07NA biaxially stretched microporous films.

| Aging Time at 65° C. (hours) | Water Vapor Permeance [1] (perms) |
|---|---|
| 1 | 42 |
| 168 | 60 |

[1] Water vapor permeance was measured according to ASTM E96/E96M-16. 1 US perm = 5.72 × 10$^{-8}$ g/(Pa · s · m$^2$).

The Example shows that biaxial stretching can also be employed to produce microporous films.

Example 9

Figure 7A:
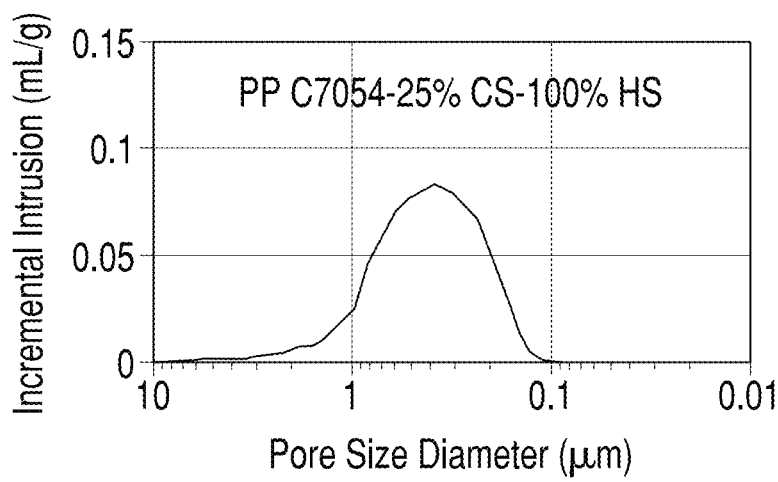
FIG. 7A shows Mercury Intrusion Porosimetry data for a 762 μm (30 mil) thick film of PP C7054-07NA after 25% cold stretching (room temperature) at 100 mm/s followed by 100% hot stretching (100° C.) at 5 mm/s.
Figure 7B:
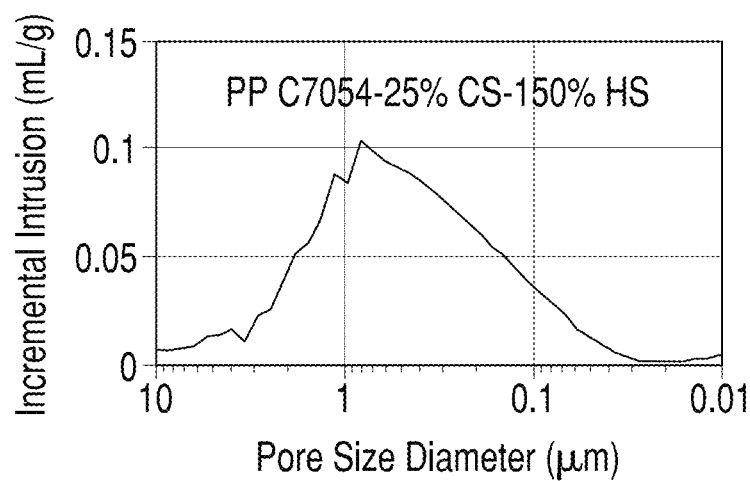
FIG. 7B shows Mercury Intrusion Porosimetry data for a 762 μm (30 mil) thick film of PP C7054-07NA after 25% cold stretching (room temperature) at 100 mm/s followed by 150% hot stretching (100° C.) at 5 mm/s.

In order to conduct a proof-of-concept study for roof membranes, a 762 μm (30-mil) thick PP C7054-07NA film was subjected to 25% cold stretching (CS) at a rate of 100 mm/s at room temperature and then 100% (and, for a second film, 150%) hot stretching (HS) at 5 mm/s at 100° C. The pore distribution data are illustrated in FIG. 7, ranging from a few 10's of nanometers to several microns. It can be seen from Table 15 that PP C7054-07NA-CS25-HS100, approximately 660 μm (25.5 mil) thick, has a porosity of 42.5%, affording a water vapor permeance of 58 perms; and PP C7054-07NA-CS25-HS150, approximately 533 μm (20.6 mil) thick, has a higher porosity of 55%, yielding a water vapor permeance of 62 perms.

TABLE 15

Porosity, average pore size and water vapor permeance of thick microporous films of PP copolymer.

| Samples | Thickness[1] (μm) | Porosity (%) | Average Pore Diameter (nm) | Water Vapor Permeance [2] (perms) |
|---|---|---|---|---|
| PP C7054-07NA-CS25-HS100 | 660 | 42 | 40 | 58 |
| PP C7054-07NA-CS25-HS150 | 533 | 55 | 108 | 62 |

[1] 1 mil = 1/1000 inch = 0.0254 mm
[2] Water vapor permeance was measured according to ASTM E96/E96M-16. 1 US perm = 5.72 × 10$^{-8}$ g/(Pa · s · m$^2$).

Useful porosity (for example, greater than 25%) and permeance values (for example, greater than 10 perms) were obtained even from the thicker 762 μm (30 mil) films, which suggests that the inventive films could find utility in breathable roof membranes.

Example 10

The stretched microporous PP copolymer films were evaluated in the context of medical packaging films and active packaging for which each end-use application may require a different combination or degree of air or water vapor permeability or barrier to microbes. Table 16 shows film thickness, basis weight, porosity and pore size (average pore diameter) for microporous films resulting from a variety of stretching conditions.

TABLE 16

Stretching conditions and film properties for PP C7054-07NA[1] microporous films.

| Sample ID[2] | Hot Stretch Temperature (° C.) | Thickness (μm) | Basis Weight (g/m$^2$) | Porosity (%) | Ave. Pore Diameter (nm) |
|---|---|---|---|---|---|
| 1 PP C7054-07NA-CS54 | N/A | 235 | 156 | 25 | 32 |
| 2 PP C7054-07NA-CS100 | N/A | 224 | 128 | n/t | n/t |

TABLE 16-continued

Stretching conditions and film properties for PP C7054-07NA[1] microporous films.

| Sample ID[2] | Hot Stretch Temperature (° C.) | Thickness (μm) | Basis Weight (g/m²) | Porosity (%) | Ave. Pore Diameter (nm) |
|---|---|---|---|---|---|
| 3 PP C7054-07NA-CS122 | N/A | 202 | 115 | 39 | 68 |
| 4 PP C7054-07NA-CS100-HS202-115C | 115 | 86 | 49 | 44 | 72 |
| 5 PP C7054-07NA-CS122-HS204-135C | 135 | 68 | 40 | 43 | 70 |
| 6 PP C7054-07NA-CS54-HS103-115C | 115 | 173 | 88 | 50 | 86 |
| 7* PP C7054-07NA-CS100-HS103-115C | 115 | 114 | 53 | 50 | 98 |
| 8 PP C7054-07NA-CS100-HS103-115C | 115 | 176 | 73 | 52 | 108 |
| 9 PP C7054-07NA-CS122-HS103-135C | 135 | 127 | 57 | 52 | 101 |
| Tyvek ® 1073B | N/A | 198 | 75 | 65 | 2500 |
| Medical Grade Paper | N/A | 80-130 | 59-83 | n/t | n/t |

[1] The composition of the PP C7054-07NA (PP copolymer) films is given in Table 2: 67.1 PP/32.9 EP by weight, where EP is 49.7 wt. % E and 50.3 wt. % P.
[2] The notation used for the Sample ID follows that in Table 4 (Example 3) above. In all cases, the cold stretch temperature was 25° C. Films 1-9 were produced by stretching 254 μm (10 mil) films, except film 7*, which was produced by stretching a 190 μm (7 mil) film.
3. "n/t" means not tested.

The same series of films was further studied for permeability properties (Table 17), physical properties (Table 18) and rate of gaseous fill/empty when used as medical packages (Table 19).

Table 17 shows key barrier properties (Gurley air permeability, water vapor permeance and F2638 barrier to microbes) obtained for the same microporous films shown in Table 16.

TABLE 17

Stretching conditions and permeability properties for PP C7054-07NA[1] microporous films.

| Sample ID [2] | Hot Stretch Temperature (° C.) | Gurley [3] (sec/100 cm³) | Water Vapor Permeance (perms) [4] | F2638 [5] (% $P_{max}$) |
|---|---|---|---|---|
| 1 PP C7054-07NA-CS54 | N/A | 45200 | n/t | ** |
| 2 PP C7054-07NA-CS100 | N/A | 37100 | n/t | ** |
| 3 PP C7054-07NA-CS122 | N/A | 17300 | n/t | ** |
| 4 PP C7054-07NA-CS100-HS202-115C | 115 | 10200 | 38 | ** |
| 5 PP C7054-07NA-CS122-HS204-135C | 135 | 5860 | 49 | 0.049 |
| 6 PP C7054-07NA-CS54-HS103-115C | 115 | 3300 | 54 | 0.018 |
| 7* PP C7054-07NA-CS100-HS103-115C | 115 | 3090 | 66 | 0.018 |
| 8 PP C7054-07NA-CS100-HS103-115C | 115 | 1680 | 76 | 0.055 |
| 9 PP C7054-07NA-CS122-HS103-135C | 135 | 860 | 92 | 0.045 |
| Tyvek ® 1073B | N/A | 22 | n/t | 0.015 |
| Medical Grade Paper | N/A | 14-22 | n/t | 1 to >10 |

[1] The composition of the PP C7054-07NA (PP copolymer) films is given in Table 2: 67.1 PP/32.9 EP by weight, where EP is 49.7 wt. % E and 50.3 wt. % P.
[2] The notation used for the Sample ID follows that in Table 16 (and also Table 4, Example 3) above. In all cases, the cold stretch temperature was 25° C. Films 1-9 were produced by stretching 254 μm (10 mil) films, except film 7*, which was produced by stretching a 190 μm (7 mil) film.
[3] Gurley air permeability is measured in sec/100 cm³, which means a lower number of seconds equates to a higher permeability.
[4] Water vapor permeance was measured according to ASTM E96/E96M-16. 1 US perm = 5.72 × 10⁻⁸ g/(P · s · m²).
[5] F2638 is a value (maximum penetration, %) denoting barrier to microbes (as determined by ASTM F2638). Smaller % $P_{max}$ numbers are better; porous materials with % $P_{max}$ 1-10 may be acceptable for sterile packaging, but % $P_{max}$ < 1 is used for sterile packaging of critical medical devices.
6. "n/t" means not tested.
** means the film is too impermeable; the instrument is unable to measure $P_{max}$ values that low.

Table 17 shows data for uniaxially stretched PP copolymer films and demonstrates that the permeability properties can be varied and controlled by varying the stretching conditions. Target ranges for various properties may be estimated by comparison to existing commercial products for these uses (such as Tyvek® 1073B, or medical grade paper), although these are not rigid targets because various end-uses exist for films of varying property balances (and, also, any one or more than one of the properties of the commercial products may significantly surpass the minimum target range required for that property). The barrier to microbes (as shown by the F2638 $P_{max}$ value) is already in a commercially viable target range, and the target for the Gurley air permeability (perhaps ~10-100 sec. in some applications) should also be accessible under optimized stretching conditions or by using biaxially stretched films. Some applications may also require a certain hydrohead value (resistance to a pressure of water). As shown in Table 16, the porosity and average pore diameter were measured for films 4-9; porosity did not vary too much (from 43% to 53%), and pore diameter ranged from 70 nm to 108 nm. Not shown in the table, films 1-9 had a hydrohead value >500 cmwc (cm of water column), which easily surpasses the hydrohead value of Tyvek® 1073B (hydrohead value for Tyvek® 1073B ~150 cmwc).

In addition to permeability properties, breathable films for medical films and active packaging also require adequate physical properties relating to film strength, such as tensile strength, tear strength and % elongation. Table 18 summarizes such properties for the same series of breathable PP copolymer microporous films.

The stretching process conditions can be varied to control the film thickness/basis weight as well as other physical properties (such as tensile strength, tear strength and elongation). The physical properties are important to maintain the integrity of the package during transportation, sterilization and storage, and to ensure the packaging structure does not tear when the package is peeled open.

At least compared to incumbent technologies, the tensile strength of these films would appear to be sufficient for most medical and active packaging uses.

Medical packages currently find a use as container packages that can be filled with a sterilant gas (such as steam or ethylene oxide) to sterilize the package contents (such as medical devices or instruments). The package is filled with the sterilant and the contents then remain resident with the sterilant gas for a resident time for the sterilization process, and the gas then expelled and the package sealed with the sterilized equipment inside. The package material provides a barrier to bacteria, microorganisms and particulate matter to maintain the sterility of medical devices inside the package post-sterilization until such equipment is ready for use.

Table 19 explores how the stretching process conditions may impact the fill/empty times of the PP copolymer films.

TABLE 18

Stretching conditions and physical properties for PP C7054-07NA[1] microporous films.

| Sample ID [2] | Hot Stretch Temp. (° C.) | Thickness (μm) | Tensile [3] (N/2.54 cm) | Elongation [3] (%) | Tear [3] (N) |
|---|---|---|---|---|---|
| 1<br>PP C7054-07NA-CS54 | N/A | 235 | 34 | 148 | 0.69 |
| 2<br>PP C7054-07NA-CS100 | N/A | 224 | 35 | 108 | 0.26 |
| 3<br>PP C7054-07NA-CS122 | N/A | 202 | 41 | 115 | 0.22 |
| 4<br>PP C7054-07NA-CS100-HS202-115C | 115 | 86 | 45 | 160 | 0.01 |
| 5<br>PP C7054-07NA-CS122-HS204-135C | 135 | 68 | 41 | 102 | 0.00 |
| 6<br>PP C7054-07NA-CS54-HS103-115C | 115 | 173 | 39 | 272 | 0.07 |
| 7*<br>PP C7054-07NA-CS100-HS103-115C | 115 | 114 | 36 | 197 | 0.03 |
| 8<br>PP C7054-07NA-CS100-HS103-115C | 115 | 176 | 45 | 282 | 0.02 |
| 9<br>PP C7054-07NA-CS122-HS103-135C | 135 | 127 | 44 | 141 | 0.02 |
| Tyvek ® 1073B | N/A | 198 | 68 | 20 | 1.01 |
| Medical Grade Paper | N/A | 80-130 | 28-59 | <0.1 | 0.03 |

[1] The composition of the PP C7054-07NA (PP copolymer) films is given in Table 2: 67.1 PP/32.9 EP by weight, where EP is 49.7 wt. % E and 50.3 wt. % P.
[2] The notation used for the Sample ID follows that in Tables 16-17 (and also Table 4, Example 3) above. In all cases, the cold stretch temperature was 25° C. Films 1-9 were produced by stretching 254 μm (10 mil) films, except film 7*, which was produced by stretching a 190 μm (7 mil) film.
[3] Tensile strength, tear strength and elongation were measured in the machine direction; lower numbers are obtained if measured in the transverse (cross) direction, although the effect may be negated if biaxial stretching is employed.

TABLE 19

Stretching conditions and fill/empty times for PP C7054-07NA[1] microporous films used in medical/active package.

| Sample ID [2] | Gurley [3] (sec/100 cm³) | Bendtsen [3] (mL/min) | Bendtsen [3] (mL/min · cm²) | Time to fill pouch [4] 18 × 14 × 5 cm³ (Tyvek 1073B/ breathable film) (sec) | % Improved time to fill |
|---|---|---|---|---|---|
| 1 PP C7054-07NA-CS54 | 45200 | 0.3 | 0.026 | 5.5 | 0 |
| 2 PP C7054-07NA-CS100 | 37100 | 0.3 | 0.032 | 5.5 | 1 |
| 3 PP C7054-07NA-CS122 | 17300 | 0.7 | 0.069 | 5.5 | 1 |
| 4 PP C7054-07NA-CS100-HS202-115C | 10200 | 1 | 0.117 | 5.4 | 2 |
| 5 PP C7054-07NA-CS122-HS204-135C | 5860 | 2 | 0.204 | 5.3 | 4 |
| 6 PP C7054-07NA-CS54-HS103-115C | 3300 | 4 | 0.362 | 5.2 | 6 |
| 7* PP C7054-07NA-CS100-HS103-115C | 3090 | 4 | 0.387 | 5.2 | 7 |
| 8 PP C7054-07NA-CS100-HS103-115C | 1980 | 6 | 0.603 | 5.0 | 10 |
| 9 PP C7054-07NA-CS122-HS103-135C | 860 | 13 | 1.34 | 4.4 | 20 |
| Breathable Film (1) | 300 | 40 | 3.98 | 3.2 | 42 |
| Breathable Film (2) | 100 | 120 | 11.95 | 1.7 | 69 |
| Tyvek ® 1073B | 22 | 543 | 54.32 | 0.5 | 91 |

[1] The composition of the PP C7054-07NA (PP copolymer) films is given in Table 2: 67.1 PP/32.9 EP by weight, where EP is 49.7 wt. % E and 50.3 wt. % P.
[2] The notation used for the Sample ID follows that in Tables 16-18 (and also Table 4, Example 3) above.
[3] Gurley air permeability is measured in sec/100 cm³, which means a lower number of seconds equates to a higher permeability. Bendtsen air permeability is a similar permeability measurement to the Gurley air permeability, except it is expressed as a flow rate (mL/min, and therefore has an inverse relationship to the Gurley permeability), and also can be expressed as a flow rate/unit area (mL/(min · cm²)).
[4] The time to fill the pouch is calculated from the Bendtsen flow rate/unit area for a pouch (18 × 14 × 5 cm³) constructed from 2 films: one half is Tyvek ® 1073B, the other half is the breathable film of column A in the table.

In Table 19, above, the improvement in the Gurley air permeability between the Comparative films (just cold stretched) and the Inventive films ranges from 45,200 to 860 sec., and this already shows a 20% improvement in time to fill (or empty) a medical package with gas. Table 19 also includes Breathable Film (1) and Breathable Film (2) which are hypothetical films having a Gurley air permeability of 300 sec and 100 sec, respectively, to show that relatively modest improvements in the Gurley air permeability, even without matching the Gurley air permeability of Tyvek® 1073B, would correspond to a significant % improvement in time to fill (or empty) a medical package with gas, which could translate to a significant cost saving when such medical packages are used for sterilization of medical instruments and devices.

The PP copolymer microporous films described herein are well suited as medical packaging. Compared to polyethylene incumbent technologies, the sterilization process can be performed at a higher temperature on account of the higher melting temperature of the PP copolymer films compared to the polyethylene films (for example, a typical melting temperature for high-density polyethylene, by DSC, is approximately 125-130° C., whereas, a typical melting temperature for the inventive PP-EP copolymers disclosed herein, by DSC, is approximately 168° C.). Furthermore, the PP copolymer films are easily thermoformed (allowing easily customizable packaging for a variety of medical devices and instruments) and heat-sealable (for easy sealing of the sterilized packs).

When ranges are used herein for physical properties, such as temperature ranges and pressure ranges, or chemical properties, such as monomer or copolymer content, all combinations, and sub-combinations of ranges, as well as specific embodiments therein, are intended to be included.

The disclosures of each patent, patent application, and publication cited or described in this document are hereby incorporated herein by reference, in their entirety.

Those skilled in the art will appreciate that numerous changes and modifications may be made to the preferred embodiments of the invention and that such changes and modifications may be made without departing from the spirit of the invention. It is, therefore, intended that the appended claims cover all such equivalent variations as fall within the true spirit and scope of the invention.

Reference Example

A number of PP copolymer films having different thicknesses were extrusion cast using a 2.5-inch single-screw extruder manufactured by Davis-Standard, LLC and a 24-inch-wide cast die onto a chill roll set at a temperature of 80° C. to produce films with smooth surfaces. The base resin is PP C7054-07NA, which is a polypropylene copolymer available from Braskem American, Inc. (product code C7054-07NA). The extruder was maintained at a constant temperature profile of 460° F. (238° C.) and the chill roll temperature was heated by heating oil. The resulting film thicknesses are summarized in Table 20.

TABLE 20

| Film | Film Thickness (mil) |
|---|---|
| 1 | 5 |
| 2 | 10 |
| 3 | 15 |
| 4 | 20 |
| 5 | 30 |
| 6 | 40 |

Example 11

Figure 8:
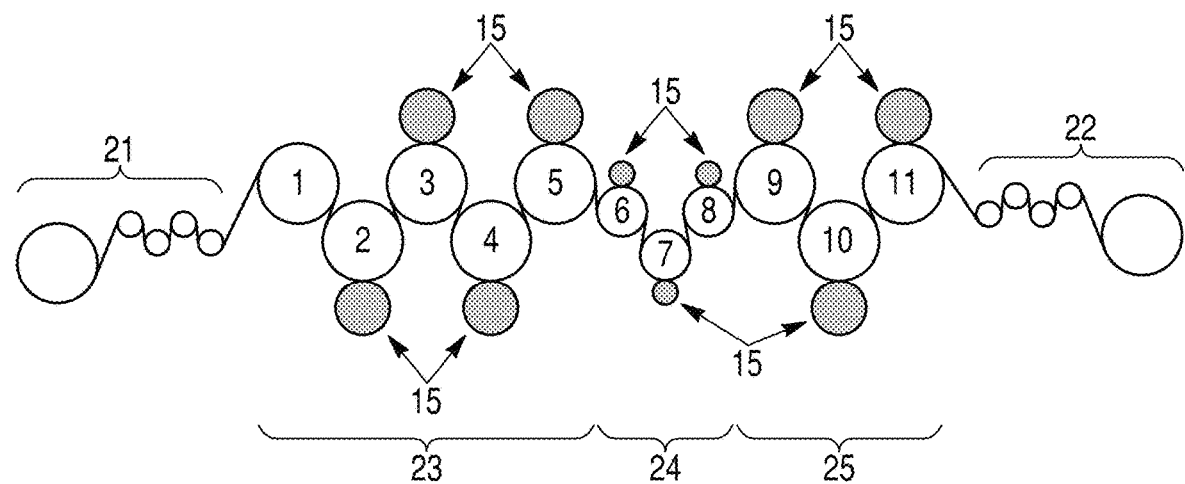
FIG. 8 is an illustration of one suitable multi-stage stretching process for either cold or hot machine direction orientation (MDO) of films using rolls.

Samples of the individual films of Table 20 were then stretched in the machine direction (MDO—machine direction orientation) using a multi-stage cold stretching process such as the one shown in FIG. 8, Samples of each of the PP copolymer films from Table 20 were mounted on the unwinder section 20 and guided through eleven stretching rollers (1 to 11), comprising a pre-stretching section 23, a stretching section 24, and an annealing section 25, and then rewound onto the winder section 21. The nip rollers were then closed to apply pressure on the film to prevent slippage during the stretching. The roller speeds of rollers 3-7 were slowly increased to stretch the films 50% or 100% at 25° C. During the stretching process, the film turned from translucent color to white color, which is indicative of initial pore formation. The cold-stretched film was then heated by rollers 9-11 at 140° C. in the annealing section 25 to fix the pore structure induced by the cold stretching steps. The film was then cooled and rewound onto the winder. Properties of the final films that were measured are summarized in Table 21. The degree of cold stretching was defined as (Total Roller Speed Ratio−1) ×100%, where the total roll speed ratio is a result of multiplying all the roller speed ratios together (from roller 2/roller 1 to roller 8/roller 7).

TABLE 21

| Example | Film | Film Thickness Before Stretching (mil) | MDO Cold* | Water Vapor Permeance (perm) | Air Permeability (s/100 cc) | Porosity (%) | Average Pore Diameter (nm) |
|---|---|---|---|---|---|---|---|
| 11-1 | 1 | 5 | 50.0 | 1.3 | 10412.1 | 23.2 | 31 |
| 11-2 | 1 | 5 | 100.0 | 2.1 | 7440.2 | 35 | 51.8 |
| 11-3 | 2 | 10 | 50.0 | 0.8 | 7786.5 | 22.4 | 29.5 |
| 11-4 | 2 | 10 | 100 | — | — | — | — |
| 11-5 | 3 | 15 | 50.0 | 3.1 | 14186.4 | 25.4 | 32.4 |
| 11-6 | 3 | 15 | 100.0 | 19.6 | 16469.1 | 37.5 | 55.5 |
| 11-7 | 4 | 20 | 50.0 | 2.6 | 24584.5 | 25.6 | 34.5 |
| 11-8 | 4 | 20 | 100.0 | 17.1 | 23709 | 36.1 | 50.9 |
| 11-9 | 5 | 30 | 50.0 | 1.9 | 26612.7 | 16 | 18.6 |
| 11-10 | 6 | 40 | 50 | — | — | — | — |

*Degree of Cold Stretching at 25° C. (%)

The MDO cold-stretched films were then further hot stretched in the machine direction (MDO) using the same multi-stage process as shown in FIG. 8; however, for the heat stretching the process comprised a pre-heat stretching section 23, a hot stretching section 24, and an annealing section 25. Each of the MDO cold-stretched films was mounted on the unwinder section and guided through the eleven stretching rollers, and then rewound onto the other winder section 21. In this process, the first eight rollers were set to the hot stretching temperature of 135° C. The nip rollers were closed to apply pressure on the film to prevent slippage during the stretching and the roller speeds of rollers 5-8 were then slowly increased to stretch the films 50% or 100% at 135° C. After the hot stretching steps were completed, the film was annealed on rollers 9-11 at 140° C. in order to reduce film shrinkage. The film was then cooled in the winder section 22 and wound into a roll. The degree of hot stretching was defined as (Total Roller Speed Ratio−1)× 100%, where the total roller speed ratio is a result of multiplying all the roller speed ratios together (from roller 5/roller 4 to roller 8/roller 7). It can be seen from Table 22 that upon the completion of MDO hot-stretching, the porosity and average pore diameter of PP films were increased, giving rise to higher water vapor permeance and lower Gurley air permeability.

TABLE 22

| Ex. | Film | MDO * Cold/Hot | Water Vapor Permeance (perm) | Air Permeability (s/100 cc) | Porosity (%) | Average Pore Diameter (nm) |
|---|---|---|---|---|---|---|
| 11a | 1 | 50/50 | 30.2 | 7690 | 33.9 | 53.8 |
| 11b | 1 | 50/100 | 13.2 | 5192 | 35.9 | 57.8 |
| 11c | 1 | 100/50 | 30.5 | 2579 | 43.50 | 68.10 |
| 11d | 1 | 100/100 | 19.4 | 7536 | 40.3 | 69.8 |
| 11e | 2 | 50/50 | 32.1 | 6212 | 34.9 | 49.2 |
| 11f | 2 | 50/100 | 29.1 | 1356 | 41.0 | 59.2 |
| 11g | 2 | 100/50 | 63 | 2641 | 52.5 | 96.7 |
| 11h | 3 | 50/50 | 76.4 | 1701 | 47.7 | 87.6 |
| 11i | 3 | 50/100 | 74.4 | 1296 | 52.3 | 102.9 |
| 11j | 3 | 100/50 | 56.1 | 2562 | 40.4 | 68.3 |
| 11k | 3 | 100/100 | 52.9 | 2562 | 49.4 | 82.9 |

TABLE 22-continued

| Ex. | Film | MDO * Cold/Hot | Water Vapor Permeance (perm) | Air Permeability (s/100 cc) | Porosity (%) | Average Pore Diameter (nm) |
|---|---|---|---|---|---|---|
| 11l | 4 | 50/50 | 46.6 | 3661 | 41.6 | 65.2 |
| 11m | 4 | 50/100 | 54.0 | 2580 | 48.3 | 82.5 |
| 11n | 4 | 100/50 | 76.7 | 1652 | 49.4 | 86.1 |
| 11o | 4 | 100/100 | 72.1 | 1328 | 54.0 | 106.7 |
| 11p | 5 | 50/50 | 25.5 | 7998 | 38.8 | 64.4 |
| 11q | 5 | 50/100 | 22.3 | 10090 | 42.8 | 79.0 |
| 11r | 6 | 50/50 | 22.7 | 7185 | 34.3 | 51.8 |

* Degree of MDO Cold Stretching at 25° C. (%)/Degree of MDO Hot Stretching at 135° C. (%)

Example 12

To illustrate that hot stretching can have an adverse effect on the pore formation as well as air and water vapor permeability, the cold and hot stretching processes as previously discussed were applied to samples of Film 1 that were cold stretched 122% in the machine direction at 25° C., followed by hot stretching in the machine direction 103% to 405%. As shown in Table 23, the porosity and permeability of the films deteriorated with higher temperature stretching. As a result, biaxial stretching was proposed to further increase the porosity and pore size, thus giving rise to higher water vapor permeability and lower Gurley air permeability

TABLE 23

| Item | Film | MDO* Cold/Hot | Porosity (%) | Average Pore Diameter (nm) | Gurley Air Permeability (s/100 cc) | Water Vapor Permeance (perm) |
|---|---|---|---|---|---|---|
| 12a | 2 | 122/103 | 52 | 101.1 | 862.0 | 91.6 |
| 12b | 2 | 122/204 | 43.4 | 69.7 | 4501.1 | 49.1 |
| 12c | 2 | 122/302 | 38.7 | 64.3 | 16185.4 | 25.7 |
| 12d | 2 | 122/405 | 34.2 | 52.8 | 21429.5 | 6.2 |

* Degree of MDO Cold Stretching at 25° C. (%)/Degree of MDO Hot Stretching at 135° C. (%)

Example 13

Figure 9:
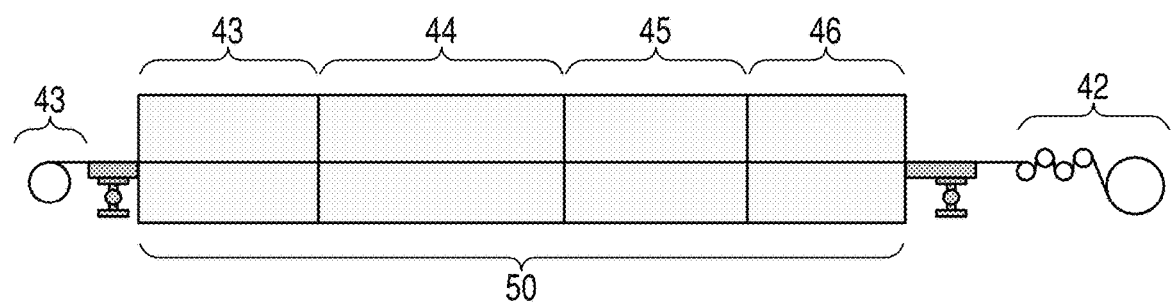
FIG. 9 is an illustration of one suitable multi-stage stretching process for transverse direction orientation (TDO) of films using an oven.

A selection of the MDO cold and hot-stretched films of Example 11 were then further hot stretched in the transverse direction using a process such as shown in FIG. 9, comprising unwind section 41, a multi-zoned oven 50 that had a pre-heating section 43, a TDO (transverse direction orientation) stretching section 44, an annealing section 45, and a cooling zone 46. The TDO line had an infeed width ranging from 127 mm to 1,016 mm clip-to-clip, and an outlet width range of 203 mm to 2,184 mm clip-to-clip for stretching the film in the transverse direction. The TDO clips were capable of holding a wide range of materials with a film thickness range of 25 μm-2.54 mm. Following the heated zones (43, 44, & 45), there was a 1.5 m long cooling zone 46 equipped with circulated ambient air. After the TDO oven was pre-heated to the target temperature (135° C.), the MDO-stretched film was mounted on the unwinder and guided through infeed section of the TDO line. The film was gradually gripped by clips and pulled through the preheat zone at the same width. The film was then stretched in the transverse direction till it reached the target degree of TDO stretching. Upon the completion of stretching, the film was taken through the annealing section 45 at 140° C. followed by quenching by circulated ambient air in the cooling zone 46. After that, the stretched film was guided through the rollstack and wound onto the winder section 42. To simplify the experiments, the line speed was fixed at 2 m/min. The degree of TDO stretching varied from 50% to 400%. Table 24 gives the stretching conditions and properties for biaxially stretched PP breathable films, which were prepared by MDO cold stretching, MDO hot stretching, and then TDO hot stretching. All of the samples had a hydrohead of >300. These experiments illustrated that biaxial stretching is very effective in additional opening of the pores in the film. It can be seen from Table 24 that many of the biaxially stretched films have a porosity close to 70% and an average pore diameter greater than 200 nm. Correspondingly, most of samples have a Gurley air permeability of <100 s/100 cc and some of samples fall within 20-30 s/100 cc, while a lot of samples have a water vapor permeance of >100 perm. At the same time, although not shown in the table, all of films have a hydrohead >300 cm, indicating good water holdout. Further, the microbial barrier measured by F2638 (% Pmax) shows very good results (well within the target).

TABLE 24

| Ex. | Film | MDO Cold/Hot* | TDO Hot** | Base Weight (g/m²) | Film Thickness (μm) | Porosity (%) | Average Pore Diameter (nm) | Water Vapor Permeance (perm) | Gurley Air Permeability (s/100 cc) | F2638 (% Pmax) |
|---|---|---|---|---|---|---|---|---|---|---|
| 13a | 3 | 50/50 | 50 | 104.8 | 325.1 | 63.1 | 191.0 | 145.2 | 85.2 | 0.045 |
| 13b | 3 | 50/50 | 75 | 90.2 | 307.3 | 65.4 | 203.3 | 142.4 | 51.2 | 0.028 |
| 13c | 3 | 50/50 | 100 | 119.0 | 335.3 | 55.6 | 160.7 | 136.9 | 100.2 | 0.014 |
| 13d | 3 | 100/100 | 50 | 106.8 | 317.5 | 55.2 | 142.8 | 127.6 | 90.5 | 0.062 |
| 13e | 3 | 100/100 | 75 | 93.6 | 292.1 | 61.2 | 231.0 | 124.8 | 70.4 | 0.028 |
| 13f | 3 | 100/100 | 100 | 81.4 | 294.6 | 68.3 | 234.4 | 148.8 | 51.5 | 0.051 |
| 13g | 3 | 100/100 | 125 | 72.6 | 284.5 | 65.8 | 254.8 | 99.2 | 40.3 | 0.011 |
| 13h | 3 | 100/100 | 150 | 65.1 | 274.3 | 65.6 | 230.8 | 140.5 | 42.1 | 0.032 |
| 13i | 4 | 100/100 | 50 | 109.5 | 368.3 | 61.8 | 197.9 | 145.0 | 70.0 | 0.085 |
| 13j | 4 | 100/100 | 100 | 77.3 | 320.0 | 65.3 | 249.9 | 123.2 | 49.7 | 0.028 |
| 13k | 4 | 100/100 | 125 | 69.2 | 315.0 | 69.1 | 296.5 | 147.6 | 30.7 | 0.012 |
| 13l | 4 | 100/100 | 150 | 70.2 | 337.8 | 69.0 | 343.9 | 149.1 | 28.1 | 0.019 |
| 13m | 4 | 50/50 | 25 | 209.5 | 449.6 | 49.4 | 102.8 | 103.1 | 258.3 | 0.044 |
| 13n | 4 | 50/50 | 50 | 171.2 | 449.6 | 56.5 | 152.2 | 111.1 | 132.0 | 0.010 |
| 13o | 4 | 50/50 | 100 | 117.7 | 396.2 | 65.6 | 208.9 | 119.0 | 96.0 | 0.076 |
| 13p | 4 | 50/50 | 200 | 97.0 | 416.6 | 67.4 | 300.2 | 123.9 | 58.1 | 0.020 |
| 13q | 4 | 50/50 | 300 | 75.3 | 256.5 | 66.5 | 305.2 | 116.7 | 44.1 | 0.009 |
| 13r | 4 | 50/50 | 400 | 60.4 | 312.4 | 66.1 | 287.5 | 124.1 | 42.9 | 0.013 |
| 13s | 5 | 50/100 | 50 | 223.4 | 673.1 | 57.5 | 213.4 | 110.9 | 174.4 | 0.024 |
| 13t | 5 | 50/100 | 100 | 148.5 | 591.8 | 61.2 | 189.2 | 133.0 | 101.0 | 0.017 |
| 13u | 5 | 50/100 | 150 | 105.8 | 538.5 | 68.7 | 275.2 | 134.7 | 76.7 | 0.051 |
| 13v | 6 | 50/50 | 25 | — | 1013.5 | 45.7 | 90.1 | 70.5 | 521.8 | — |
| 13w | 6 | 50/50 | 50 | — | 1016.0 | 48.0 | 104.9 | 92.8 | 235.7 | — |
| 13x | 6 | 50/50 | 100 | — | 990.6 | 57.7 | 151.3 | 99.8 | 136.5 | — |

*Degree of MDO Cold Stretching at 25° C. (%)/Degree of MDO Hot Stretching at 135° C. (%)
**Degree of TDO Hot Stretching at 135° C. (%)

Example 14

Table 25 shows the stretching conditions and properties for biaxially stretched PP breathable films, which were prepared by MDO cold stretching followed only by TDO hot stretching. Even without MDO hot stretching, very high porosities can be achieved. Also, the porosity and average pore diameter kept increasing as the degree of TDO stretching increases. Correspondingly, these PP breathable films exhibit comparable water vapor permeance, Gurley air permeability, and microbial barrier.

TABLE 25

| Ex. | Film | MDO Cold/TDO Hot* | Base Weight (g/m²) | Film Thickness (µm) | Porosity (%) | Average Pore Diameter (nm) | Water Vapor Permeability (perm) | Gurley Air Permeability (s/100 cc) | F2638 (% Pmax) |
|---|---|---|---|---|---|---|---|---|---|
| 14a | 2 | 50/25 | 152.6 | 238.8 | 33.3 | 50.2 | 58.9 | 1425.0 | 0.037 |
| 14b | 2 | 50/50 | 129.9 | 238.8 | 40.4 | 67.3 | 100.4 | 522.1 | 0.037 |
| 14c | 2 | 50/100 | 101.7 | 236.2 | 51.0 | 122.8 | 114.7 | 206.1 | 0.033 |
| 14d | 2 | 50/150 | 83.4 | 215.9 | 60.8 | 166.3 | 118.6 | 116.3 | 0.014 |
| 14e | 2 | 50/200 | 64.1 | 190.5 | 61.7 | 175.3 | 132.9 | 101.6 | 0.022 |
| 14f | 2 | 50/300 | 45.1 | 157.5 | 63.8 | 213.0 | 119.9 | 96.9 | 0.005 |
| 14g | 3 | 50/25 | — | 381.0 | 33.8 | 54.5 | 70.0 | 1252.2 | — |
| 14h | 3 | 50/50 | — | 381.0 | 42 | 75.5 | 98.9 | 545.1 | — |
| 14i | 3 | 100/25 | — | 378.5 | 45.8 | 83.3 | 125.4 | 418.1 | — |
| 14j | 3 | 100/50 | — | 378.5 | 52.7 | 136.2 | 134.1 | 223.9 | — |
| 14k | 3 | 100/100 | — | 355.6 | 63.7 | 186.1 | 125.4 | 83.9 | — |
| 14l | 4 | 50/25 | — | 508.0 | 32.4 | 51.6 | 60.7 | 2310.3 | — |
| 14m | 4 | 50/50 | — | 508.0 | 40.2 | 66.5 | 93.8 | 247.9 | — |
| 14n | 4 | 50/100 | — | 495.3 | 49.1 | 114.3 | 121.1 | 136.2 | — |
| 14o | 4 | 50/150 | — | 490.2 | 58.7 | 148 | 118.3 | 90 | — |
| 14p | 4 | 100/50 | — | 482.6 | 49 | 112.1 | 124.9 | 150.5 | — |
| 14q | 4 | 100/100 | — | 482.6 | 58 | 158.1 | 125.9 | 125.1 | — |
| 14r | 4 | 100/150 | — | 469.9 | 58.6 | 183.7 | 137.6 | 66.8 | — |
| 14s | 5 | 50/25 | — | 762.0 | 24.9 | 32.6 | 7.3 | 35208.4 | — |
| 14t | 5 | 50/50 | — | 749.3 | 34.7 | 51.9 | 11.1 | 17360.9 | — |

*Degree of MDO Cold Stretching at 25° C. (%)/Degree of TDO Hot Stretching at 135° C. (%)

Example 15

A key property for a waterproof and breathable roof membrane is that it must pass the hydrohead test of holding out 30 meters of water for at least 30 minutes. A selection of the stretched films were made and tested for use as roof membranes. As can be seen from Table 26, all the samples made via cold & hot MDO stretching passed the hydrohead test. These MDO samples had a film thickness ranging from 0.19 mm to 0.53 mm and show a water vapor transmission rate (WVTR) varying from 29.1 perm to 76.7 perm. The biaxially stretched samples made via cold MDO stretching followed by hot TDO stretching did not pass the hydrohead test, which was attributed to the more interconnected pores created by the biaxial stretching process.

TABLE 26

| Ex. | Film | MDO Cold/MDO Hot* | MDO Cold/TDO Hot** | Film Thickness (mm) | WVTR (perms) | Hydrohead (30 m, >30 min) | Porosity (%) | Average Pore Diameter (nm) |
|---|---|---|---|---|---|---|---|---|
| 15d | 2 | 50/100 | NA | 0.19 | 29.1 | Pass | 41 | 59.2 |
| 15e | 3 | 50/50 | NA | 0.30 | 74.4 | Pass | 52.3 | 102.9 |
| 15h | 3 | 100/50 | NA | 0.36 | 56.1 | Pass | 40.4 | 68.3 |
| 15g | 3 | 100/100 | NA | 0.3 | 52.9 | Pass | 49.4 | 82.9 |
| 15f | 4 | 50/50 | NA | 0.53 | 46.6 | Pass | 41.6 | 65.2 |
| 15c | 4 | 100/50 | NA | 0.46 | 76.7 | Pass | 49.4 | 86.1 |
| 15b | 4 | 100/100 | NA | 0.45 | 72.1 | Pass | 54 | 106.7 |
| 15i | 2 | NA | 50/25 | 0.25 | 58.9 | No Pass | 33.3 | 50.2 |
| 15j | 2 | NA | 50/100 | 0.22 | 114.7 | No Pass | 51 | 122.8 |
| 15p | 3 | NA | 50/50 | 0.30 | 145.2 | No Pass | 63.1 | 191 |
| 15o | 3 | NA | 100/25 | 0.35 | 125.4 | No Pass | 45.8 | 83.3 |
| 15n | 3 | NA | 100/50 | 0.36 | 134.1 | No Pass | 52.7 | 136.2 |
| 15k | 3 | NA | 100/100 | 0.31 | 127.6 | No Pass | 55.2 | 142.8 |
| 15l | 3 | NA | 100/100 | 0.36 | 125.4 | No Pass | 63.7 | 186.1 |
| 15m | 4 | NA | 50/100 | 0.60 | 121.1 | No Pass | 49.1 | 114.3 |

*Degree of MDO Cold Stretching at 25° C. (%)/Degree of MDO Hot Stretching at 135° C. (%)
**Degree of MDO Cold Stretching at 25° C. (%)/Degree of TDO Hot Stretching at 135° C. (%)

Example 16

Polypropylene (PP) film samples were made via cold & hot MDO stretching and were tested for use as a roof underlay. All of the samples shown in Table 27 passed the water tightness (W1), durability after aging (EN 1297 &EN 1296), flexibility at low temperatures (≤−20° C.), and driving rain test (from TU Berlin). However, it can be seen from Table 27 that samples 16a and 16b had low nail tear strength properties due to low film thickness after stretching. Samples 16c and 16d illustrate that acceptable nail tear strength can be achieved by increasing the film thickness. Samples 16e, 16f, and 16g illustrate other possible solutions, which is to laminate the thinner films with grids or nonwoven films. 16e is laminated to a D&L grid, 16f is laminates with Thermanet®, and 16g is laminated to spunbonded PP nonwoven, and property data for these laminates are shown in the Table 27. These laminated films demonstrated significant improvement in nail tear strength.

TABLE 27

| Ex. | MDO Cold/MDO Hot* | Thickness before/after stretching, mil | Tensile strength, N/5 cm MD | XD | Elongation, % MD | XD | Nail tear, N MD | XD | MVTR, $g/m^2 \cdot 24$ hr |
|---|---|---|---|---|---|---|---|---|---|
| 16a | 62/103 | 7.5/4.8** | 207.22 | 42.92 | 36.04 | 79.19 | 6.83 | 22.62 | 427.37 |
| 16b | 62/103 | 7.5/5.4 | 213.28 | 47.01 | 50.55 | 115.06 | 7.05 | 15.29 | 642.25 |
| 16c | 100/50 | 15/13.6 | 182.9 | 394.52 | 167.93 | 21.5 | 77.8 | 60.94 | 395.32 |
| 16d | 50/50 | 30/29.1 | 700.58 | 401.12 | 22.47 | 137.78 | 199.42 | 125.44 | 200.44 |
| 16e# | 54/103 | 10/7.6 | 467.29 | 189.22 | 13.46 | 13.78 | 121.39 | 109.94 | 360.58 |
| 16f# | 54/103 | 7.5/5.3** | 266.59 | 116.94 | | 21.59 | 29.63 | 28.36 | 624.14 |
| 16g# | 62/103 | 7.5/4.8** | 277.13 | 142.5 | 13.45 | 55.758 | 81.71 | 100.82 | 110.32 |

*Degree of MDO Cold Stretching at 25° C. (%)/Degree of MDO Hot Stretching at 135° C. (%)
**Includes UV additive
Laminated properties Example 17

Microbial barrier testing was compiled on a selection of the films from Examples 13 and 14 according to ASTM F2638, along with additional particulate barrier testing per a TSI-8130 automated filter tester. The resulting data is given in the Table 28. Biaxial stretching enabled the increase in the porosity and average pore diameter, thus leading to lower Gurley air permeability to below 100 s/100 $cm^3$. All the biaxially stretched samples also exhibited very good microbial barrier within the target (<0.25% Pmax). Furthermore, the burst pressure measured by hydrohead test was higher than 5 meters for all the biaxially stretched PP breathable films.

TABLE 28

| Ex. | Film | MDO Cold/Hot* | TDO Hot** | Base Weight (g/m²) | Film Thickness (μm) | Porosity (%) | Average Pore Diameter (nm) | Gurley Air Permeability (s/100 cc) | F2638 (% Pmax) | TSI-8130 (Ave. P) |
|---|---|---|---|---|---|---|---|---|---|---|
| 13a | 3 | 50/50 | 50 | 104.8 | 325.1 | 63.1 | 191.0 | 85.2 | 0.045 | 0.028 |
| 13b | 3 | 50/50 | 75 | 90.2 | 307.3 | 65.4 | 203.3 | 51.2 | 0.028 | 0.032 |
| 13c | 3 | 50/50 | 100 | 119.0 | 335.3 | 55.6 | 160.7 | 100.2 | 0.014 | 0.030 |
| 13d | 3 | 100/100 | 50 | 106.8 | 317.5 | 55.2 | 142.8 | 90.5 | 0.062 | 0.027 |
| 13e | 3 | 100/100 | 75 | 93.6 | 292.1 | 61.2 | 231.0 | 70.4 | 0.028 | 0.033 |
| 13f | 3 | 100/100 | 100 | 81.4 | 294.6 | 68.3 | 234.4 | 51.5 | 0.051 | 0.032 |
| 13g | 3 | 100/100 | 125 | 72.6 | 284.5 | 65.8 | 254.8 | 40.3 | 0.011 | 0.023 |
| 13h | 3 | 100/100 | 150 | 65.1 | 274.3 | 65.6 | 230.8 | 42.1 | 0.032 | 0.032 |
| 13i | 4 | 100/100 | 50 | 109.5 | 368.3 | 61.8 | 197.9 | 70.0 | 0.085 | 0.031 |
| 13j | 4 | 100/100 | 100 | 77.3 | 320.0 | 65.3 | 249.9 | 49.7 | 0.028 | 0.030 |
| 13k | 4 | 100/100 | 125 | 69.2 | 315.0 | 69.1 | 296.5 | 30.7 | 0.012 | 0.027 |
| 13l | 4 | 100/100 | 150 | 70.2 | 337.8 | 69.0 | 343.9 | 28.1 | 0.019 | 0.035 |
| 13m | 4 | 50/50 | 25 | 209.5 | 449.6 | 49.4 | 102.8 | 258.3 | 0.044 | 0.027 |
| 13n | 4 | 50/50 | 50 | 171.2 | 449.6 | 56.5 | 152.2 | 132.0 | 0.010 | 0.037 |
| 13o | 4 | 50/50 | 100 | 117.7 | 396.2 | 65.6 | 208.9 | 96.0 | 0.076 | 0.032 |
| 13p | 4 | 50/50 | 200 | 97.0 | 416.6 | 67.4 | 300.2 | 58.1 | 0.020 | 0.031 |
| 13q | 4 | 50/50 | 300 | 75.3 | 256.5 | 66.5 | 305.2 | 44.1 | 0.009 | 0.030 |
| 13r | 4 | 50/50 | 400 | 60.4 | 312.4 | 66.1 | 287.5 | 42.9 | 0.013 | 0.026 |
| 13s | 5 | 50/100 | 50 | 223.4 | 673.1 | 57.5 | 213.4 | 174.4 | 0.024 | 0.055 |
| 13t | 5 | 50/100 | 100 | 148.5 | 591.8 | 61.2 | 189.2 | 101.0 | 0.017 | 0.032 |
| 13u | 5 | 50/100 | 150 | 105.8 | 538.5 | 68.7 | 275.2 | 76.7 | 0.051 | 0.028 |

TABLE 28-continued

| Ex. | Film | MDO Cold/Hot* | TDO Hot** | Base Weight (g/m²) | Film Thickness (μm) | Porosity (%) | Average Pore Diameter (nm) | Gurley Air Permeability (s/100 cc) | F2638 (% Pmax) | TSI-8130 (Ave. P) |
|---|---|---|---|---|---|---|---|---|---|---|
| 14a | 2 | 50/none | 25 | 152.6 | 238.8 | 33.3 | 50.2 | 1425.0 | 0.037 | 0.183 |
| 14b | 2 | 50/none | 50 | 129.9 | 238.8 | 40.4 | 67.3 | 522.1 | 0.037 | 0.103 |
| 14c | 2 | 50/none | 100 | 101.7 | 236.2 | 51.0 | 122.8 | 206.1 | 0.033 | 0.030 |
| 14d | 2 | 50/none | 150 | 83.4 | 215.9 | 60.8 | 166.3 | 116.3 | 0.014 | 0.031 |
| 14e | 2 | 50/none | 200 | 64.1 | 190.5 | 61.7 | 175.3 | 101.6 | 0.022 | 0.036 |
| 14f | 2 | 50/none | 300 | 45.1 | 157.5 | 63.8 | 213.0 | 96.9 | 0.005 | 0.033 |

*Degree of MDO Cold Stretching at 25° C. (%)/Degree of MDO Hot Stretching at 135° C. (%)
**Degree of TDO Hot Stretching at 135° C. (%)

Example 18

This is an example of the preparation of PP copolymer films further comprising ethylene-propylene elastomer.

The (a) polypropylene copolymer used was a reactor grade PP copolymer purchased from Braskem known as C7054-07NA polypropylene (PP C7054-07NA). It contains 32.9 wt % ethylene-propylene copolymer, and the ethylene content in the ethylene-propylene copolymer is 49.7 wt %. It has a density of 0.9 g/cm³ and a melt index of 7 g/10 min at 230° C. and at a load of 2.16 kg. The number average molecular weight (Mn) and the weight average molecular weight (Mw) of PP C7054-07NA are 58,000 and 295,000, respectively.

The (b) ethylene-propylene elastomer used was Vistalon™ 785, which is an ethylene-propylene copolymer rubber (EPR) obtained from ExxonMobil Chemical. It is a low Mooney viscosity, low ethylene content, amorphous copolymer of ethylene and propylene with a narrow molecular weight distribution. It contains 49 wt % ethylene content (according to ASTM D3900A) and has a Mooney viscosity of 30 MU (according to ASTM D1646). The PP copolymer was compounded with an EP elastomer to make the modified compounded mixture for subsequent processing vis sequential cold and hot stretching.

The PP copolymer and EPR were compounded together using a 43 mm co-rotating twin-screw extruder. The PP copolymer was fed into the first barrel of the extruder operating at 250 rpm and pre-melted by the co-rotating screw prior to contact with EPR. To aid in processing and allow metering of the EPR, a 4-inch (101.6 mm) Bonnot extruder was used to masticate and pre-heat the EPR before being metered through a gear pump into the twin-screw extruder to join the PP melt at barrel 3. The EPR was measured to be 112° C. just before the gear pump. This mixture of PP/EPR was then conveyed through a series of mixing elements with barrel temperatures being maintained at 200° C. The actual melt temperature was monitored during the operation and increased from 170° C., at barrel 5, to a peak temperature of just under 245° C. at barrel 10. A water ring vacuum applied −27 inHg at barrel 11 to remove any volatiles before pumping through barrel 12 to the die. The resulting product was collected from an underwater palletization system running with 450-550 psig at a die heated to 220° C. The compositions, compounding conditions, EPR rubber concentration, and DSC results are summarized in Table 29.

TABLE 29

| Sample | Rubber (Nominal Wt. %) | PP Copolymer (Nominal Wt. %) |
|---|---|---|
| PP | 0 | 100 |
| EPR | 100 | 0 |
| R10 | 10 | 90 |
| R30 | 30 | 70 |

PP copolymer films were then produced on a film cast line, which consisted of a 1-inch single-screw extruder manufactured by Davis-Standard, LLC and a 6-inch wide cast die. Cast films were produced from the above materials (see Table 1) in a range of thickness by controlling the speed of the single screw, thus the throughput, and adjusting the roller speeds for an overall line speed in the range of 1-10 ft/min. Inline a melt filter pack with a stack of 150/200/150 mesh screens was used to remove gel from the melt stream before cooling to 200° C. at the die. The film from the die was cast onto a chilled roll with a temperature controlled at 50° C. to ensure a good film quality before winding to 3" cores at a wind-up station. A 10 mil film was cast from the R10 and a 20 mil film was cast from the R30.

Figure 10:
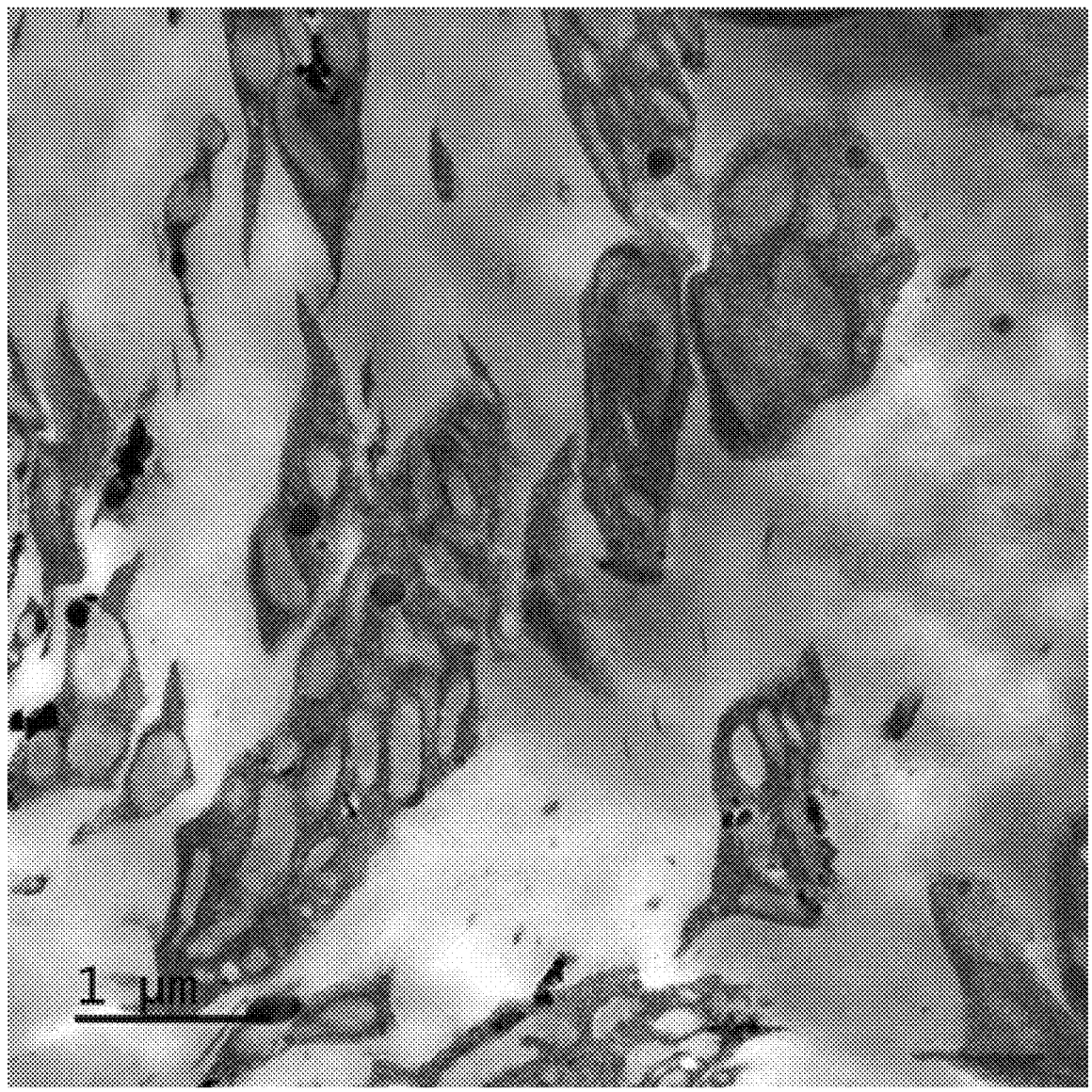
FIG. 10 is a TEM image of a cast film, prior to any stretching, made from a polypropylene copolymer comprising polypropylene homopolymer chain segments and ethylene-containing copolymer chain segments.
Figure 11:
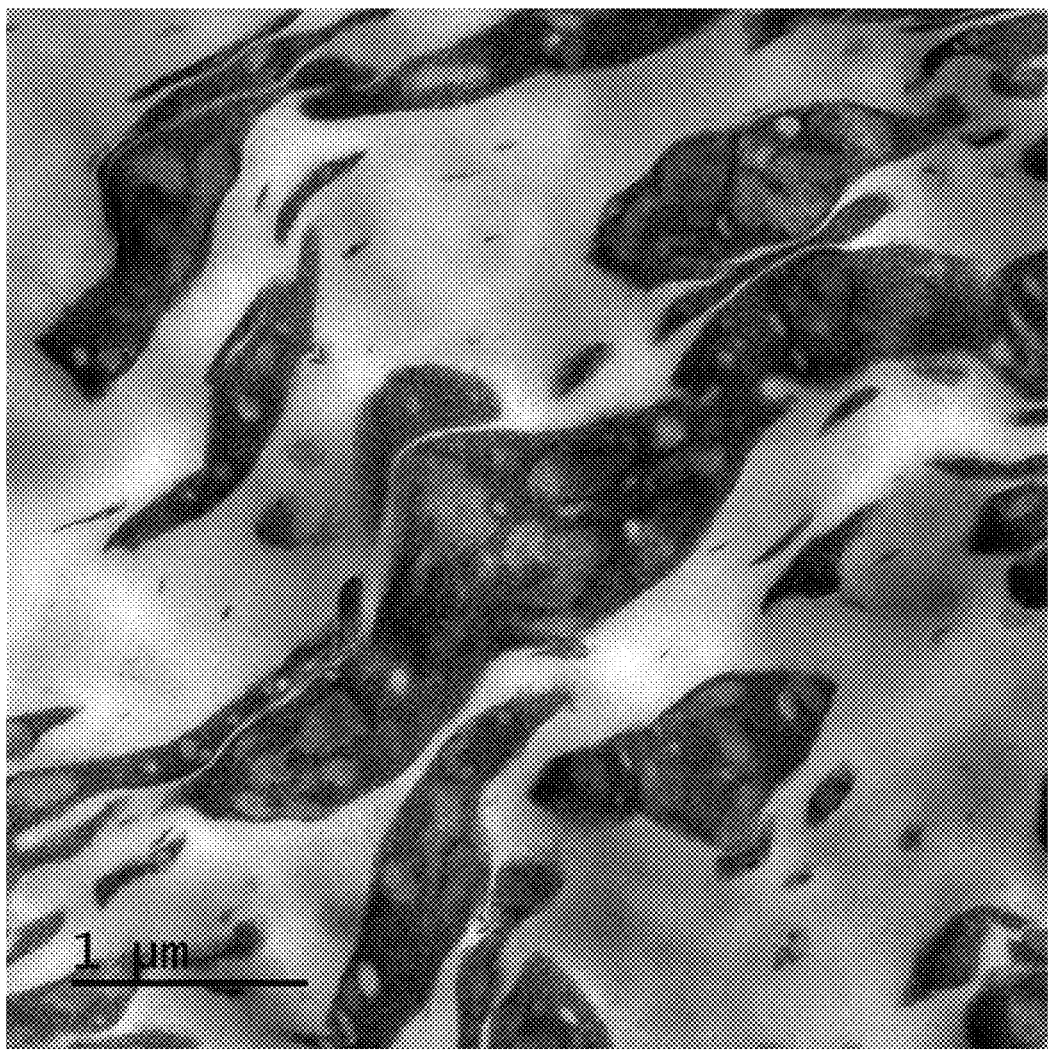
FIG. 11 is a TEM image of a cast film, prior to any stretching, made from 90 weight percent of a polypropylene copolymer (a) comprising polypropylene homopolymer chain segments and ethylene-containing copolymer chain segments, and 10 weight percent ethylene-propylene elastomer (b).
Figure 12:
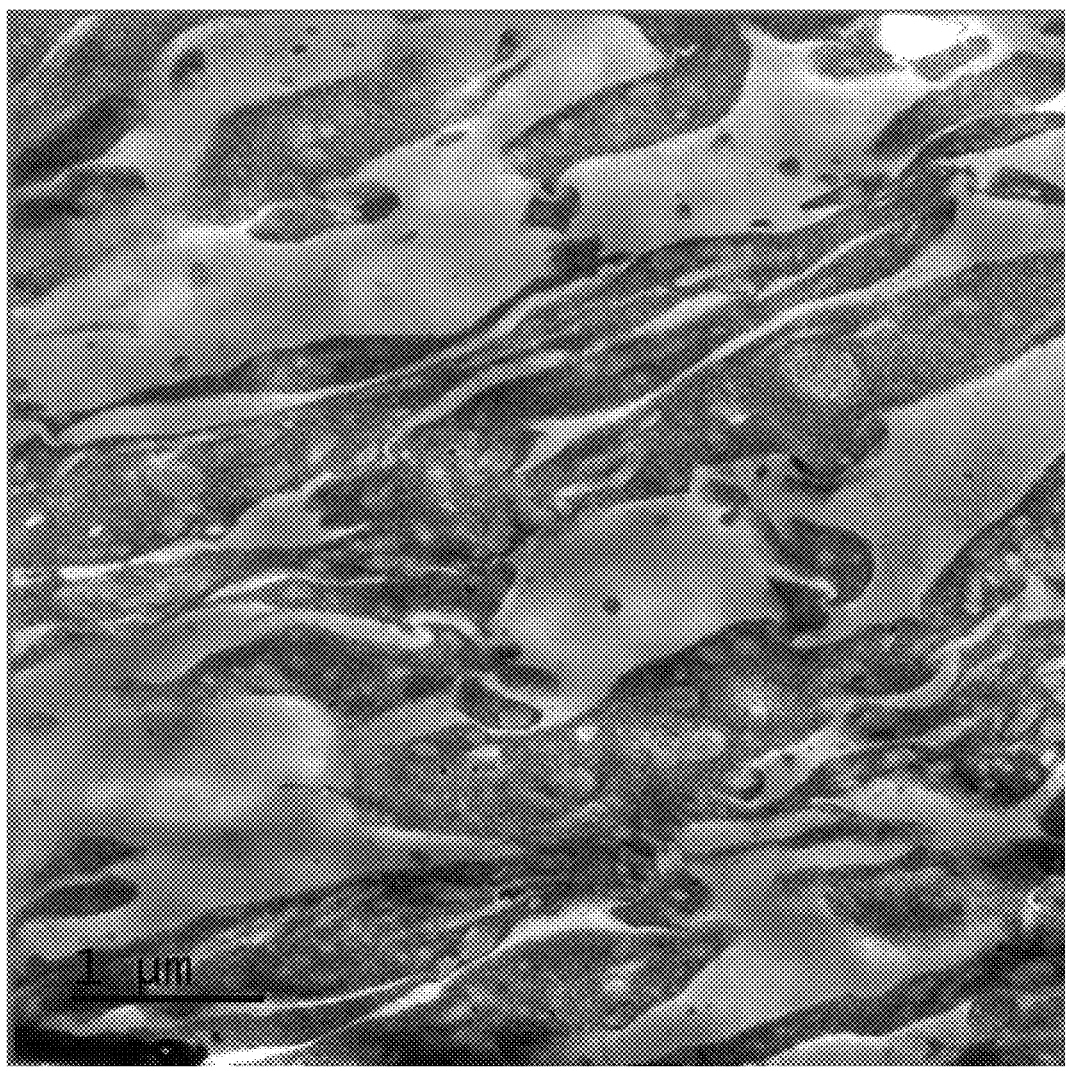
FIG. 12 is a TEM image of a cast film, prior to any stretching, made from 70 weight percent of a polypropylene copolymer (a) comprising polypropylene homopolymer chain segments and ethylene-containing copolymer chain segments, and 30 weight percent ethylene-propylene elastomer (b).

The morphology of the films was investigated using TEM. FIG. 10 shows the morphology of a cast film, prior to any stretching, made from the polypropylene copolymer (a) comprising polypropylene homopolymer chain segments and ethylene-containing copolymer chain segments, and having no ethylene-propylene elastomer (b). This figure shows the inclusion morphology, where matrix PP material is included inside the EP microphase domain. This unique morphology enables the transfer of stretching force to break up microphase domains, and thus initiate and grow the pore formation during stretching. FIG. 11 is a TEM image of the R10 cast film, prior to any stretching, made from 90 weight percent of a polypropylene copolymer (a) comprising polypropylene homopolymer chain segments and ethylene-containing copolymer chain segments, and 10 weight percent ethylene-propylene elastomer (b). The inclusion morphology remained intact, and the domain size was slightly increased. FIG. 12 is a TEM image of the R30 cast film, prior to any stretching, made from 70 weight percent of a polypropylene copolymer (a) comprising polypropylene homopolymer chain segments and ethylene-containing copolymer chain segments, and 30 weight percent ethylene-propylene elastomer (b). As the EPR content was further increased for this film, the domain size was greatly increased while the inclusion morphology still persisted.

The cast film samples were then stretched in the machine direction (MDO—machine direction orientation) using a multi-stage cold stretching process. Samples of each of the PP/EPR films were mounted on the unwinder and guided through eleven stretching rollers (1 to 11), comprising a pre-stretching section, a stretching section, and an annealing section, and then rewound onto the winder section. The nip rollers were then closed to apply pressure on the film to prevent slippage during the stretching. The roller speeds of rollers 3-7 were slowly increased to stretch the films 50% at 25° C. During the stretching process, the film turned from translucent color to white color, which is indicative of initial pore formation. The cold-stretched film was then heated by rollers 9-11 at 135° C. in the annealing section 25 to fix the pore structure induced by the cold stretching steps. The film was then cooled and rewound onto the winder. The degree of cold stretching was defined as (Total Roller Speed Ratio−1)×100%, where the total roll speed ratio is a result of multiplying all the roller speed ratios together (from roller 2/roller 1 to roller 8/roller 7).

The MDO cold-stretched films were then further hot stretched in the machine direction (MDO) using the same multi-stage process; however, for the hot stretching the process comprised a pre-heat stretching section, a hot stretching section, and an annealing section. Each of the MDO cold-stretched films was mounted on the unwinder section and guided through the eleven stretching rollers, and then rewound onto the other winder section. In this process, the first eight rollers were set to the hot stretching temperature of 130° C. The nip rollers were closed to apply pressure on the film to prevent slippage during the stretching and the roller speeds of rollers 5-8 were then slowly increased to stretch the films 50% at 130° C. After the hot stretching steps were completed, the film was annealed on rollers 9-11 at 135° C. in order to reduce film shrinkage. The film was then cooled in the winder section and wound into a roll. The degree of hot stretching was defined as (Total Roller Speed Ratio−1)×100%, where the total roller speed ratio is a result of multiplying all the roller speed ratios together (from roller 5/roller 4 to roller 8/roller 7).

Table 30 gives the stretching conditions, water vapor permeance, air permeability, porosity, and average pore diameter of PP/EPR films as compared with PP films. All these films have the same degree of cold stretching (50%) and the same degree of hot stretching (50%). The water vapor permeance for PP-22 mil film is 52 perms, while those of R10-10 mil and R30-20 mil films are 48.2 perms and 27.5 perms, respectively. This confirms that we can maintain desirable water vapor permeance after incorporating EPR rubber in the PP film. The Gurley air permeability of R10-10 mil was lower than that of PP-22 mil, which may be attributed to the fact that R10-10 mil had a smaller thickness. High concentration of EPR in R30-20 mil film give a very high Gurley air permeability.

addition of EPR to PP film also improved the tear strength of the film. The Trapezoid tear (maximum load) of R30-20 mil film was more than twice of PP-22 mil film.

The addition of the EPR also did not have a significantly negative impact on other film properties, such as tensile strength. The elongation at break of R30-20 mil was twice of PP-20 mil film, and the elongation at break of R10-10 mil were slightly lower than those of PP-20 mil film, which might be related to the smaller film thickness of R10-10 mil (bigger data variations). All these films also exhibited excellent water holdout (hydrohead >300 cm).

In other words, the incorporation of EPR into PP films can significantly improve the toughness and tear strength of PP breathable films, while maintaining the water vapor permeability and water holdout.

TABLE 31

| Sample | Hydrohead (cm) | Tensile Strength (psi)-MD | Elongation at Break (%)-MD | Modulus (psi)-MD | Trapezoid Tear-Maximum Load for MD (lbf) |
|---|---|---|---|---|---|
| PP | >300 | 2809.5 | 66 | 34555 | 1.9 |
| R10 | >300 | 2806.0 | 41.8 | 31744 | 1.5 |
| R30 | >300 | 2707.9 | 114.2 | 25309 | 5.2 |

Example 19

Figure 13:
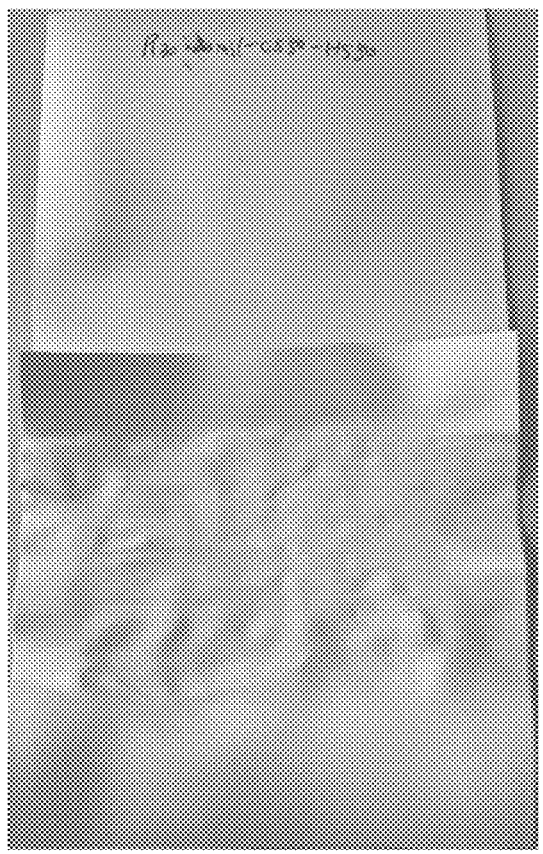
FIG. 13 is a photograph of the appearance of the two welded samples of a microporous film made from 70 weight percent of a polypropylene copolymer (a) comprising polypropylene homopolymer chain segments and ethylene-containing copolymer chain segments, and 30 weight percent ethylene-propylene elastomer (b); specifically, R30-20 mil film samples.
Figure 14:
FIG. 14 is a photograph of the appearance of the two welded samples of a microporous film made from a polypropylene copolymer (a) comprising polypropylene homopolymer chain segments and ethylene-containing copolymer chain segments; specifically, PP-22 mil film samples.

The hot welding performance of the microporous film of Example 18 onto itself without any applied adhesive was investigated. The edges of two samples of the R30-20 mil microporous film were overlaid and welded by the application of hot air (welding temperature 250° C.). Likewise, the edges of two samples of the PP-22 mil microporous film were overlaid and welded by the application of hot air in the same manner. The overall appearance of the two welded samples indicated that the R30-20 mil film samples shown in FIG. 13 demonstrated superior visual sealing performance over the PP-22 mil film samples of FIG. 14. The incorporation of EPR rubber into PP breathable film (the R30-20 mil film) made welding easier, while PP films without the EPR rubber, were more fragile and cracked after welding, and the welding areas are tougher, as compared with PP microporous films without EPR rubber.

Example 20

The machine direction (MDO) cold-stretched-and-then-further-hot-stretched films of Example 18 are then further

TABLE 30

| Sample | Film Thickness Before Stretching (mil) | Hot Stretching Temperature (° C.) | Water Vapor Permeance (perm) | Air Permeability (s/100 cm$^3$) | Porosity (%) | Average Pore Diameter (nm) |
|---|---|---|---|---|---|---|
| PP | 22 | 135 | 52 | 1943.9 | 46.5 | 69.2 |
| R10 | 10 | 130 | 48.2 | 1472 | 42.6 | 66.8 |
| R30 | 20 | 130 | 27.5 | 27980 | 38.8 | 51.4 |

Table 31 summarizes the hydrohead, tensile strength, elongation at break, modulus, and Trapezoid tear data of PP/EPR films in comparison to PP film. The R10-10 mil and R30-20 mil films, made by the addition of the EPR to the PP, both had lower modulus that the PP-20 mil film. The hot stretched in the transverse direction using similar processing and equipment as described in Example 13 and shown in FIG. 9, comprising unwind section 41; a multi-zoned oven 50 having a pre-heating section 43, a TDO (transverse direction orientation) stretching section 44, an annealing section 45, and a cooling zone 46; and a winder 42; however, the TDO oven was preheated to 130° C. and the annealing section 45 at was set to 135° C.

The general properties (including increased porosity) of films made by biaxially-stretching and the degree of property difference between the solely machine direction (MDO) films and films made by biaxially-stretching are similar to those shown Examples 13-15 & Example 17.

What is claimed:

1. A microporous polymer film comprising:
   (a) 50 to 95 weight percent of one or more polypropylene copolymer, based on the total weight of the film, said polypropylene copolymer comprising one or more polypropylene homopolymer chain segments and one or more ethylene-containing copolymer chain segments; and wherein the microporous polymer film comprises:
      (i) polypropylene homopolymer chain segments in total amount of from 50-82 wt. %, based on the weight of polypropylene copolymer, or from 43-79 mole %, based on the mole content of polymerized units of propylene in the polypropylene homopolymer chain segments as a percentage of the total mole content of polymerized monomer units in the polypropylene copolymer; and
      (ii) ethylene-containing copolymer chain segments in total amount of from 18-50 wt. %, based on the weight of polypropylene copolymer, or from 21-57 mole %, based on the mole content of polymerized monomer units in the ethylene-containing copolymer chain segments as a percentage of the total mole content of polymerized monomer units in the polypropylene copolymer; wherein at least a portion of the ethylene-containing copolymer chain segments comprise polymerized units of ethylene in an amount of at least 45 wt. %, based on the weight of the ethylene-containing copolymer chain segments, or at least 55 mole % based on the mole content of polymerized units of ethylene in the ethylene-containing copolymer chain segments as a percentage of the total mole content of polymerized monomer units in the ethylene-containing copolymer chain segments; and
   (b) 5 to 50 weight percent of one or more ethylene-propylene elastomer, based on the total weight of the film;
   wherein at least 45 weight percent of the polymerized units in the ethylene-propylene elastomer are units of ethylene.

2. The microporous film of claim 1, wherein in (b), the one or more ethylene-propylene elastomer is 5 to 30 weight percent, based on the total of (a) and (b) in the film.

3. The microporous film of claim 2, wherein in (b), the one or more ethylene-propylene elastomer is 5 to 20 weight percent, based on the total of (a) and (b) in the film.

4. The microporous film of claim 1, wherein in (b), 45 to 80 weight percent of the polymerized units in the ethylene-propylene elastomer are units of ethylene.

5. The microporous film of claim 4, wherein in (b), 45 to 60 weight percent of the polymerized units in the ethylene-propylene elastomer are units of ethylene.

6. The microporous film of claim 1, wherein in (b), the ethylene-propylene elastomer is ethylene-propylene rubber (EPR), ethylene propylene diene monomer (EPDM) rubber, or some mixture thereof.

7. The microporous film of claim 1, wherein in (b), the ethylene-propylene elastomer has a Mooney Viscosity of from 10 to 40 Mu.

8. The microporous film of claim 1 consisting of (a) and (b).

9. The microporous film of claim 1 wherein the tensile modulus of the microporous polymer film comprising (a) and (b) is less than the tensile modulus of a film made solely with (a).

10. The microporous film of claim 1 wherein the water vapor permeance of the microporous polymer film comprising (a) and (b) is less than the water vapor permeance of a film made solely with (a).

11. The microporous polymer film of claim 1, wherein in (a) the ethylene-containing copolymer chain segments are ethylene-propylene copolymer chain segments.

12. The microporous polymer film of claim 11, wherein the ethylene-propylene copolymer chain segments in (a) are ethylene-propylene diblock copolymer chain segments comprising a polypropylene block and a polyethylene block; or are diblock copolymer chain segments comprising a polypropylene block and an ethylene-propylene copolymer block.

13. The microporous polymer film of claim 1 having a porosity of at least 25% and a median pore diameter, 4V/A according to UOP Method 578-11, of at least 25 nm, both features being measured by mercury intrusion porosimetry.

14. The microporous polymer film of claim 1, wherein the microporous polymer film is made from a non-porous polymer film and wherein the non-porous film has domains of (a) and domains of (b), wherein the domains of (a) further have a morphology that features a majority polymer phase of polypropylene, a plurality of minority polymer domains of ethylene-containing copolymer within the majority polymer phase, and an inclusion phase of the major polypropylene phase within the minority polymer domain.

15. The microporous polymer film of claim 1, wherein the microporous polymer film is, or is a constituent of, a roof membrane.

16. The microporous polymer film of claim 1, having a thickness of at least 100 μm to 2.5 mm.

17. A medical packaging or active packaging article, or a medical back table cover, comprising the microporous polymer film of claim 1.

18. The medical packaging or active packaging article, or medical back table cover of claim 17, wherein the microporous polymer film has a barrier to microorganisms equivalent to a maximum penetration, calculated % Pmax, of <10%, as defined by ASTM F2638-18.

19. The medical packaging or active packaging article, or medical back table cover of claim 17, wherein the microporous polymer film has a Gurley Gauge air permeability of from 1 to 35,000 sec/100 cm$^3$ and controls the inflow or outflow of air or one or more gases into or out of the package.

20. The medical packaging or active packaging article, or medical back table cover of claim 17, wherein the microporous polymer film is thermoforming and heat-sealable.

21. A method of forming a microporous polymer film, said method steps comprising:
   A) providing a mixture of
      (a) 50 to 95 weight percent of one or more polypropylene copolymer, based on the total weight of the mixture, said polypropylene copolymer comprising:
         (i) one or more polypropylene homopolymer chain segments in total amount of from 50-82 wt. %, based on the weight of polypropylene copolymer, or from 43-79 mole %, based on the mole content of polymerized units of propylene in the polypropylene homopolymer chain segments as a percentage of the total mole content of polymerized monomer units in the polypropylene copolymer; and (ii) one or more ethylene-containing copolymer chain segments in total amount of from 18-50 wt. %, based on the weight of polypropylene copolymer, or from 21-57 mole %, based on the mole content of polymerized monomer units in the ethylene-containing copolymer chain segments as a percentage of the total mole content of polymerized monomer units in the polypropylene copolymer; wherein at least a portion of the ethylene-containing copolymer chain segments comprises polymerized units of ethylene in an amount of at least 45 wt. %, based on the weight of the ethylene-containing copolymer chain segments, or at least 55 mole % based on the mole content of polymerized units of ethylene in the ethylene-containing copolymer chain segments as a percentage of the total mole content of polymerized monomer units in the ethylene-containing copolymer chain segments; and (b) 5 to 50 weight percent of one or more ethylene-propylene elastomer, based on the total weight of the mixture, wherein at least 45 weight percent of the polymerized units in the ethylene-propylene elastomer are units of ethylene, B) forming a non-porous film from the mixture; and C) subjecting the non-porous film to sequential cold and hot stretching steps comprising:

(i) at least one cold stretching step at a temperature in a range of from −20° C. to 50° C.; and (ii) at least one hot stretching step at a temperature in a range of from 50° C. to 140° C.;

thereby producing a microporous polymer film.

22. The method of claim 21, wherein in (b), 45 to 80 weight percent of the polymerized units in the ethylene-propylene elastomer are units of ethylene.

23. The method of claim 22, wherein in (b), 45 to 60 weight percent of the polymerized units in the ethylene-propylene elastomer are units of ethylene.

24. The method of claim 21, wherein in (b), the ethylene-propylene elastomer is ethylene-propylene rubber (EPR), ethylene propylene diene monomer (EPDM) rubber, or some mixture thereof.

25. The method of claim 21, wherein in (b), the ethylene-propylene elastomer has a Mooney Viscosity of from 10 to 40 Mu.

26. The method of claim 21 wherein the mixture consists of (a) and (b).

27. The method of claim 21, wherein in (a) the ethylene-containing copolymer chain segments are ethylene-propylene copolymer chain segments.

28. The method of claim 21 wherein the polypropylene copolymer of (a) is blended with the ethylene-containing copolymer of (a) to form a blend of polymers prior to forming the mixture with the one or more ethylene-propylene elastomer (b).

29. The method of claim 21 wherein the at least one cold stretching step stretches the film in at least one direction by at least 10%, and the at least one hot stretching step stretches the film in at least one direction by at least 20%.

30. The method of claim 21 wherein the microporous polymer film has a porosity of at least 25% and a median pore diameter (4V/A according to UOP Method 578-11), of at least 25 nm, both features being measured by mercury intrusion porosimetry.

31. The method of claim 21 wherein the microporous polymer film has a permeance in a range of from 10-150 perms, according to ASTM E96/E96M-16.

* * * * *